(12) United States Patent
Sislow et al.

(10) Patent No.: US 11,550,945 B2
(45) Date of Patent: Jan. 10, 2023

(54) SECURELY PROCESSING SHAREABLE DATA IN A DATA COMMUNICATION NETWORK

(71) Applicant: Sympatic, Inc., Chicago, IL (US)

(72) Inventors: Joseph Sislow, Chicago, IL (US); Piers Nash, Chicago, IL (US)

(73) Assignee: Sympatic, Inc., Chicago, IL (US)

( * ) Notice: Subject to any disclaimer, the term of this patent is extended or adjusted under 35 U.S.C. 154(b) by 387 days.

(21) Appl. No.: 16/818,601

(22) Filed: Mar. 13, 2020

(65) Prior Publication Data

US 2021/0286891 A1  Sep. 16, 2021

(51) Int. Cl.
| | | |
|---|---|---|
| G06F 21/00 | (2013.01) | |
| G06F 21/62 | (2013.01) | |
| G06F 16/23 | (2019.01) | |
| G06F 9/455 | (2018.01) | |
| G06F 21/44 | (2013.01) | |

(52) U.S. Cl.
CPC ...... *G06F 21/6227* (2013.01); *G06F 9/45558* (2013.01); *G06F 16/2379* (2019.01); *G06F 21/44* (2013.01); *G06F 2009/45562* (2013.01); *G06F 2009/45587* (2013.01); *G06F 2221/2143* (2013.01)

(58) Field of Classification Search
None
See application file for complete search history.

(56) References Cited

U.S. PATENT DOCUMENTS

| | | | | |
|---|---|---|---|---|
| 10,135,793 | B2* | 11/2018 | Durniak | H04L 63/0421 |
| 2015/0160956 | A1* | 6/2015 | Shah | H04L 63/08 |
| | | | | 718/1 |
| 2016/0350481 | A1* | 12/2016 | Wesemann | G16H 10/60 |
| 2016/0350482 | A1* | 12/2016 | Wesemann | G16H 10/60 |
| 2019/0037019 | A1* | 1/2019 | Wesemann | H04L 67/1095 |
| 2020/0117498 | A1* | 4/2020 | Unnikrishnan | G06F 9/45558 |
| 2021/0056225 | A1* | 2/2021 | Sislow | G06F 21/31 |
| 2021/0286891 | A1* | 9/2021 | Sislow | G06F 21/6245 |
| 2022/0164474 | A1* | 5/2022 | Netke | G06F 21/6245 |

* cited by examiner

*Primary Examiner* — Jeffery L Williams
(74) *Attorney, Agent, or Firm* — Garlick & Markison; Timothy D. Taylor

(57) ABSTRACT

A method includes a data processing system creating a virtual machine for use with a data owner system in accordance with a temporary credential protocol between the data processing system and the data owner system. The method continues with by the virtual machine accessing memory of the data owner system regarding a set of data records having common data criteria. The method continues by the virtual machine modifying the set of data records to produce a set of shareable data records. The method continues with the data processing system executing a data analysis function on the set of shareable data records to produce an analytical result. The method continues with the data processing system sending the analytical result to a data consumer computing entity.

24 Claims, 51 Drawing Sheets

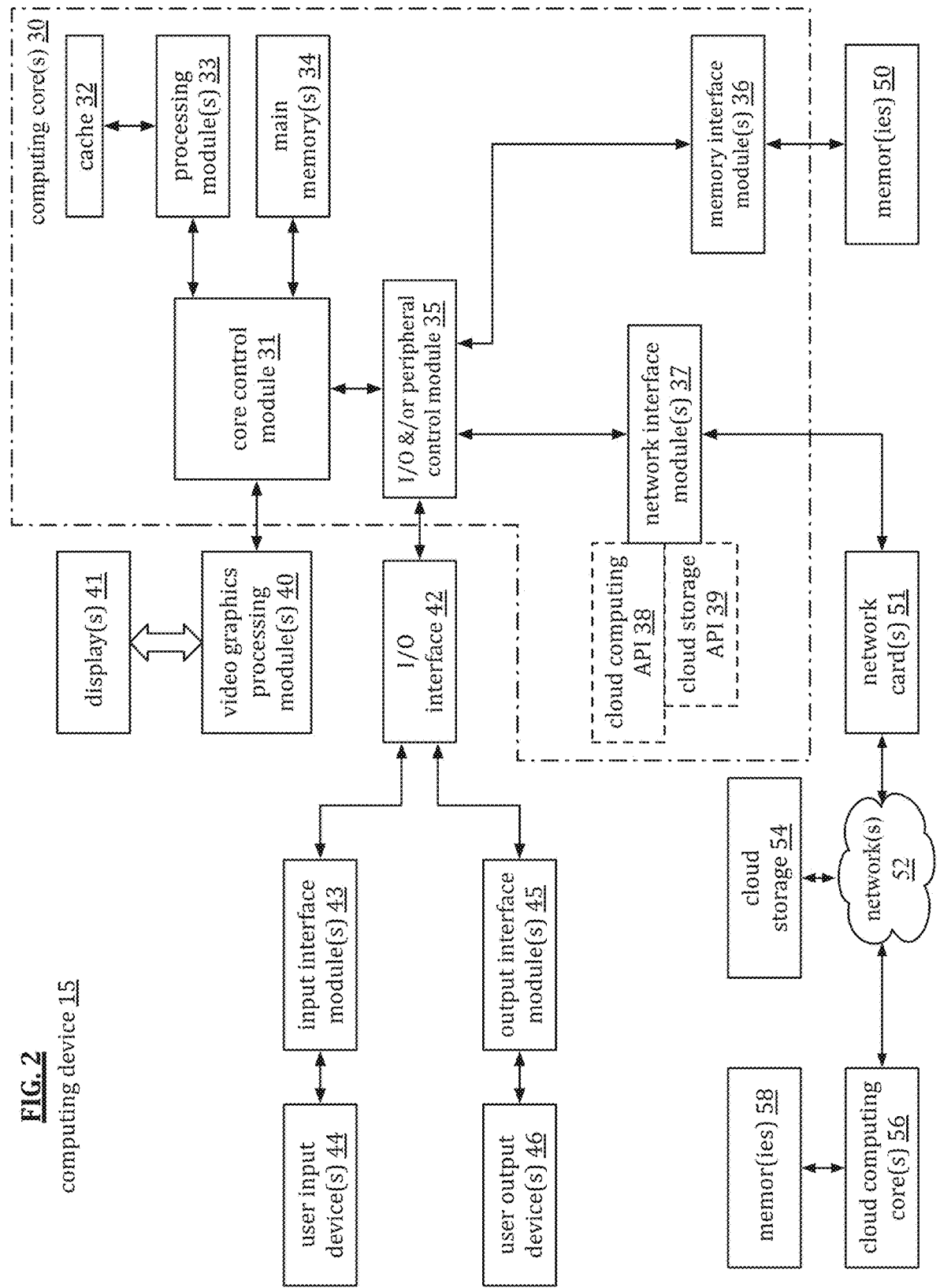

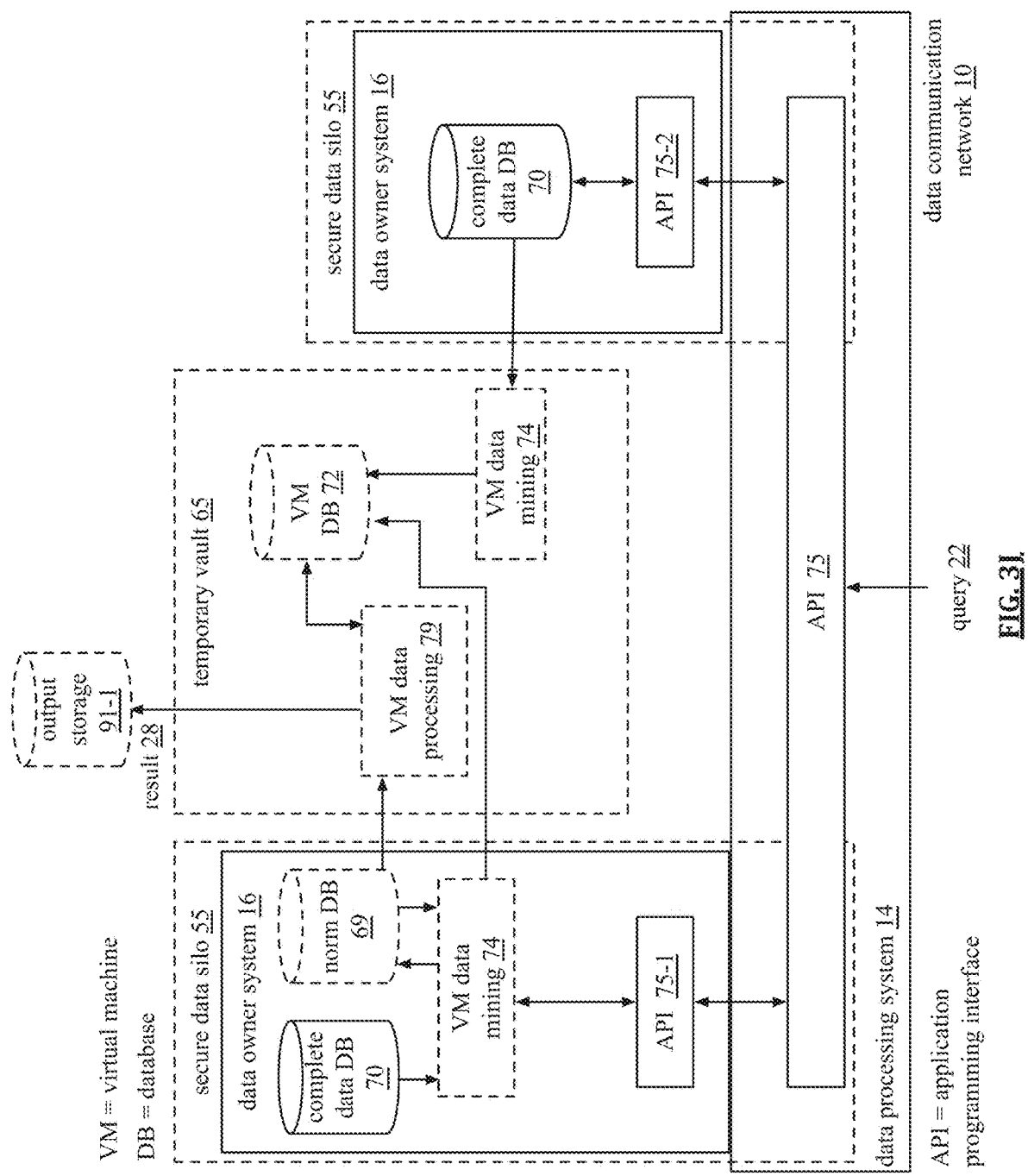

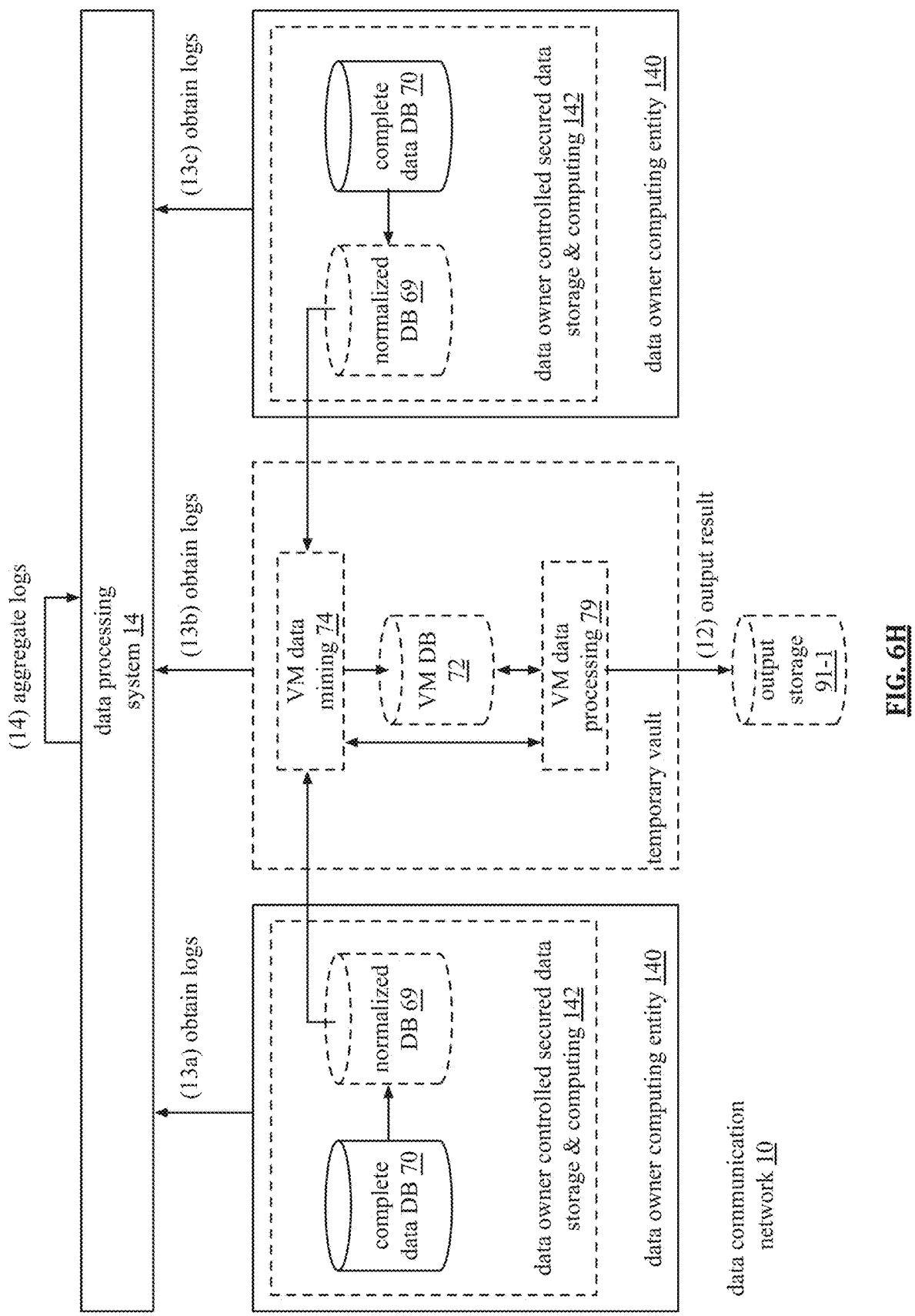

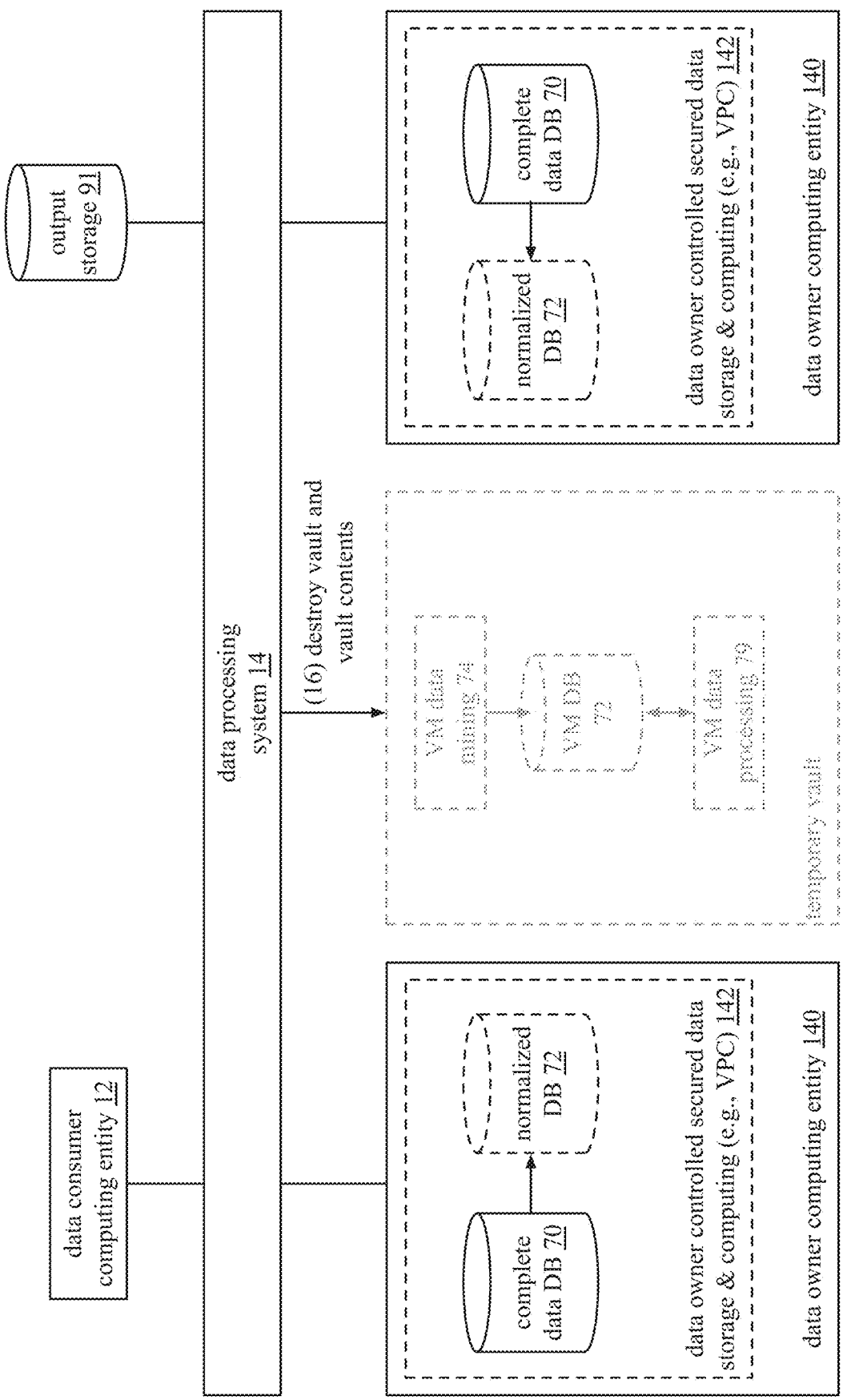

SECURELY PROCESSING SHAREABLE DATA IN A DATA COMMUNICATION NETWORK

CROSS-REFERENCE TO RELATED APPLICATIONS

Not Applicable.

STATEMENT REGARDING FEDERALLY SPONSORED RESEARCH OR DEVELOPMENT

Not Applicable.

INCORPORATION-BY-REFERENCE OF MATERIAL SUBMITTED ON A COMPACT DISC

Not Applicable.

BACKGROUND OF THE INVENTION

Technical Field of the Invention

This invention relates generally to computer networks and more particularly to securely processing shareable data.

Description of Related Art

As is known, data is collected for a variety of events. The events include sleeping, exercising, social media interactions, purchases, hospital visits, doctor's visits and urgent care visits and many more. As is further known, the collected data may be stored by one or more computers for later retrieval and/or analysis.

As is further known, data is stored in a variety of formats based on different data storage protocols. For example, data can be stored in text formats, video formats, graphics formats, image formats, and audio formats. The format used by one entity to store similar types of data (e.g., patient records) is often different than the format used by another entity. This makes it difficult to share data.

Another issue with sharing data is data privacy. For example, the health insurance portability and accountability act (HIPAA) mandates that hospitals, doctors, pharmacists, and/or other entities that handle medical records, must keep the patient's personal information in confidence. To do this, most entities do not share medical record data or any portion thereof. As another example, general data protection regulation (GDPR) restricts the sharing of personal information regarding any type of data.

BRIEF DESCRIPTION OF THE SEVERAL VIEWS OF THE DRAWING(S)

FIG. 2 is a schematic block diagram of an embodiment of a computing device in accordance with the present invention;

Figure 3A:
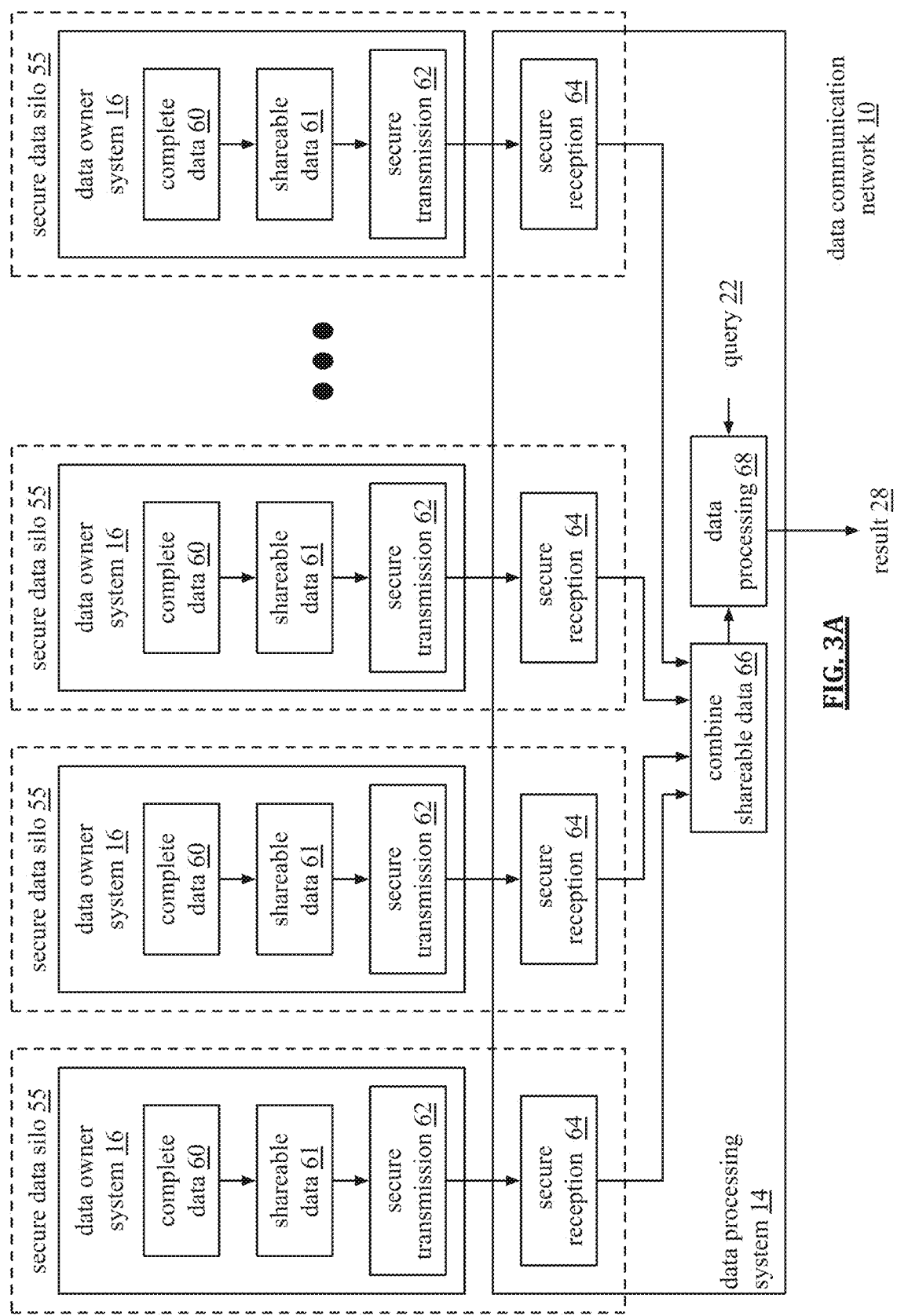
FIG. 3A is a diagram of an embodiment of a data processing system creating secure data silos in accordance with the present invention.
Figure 3B:
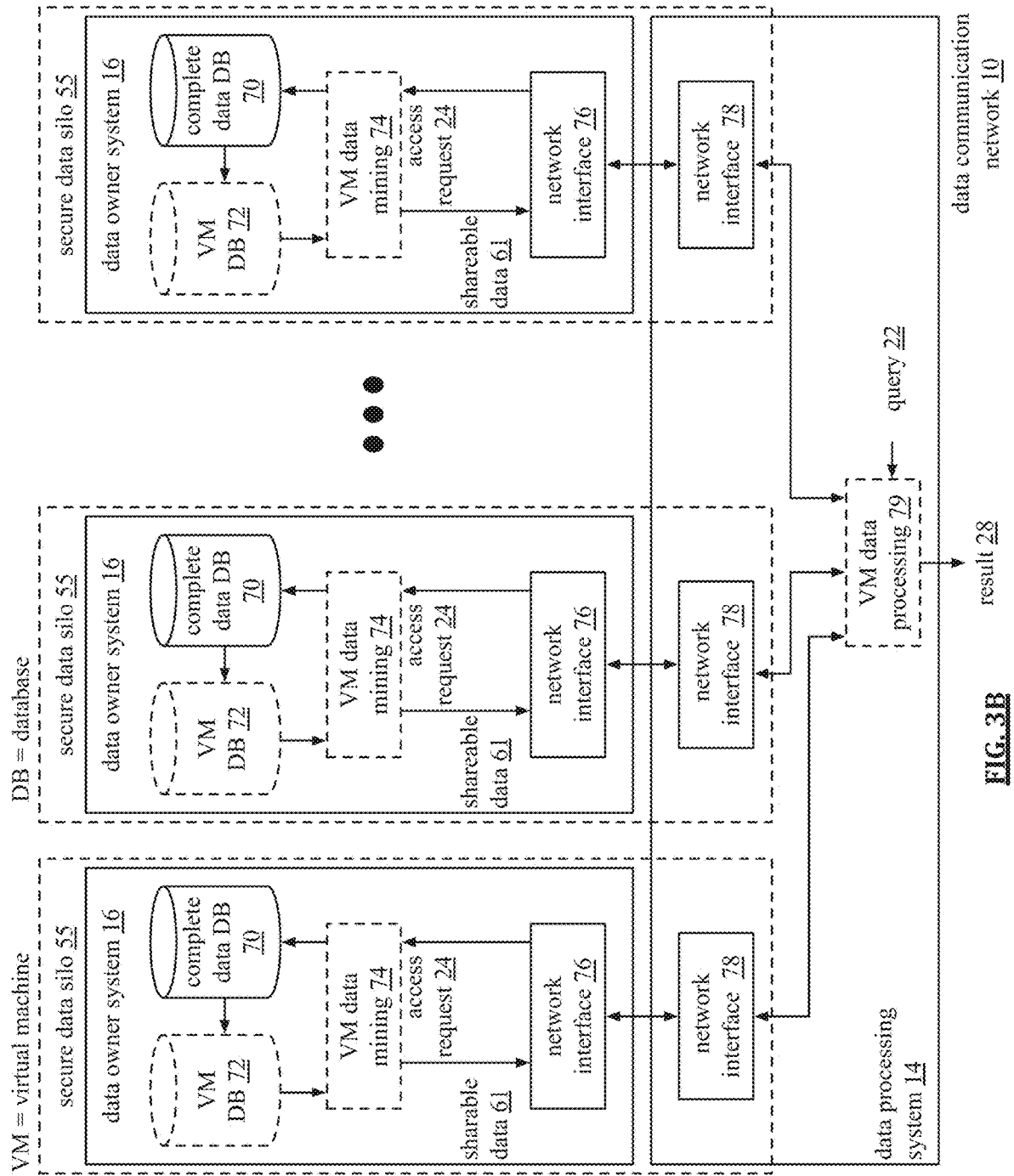
FIG. 3B is a schematic block diagram of another embodiment of a data processing system creating secure data silos in accordance with the present invention.
Figure 3C:
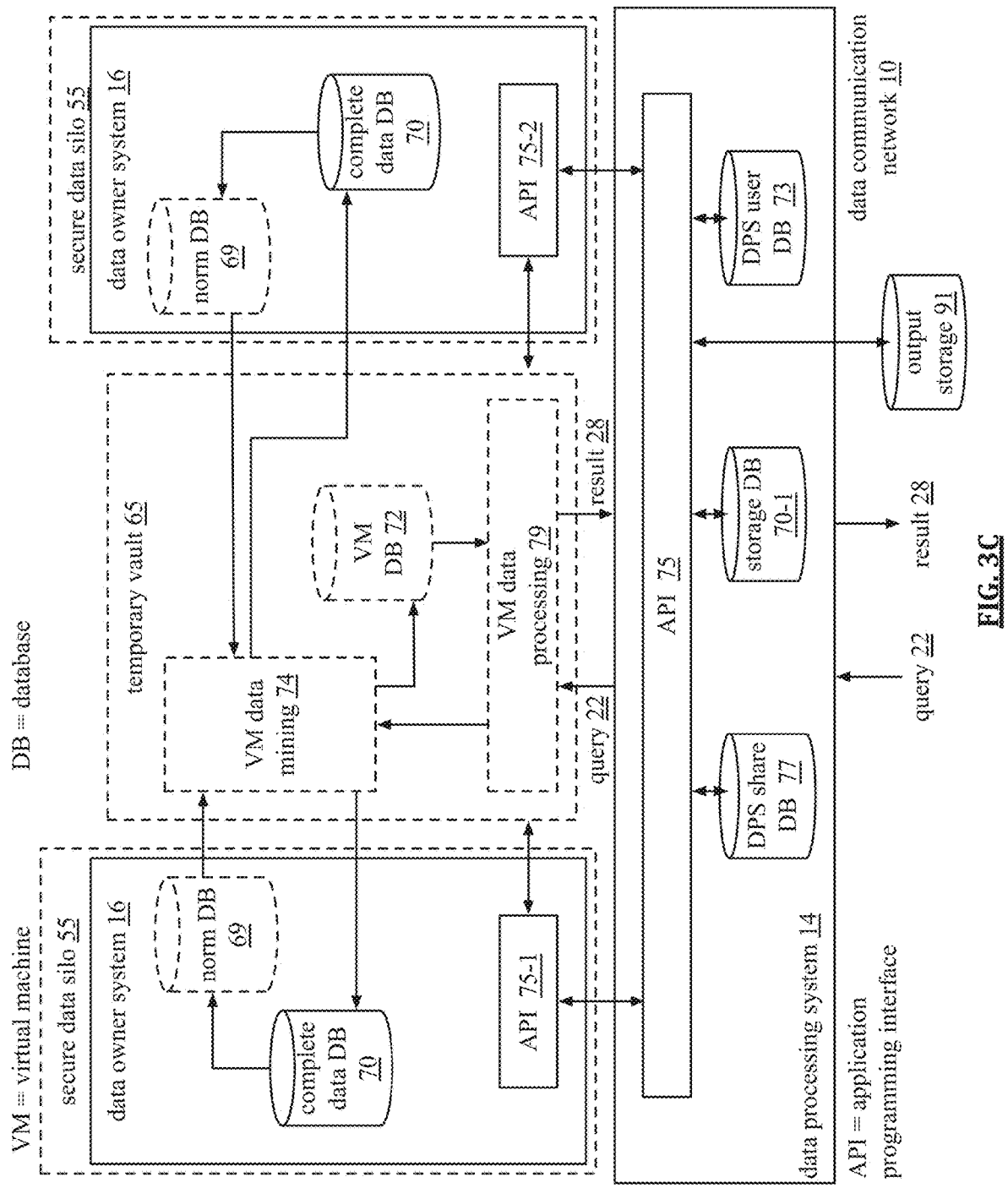
Figure 3D:
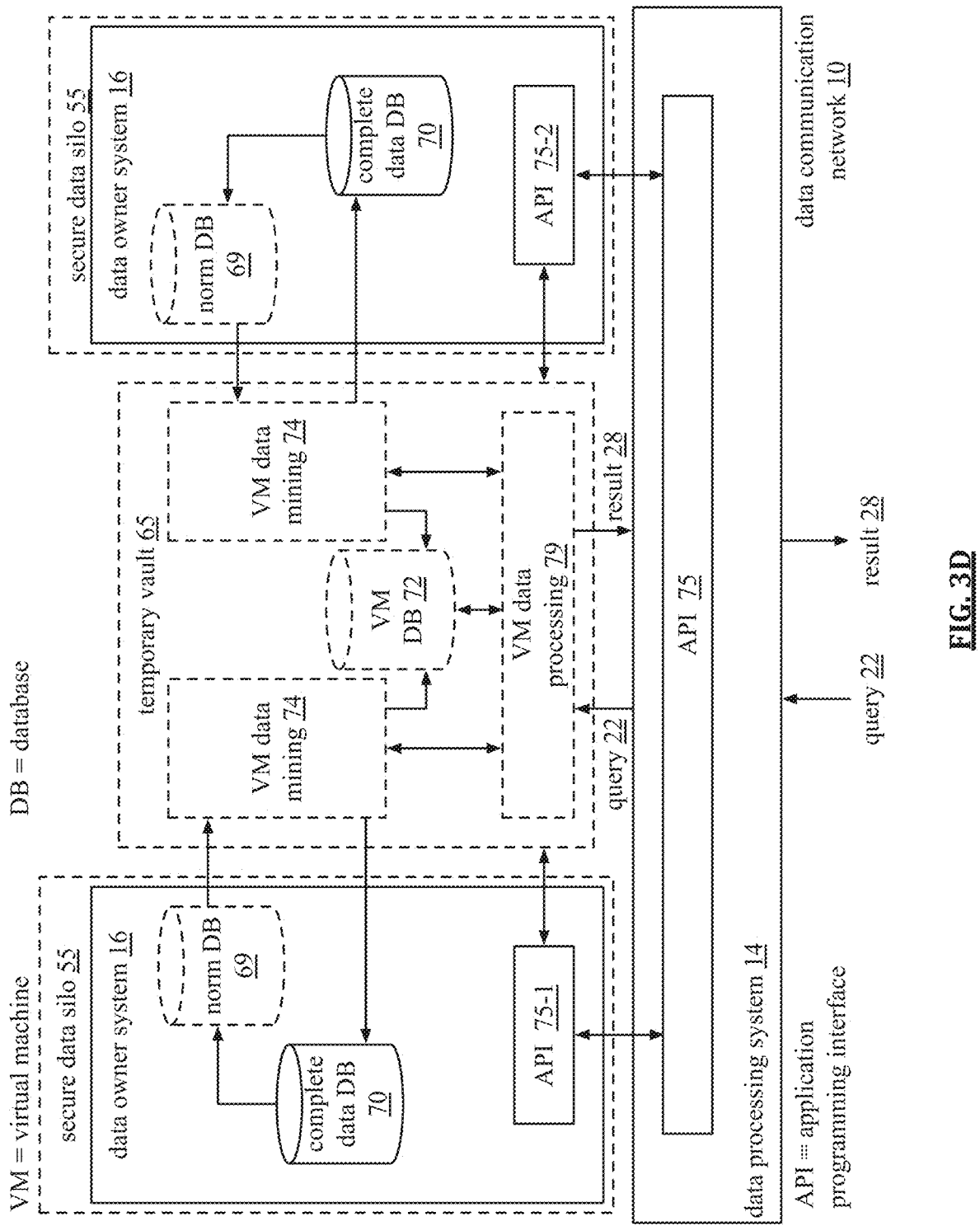
Figure 3E:
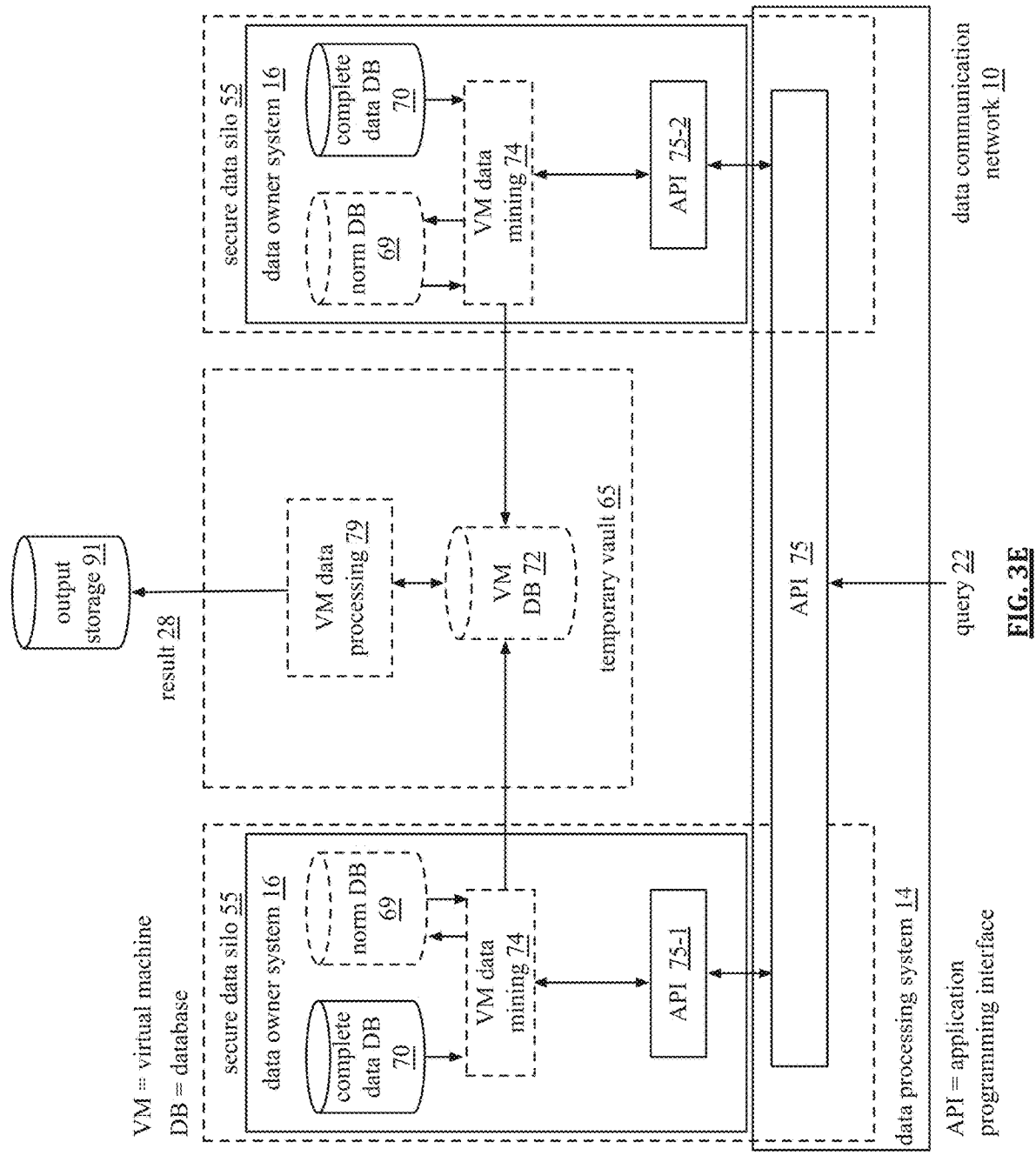
Figure 3F:
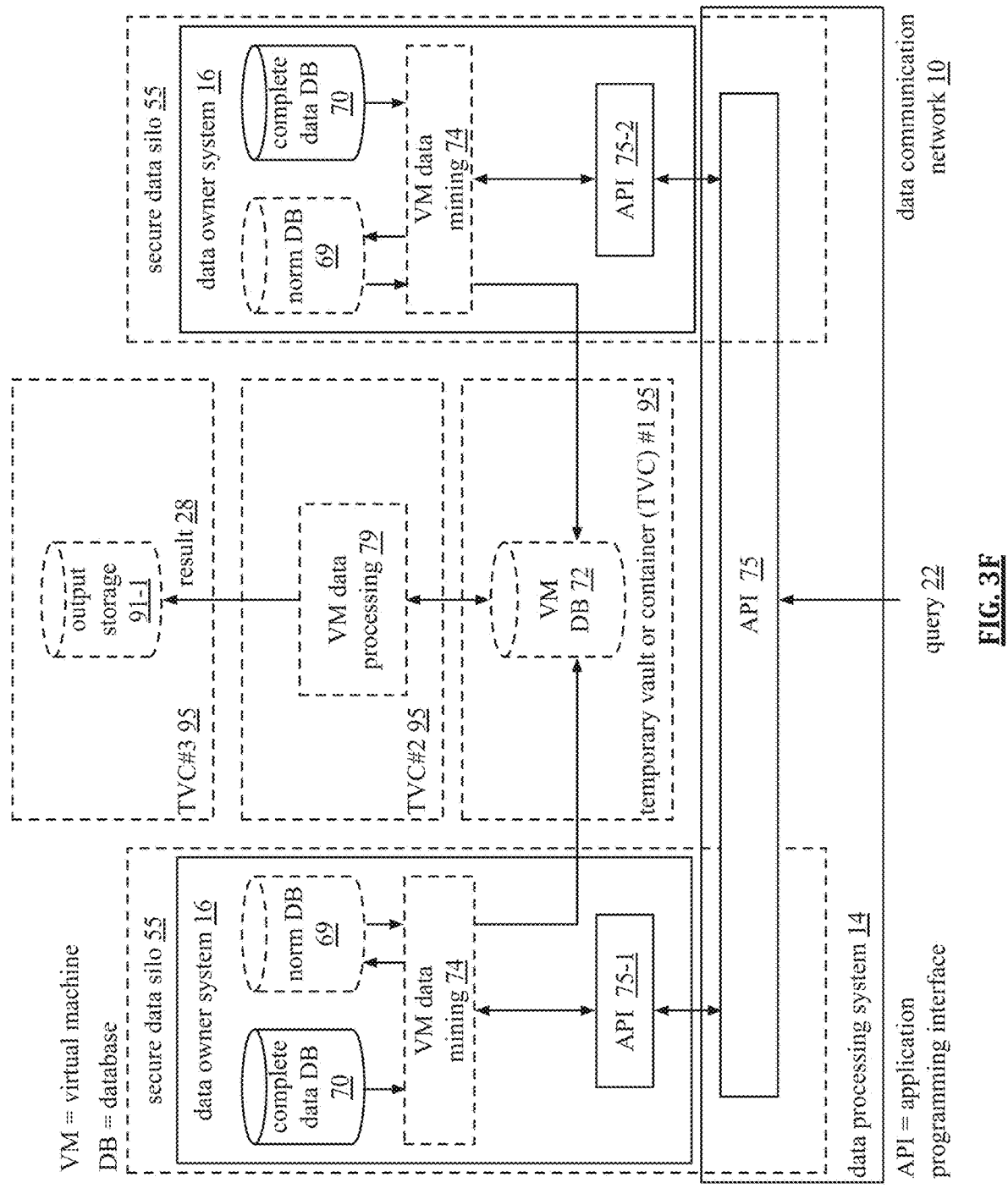
Figure 3G:
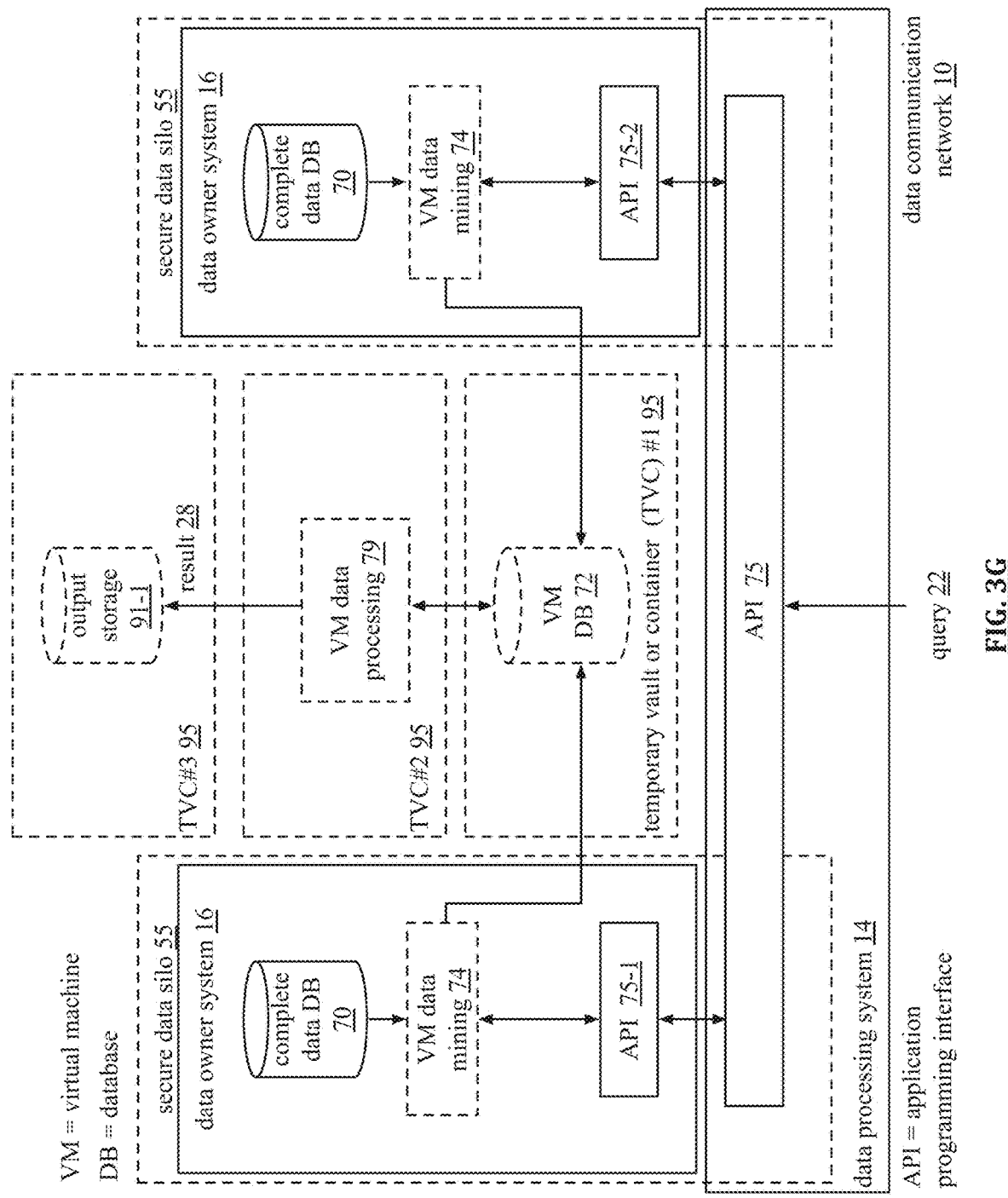
Figure 3H:
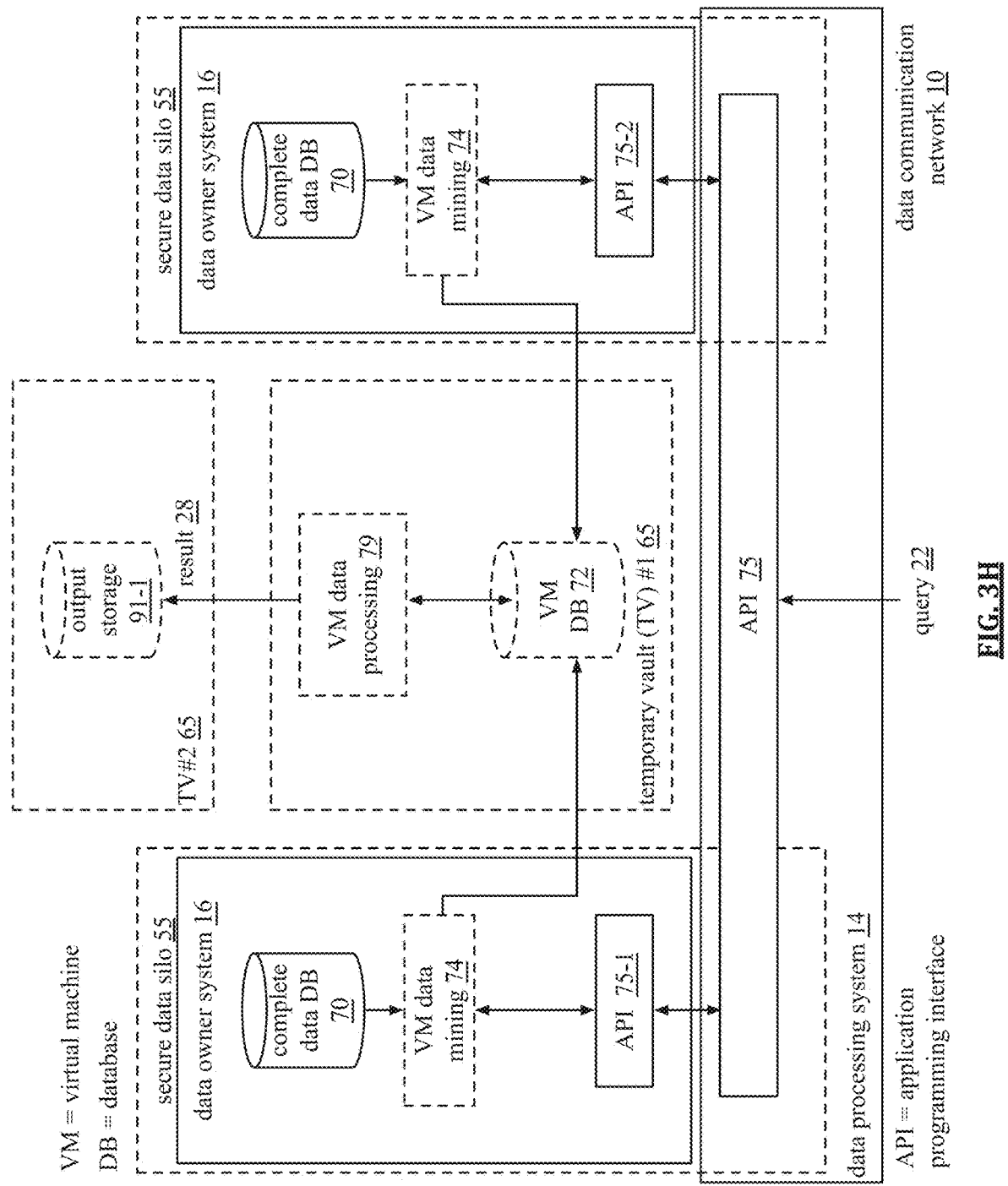
Figure 31:
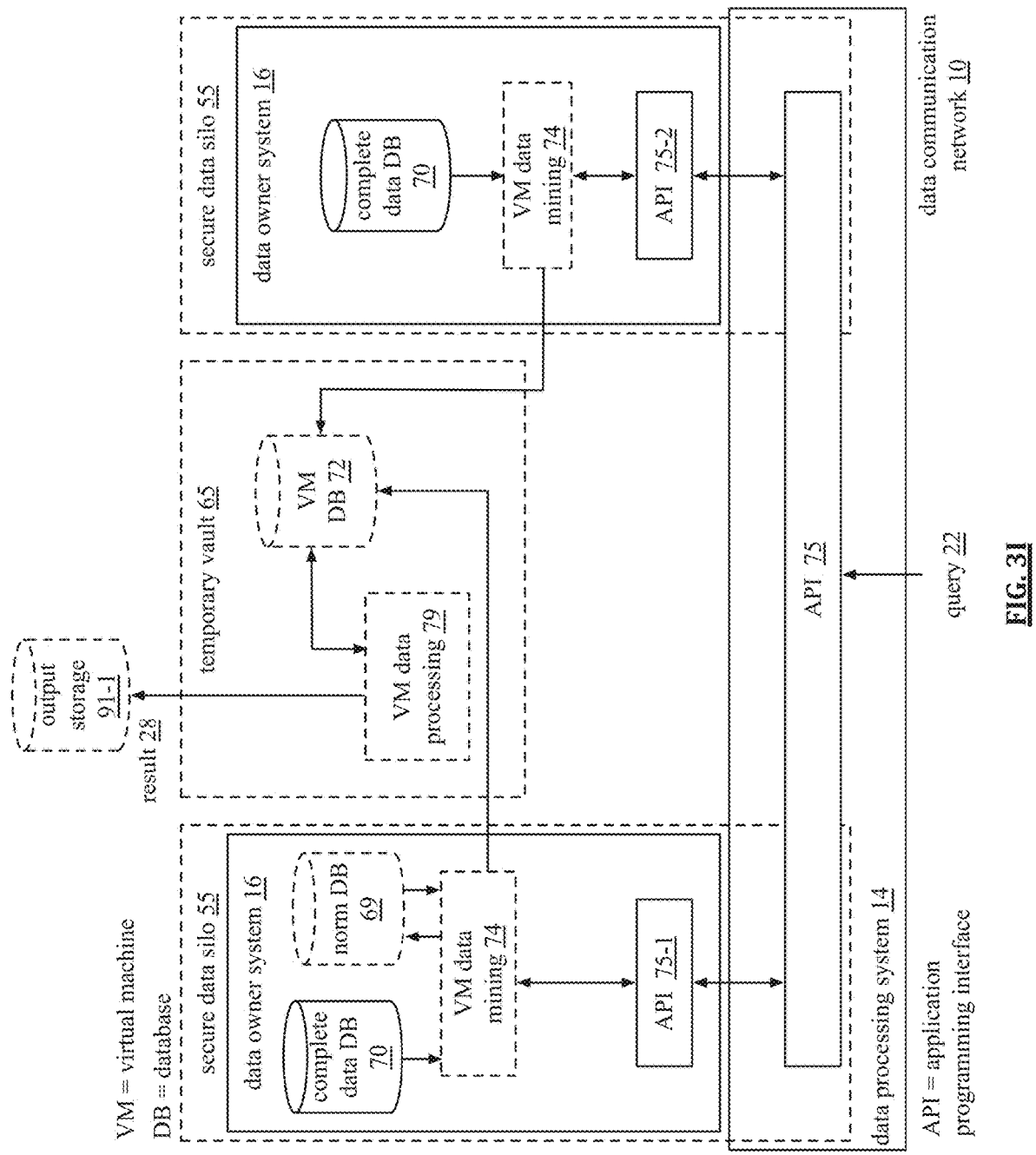
Figure 3K:
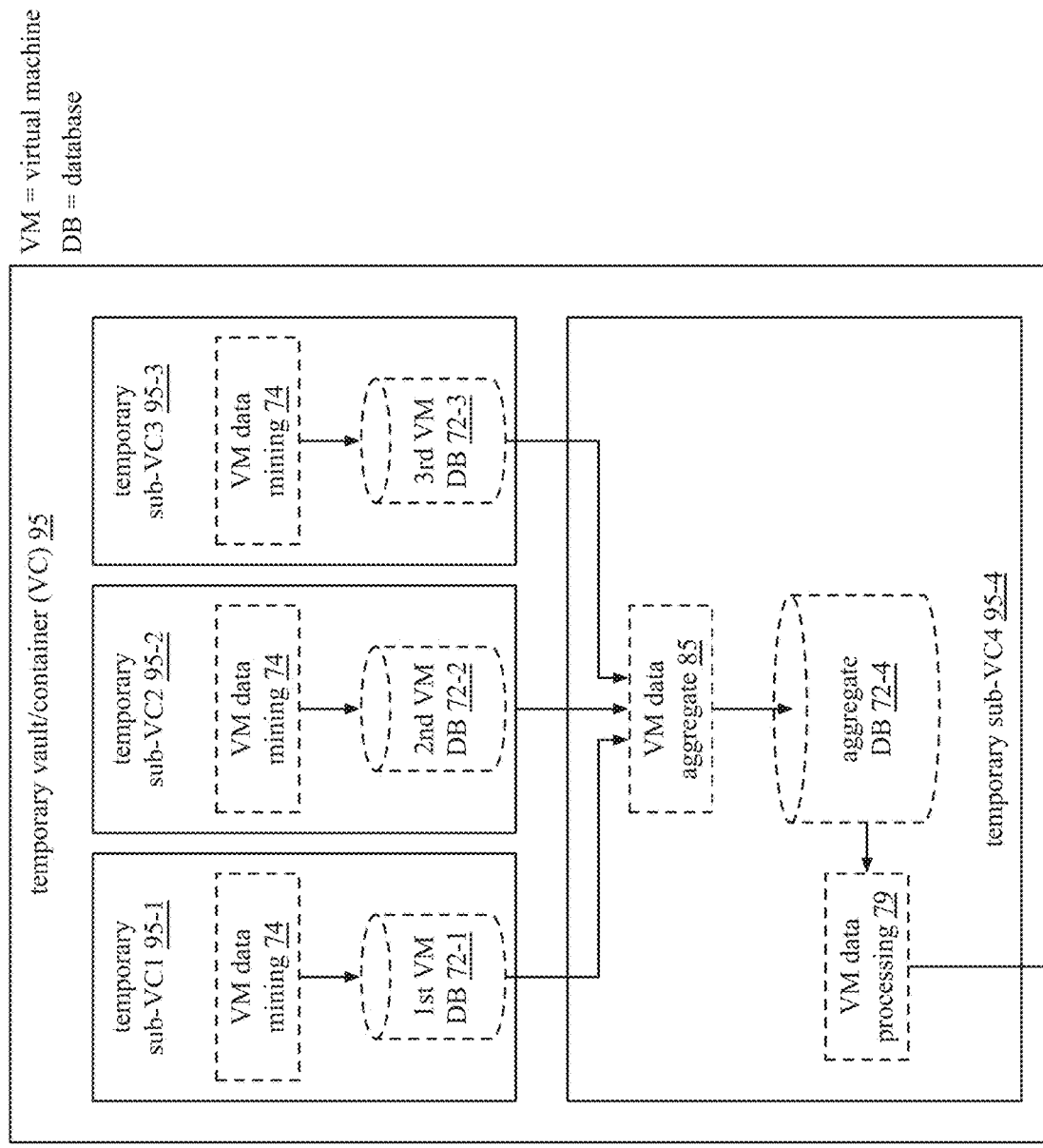
Figure 4A:
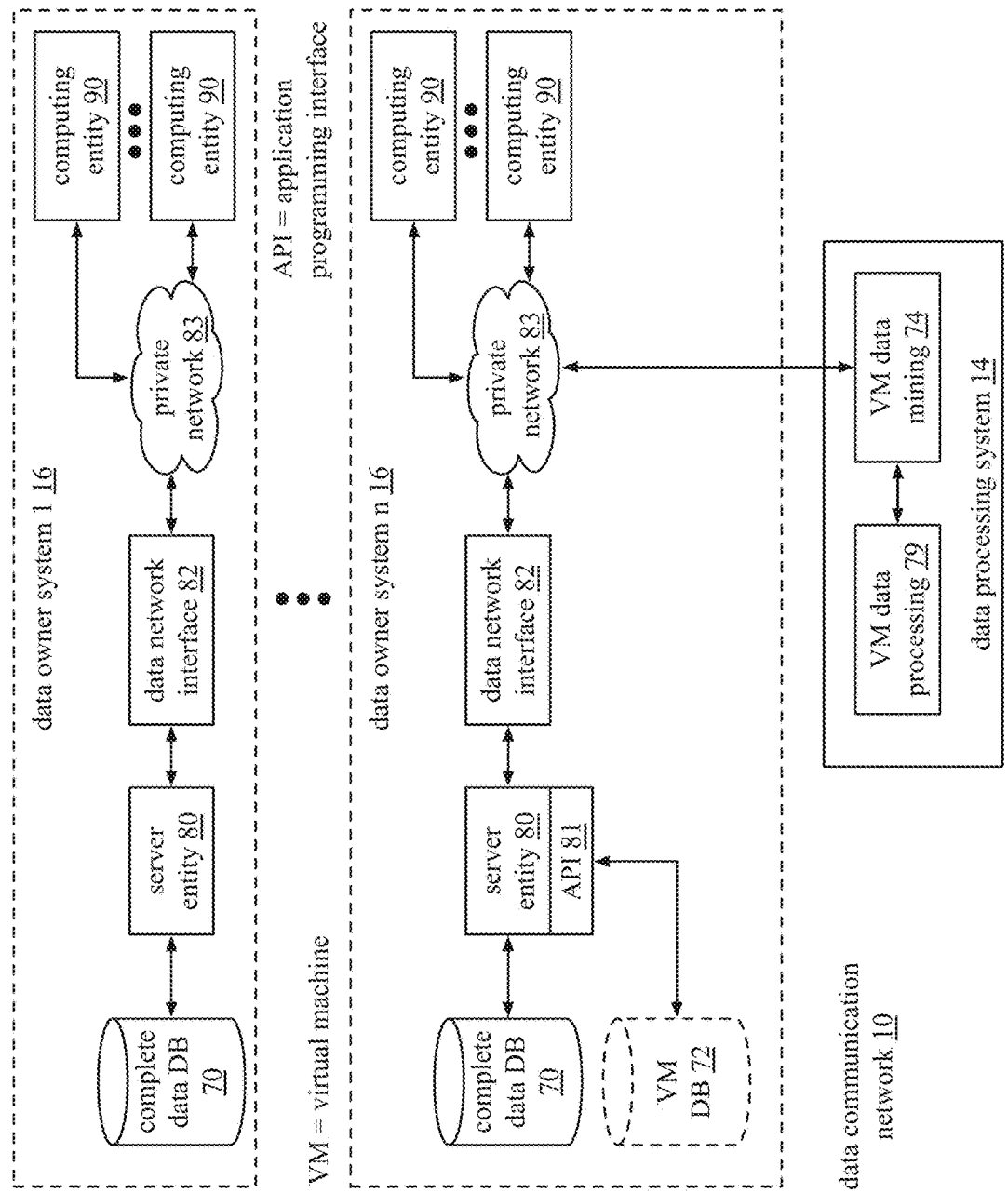
Figure 4B:
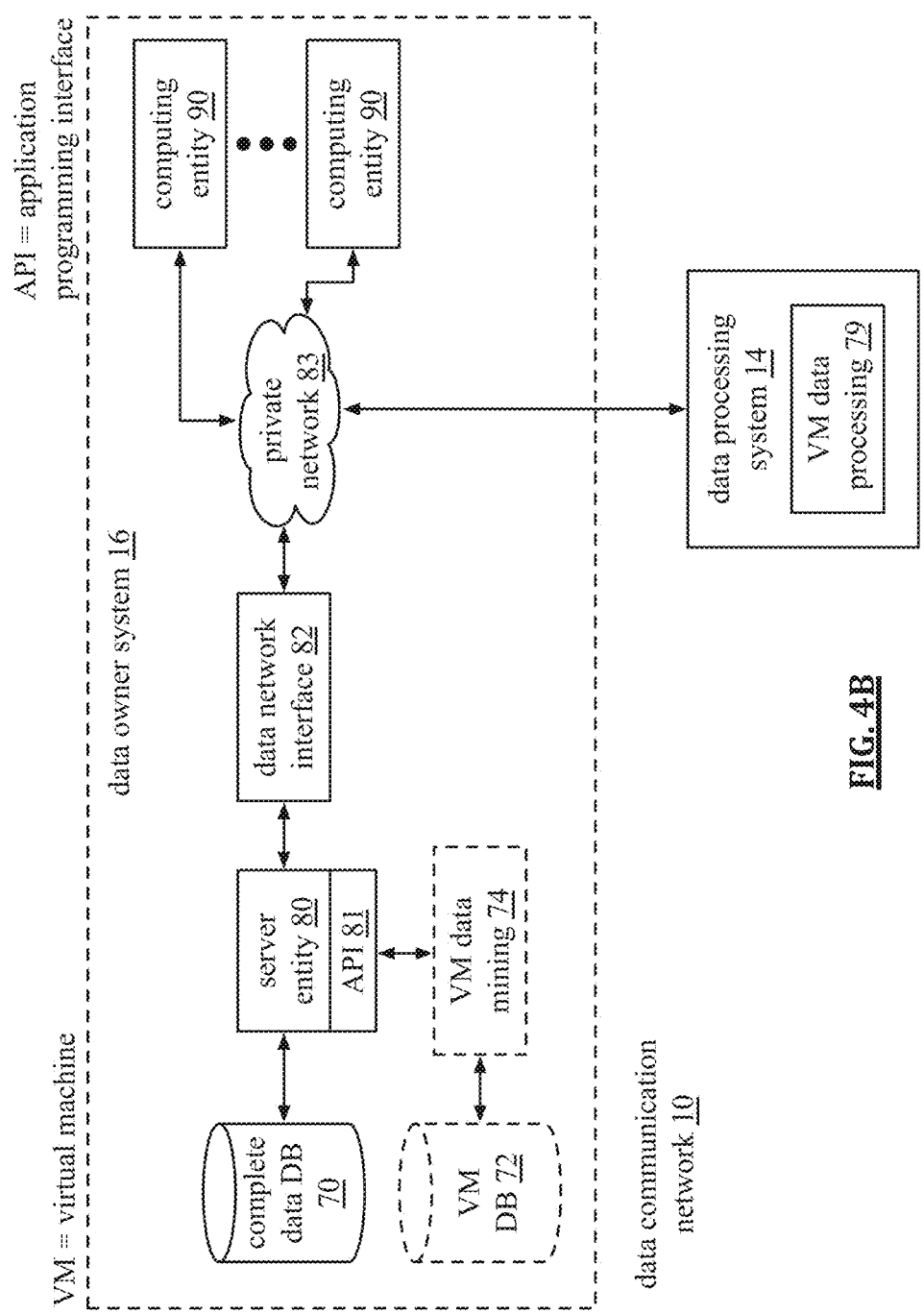
Figure 5:
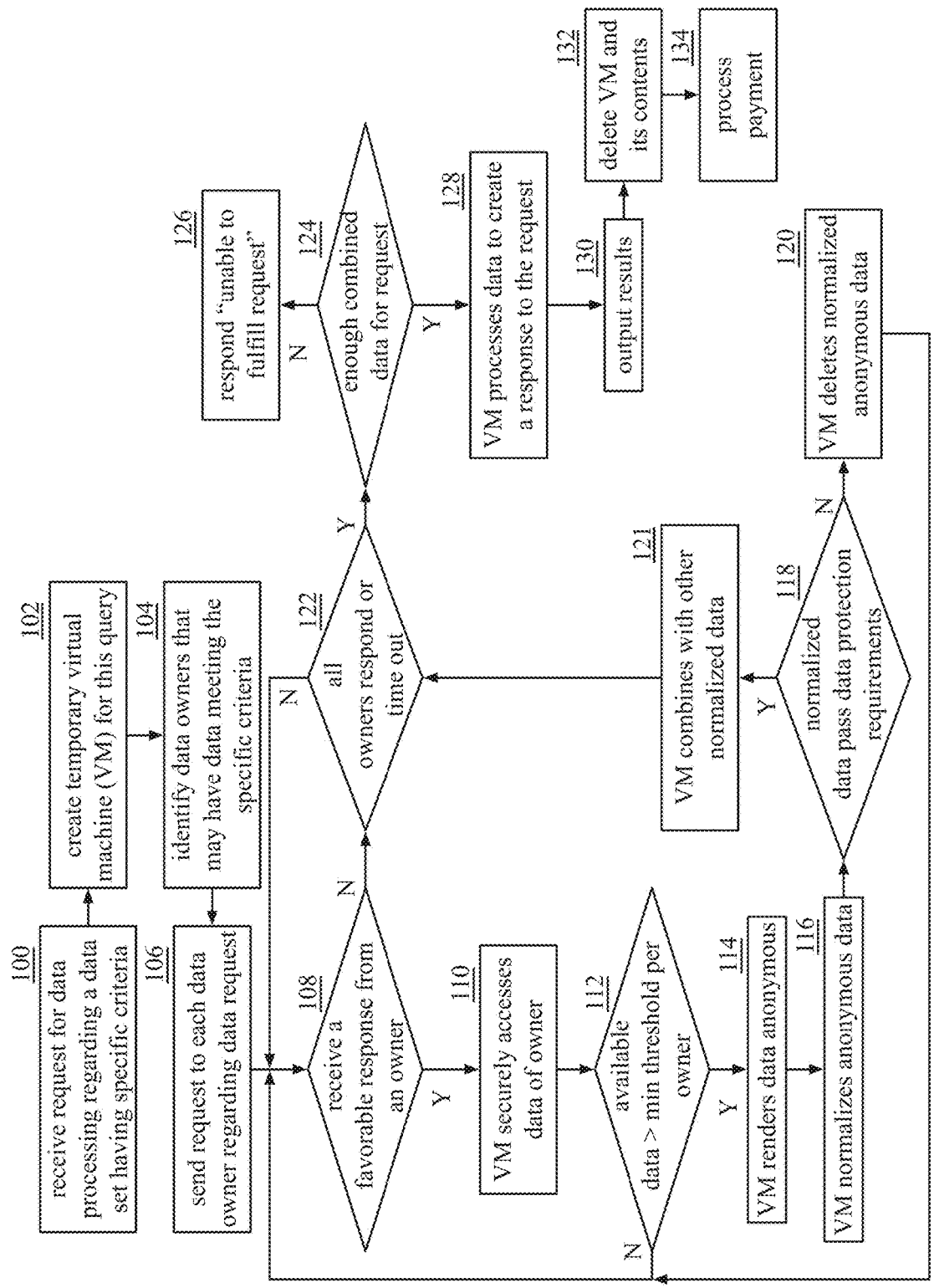
Figure 7A:
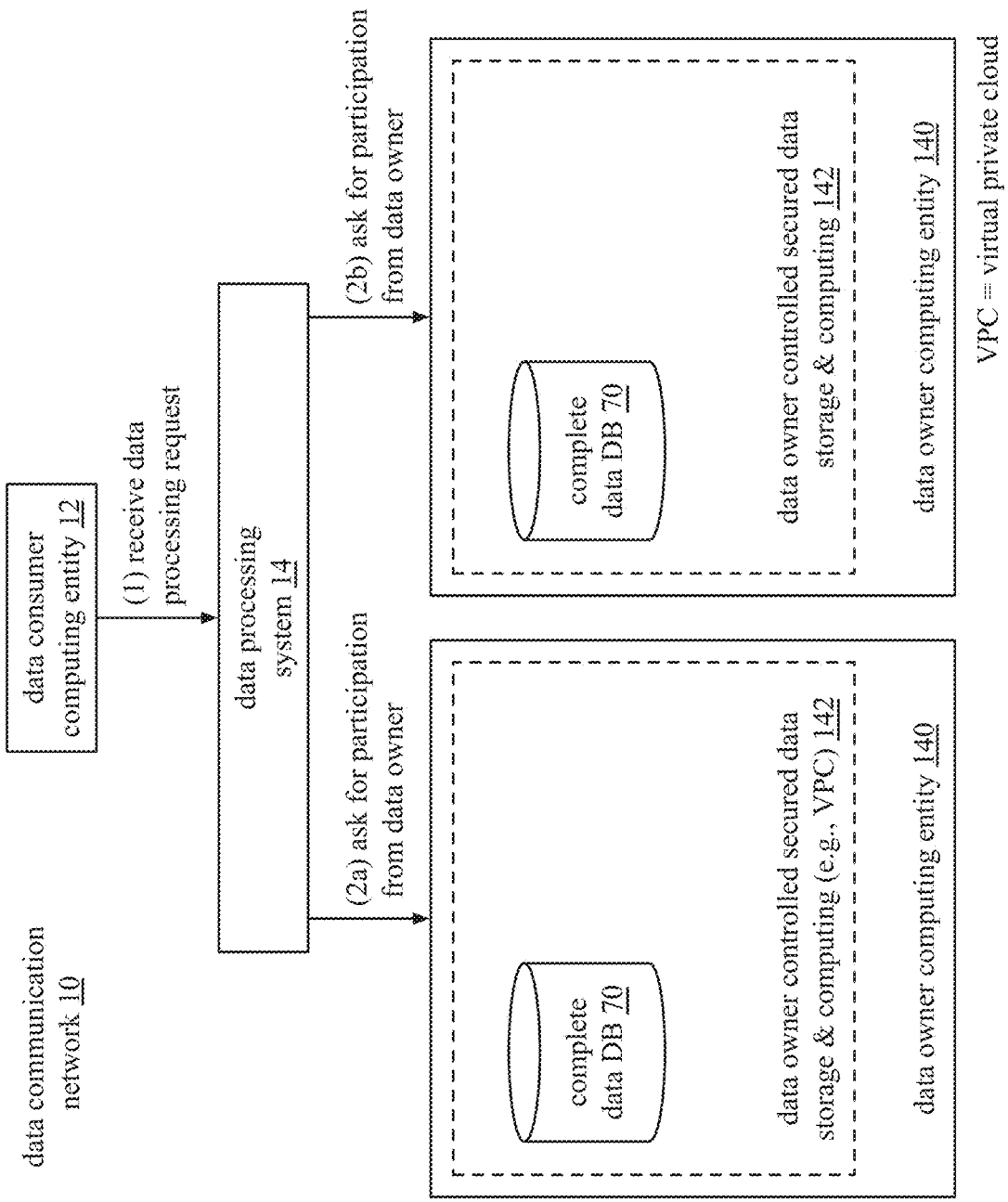
Figure 7B:
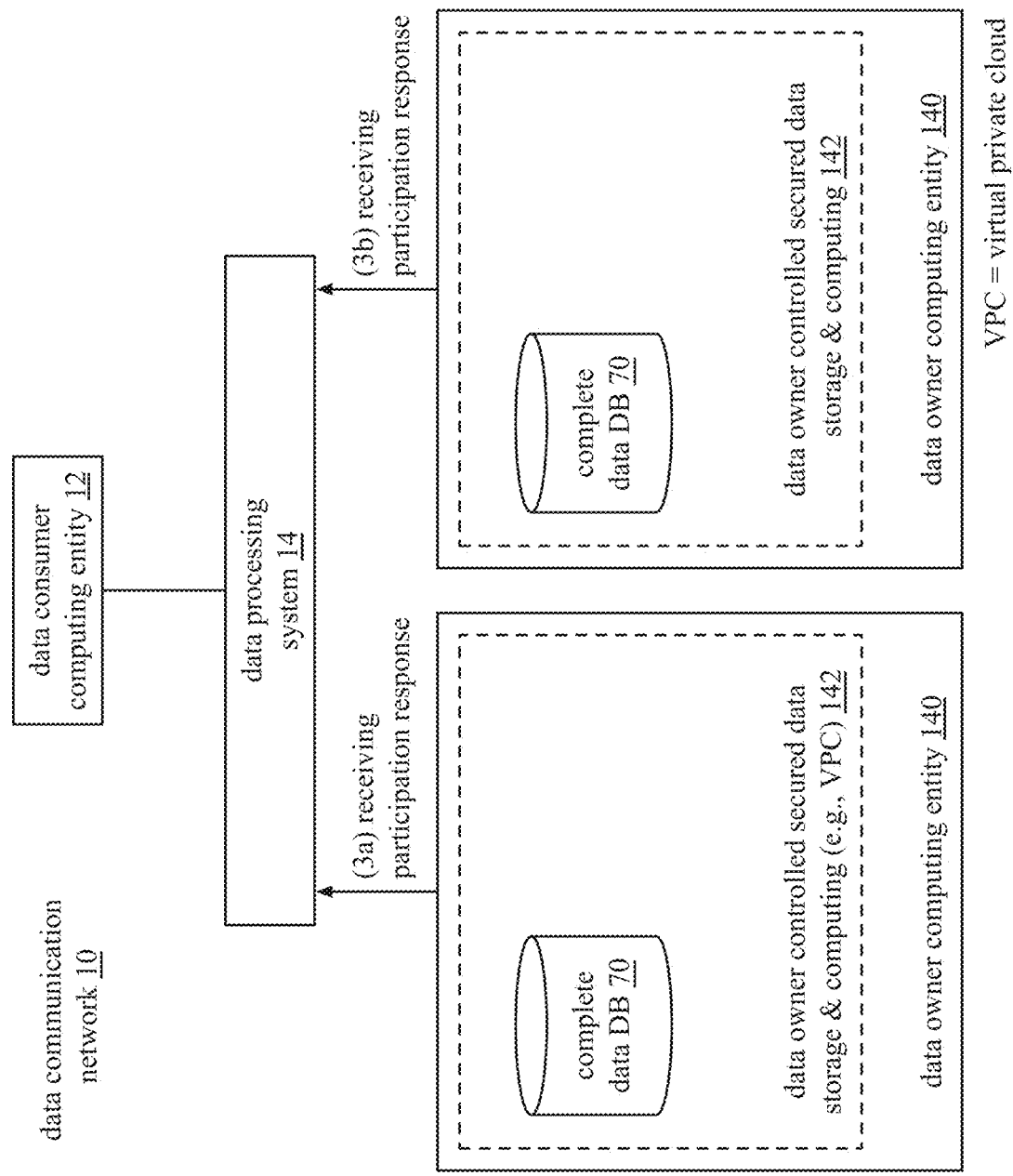
Figure 7C:
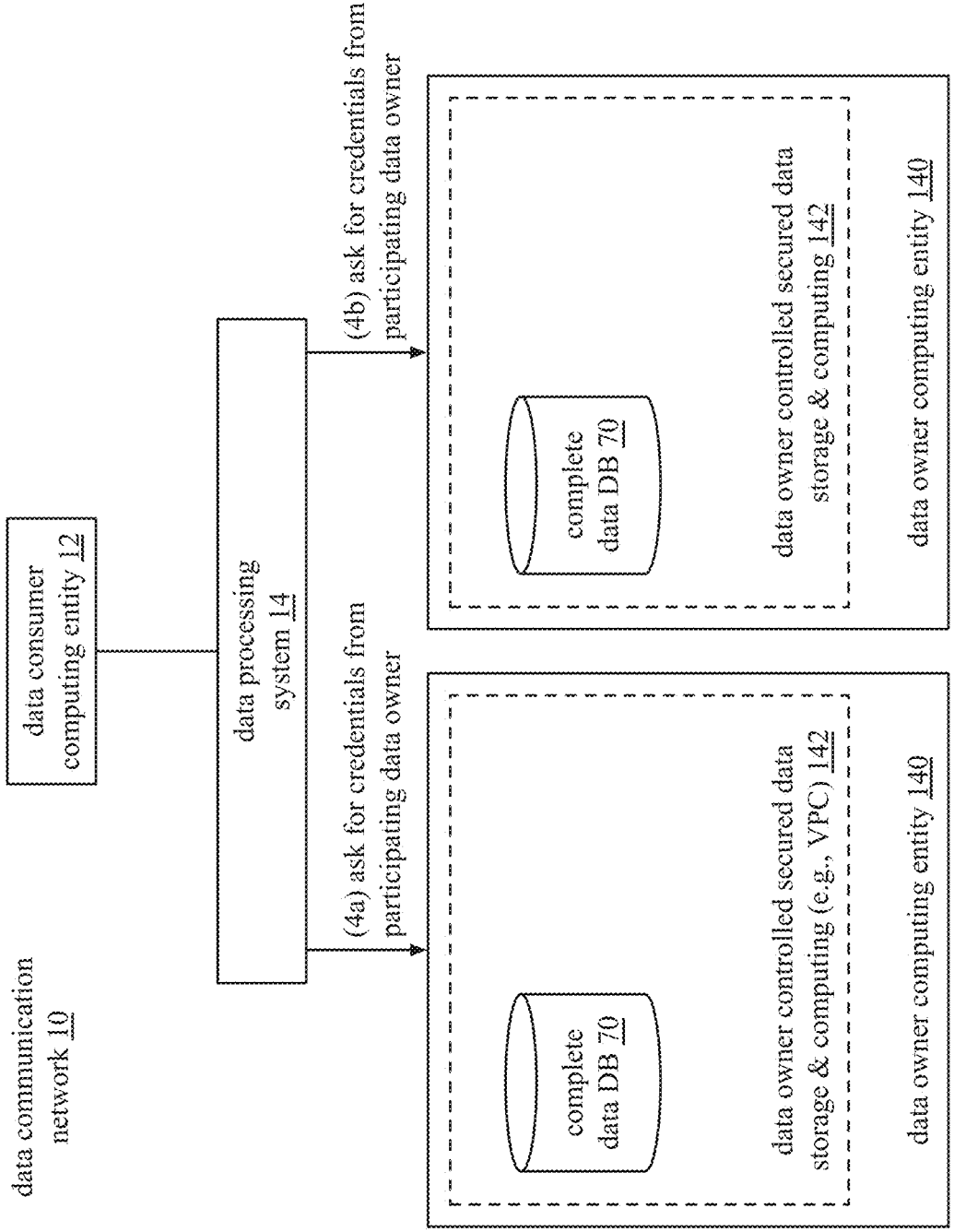
Figure 7D:
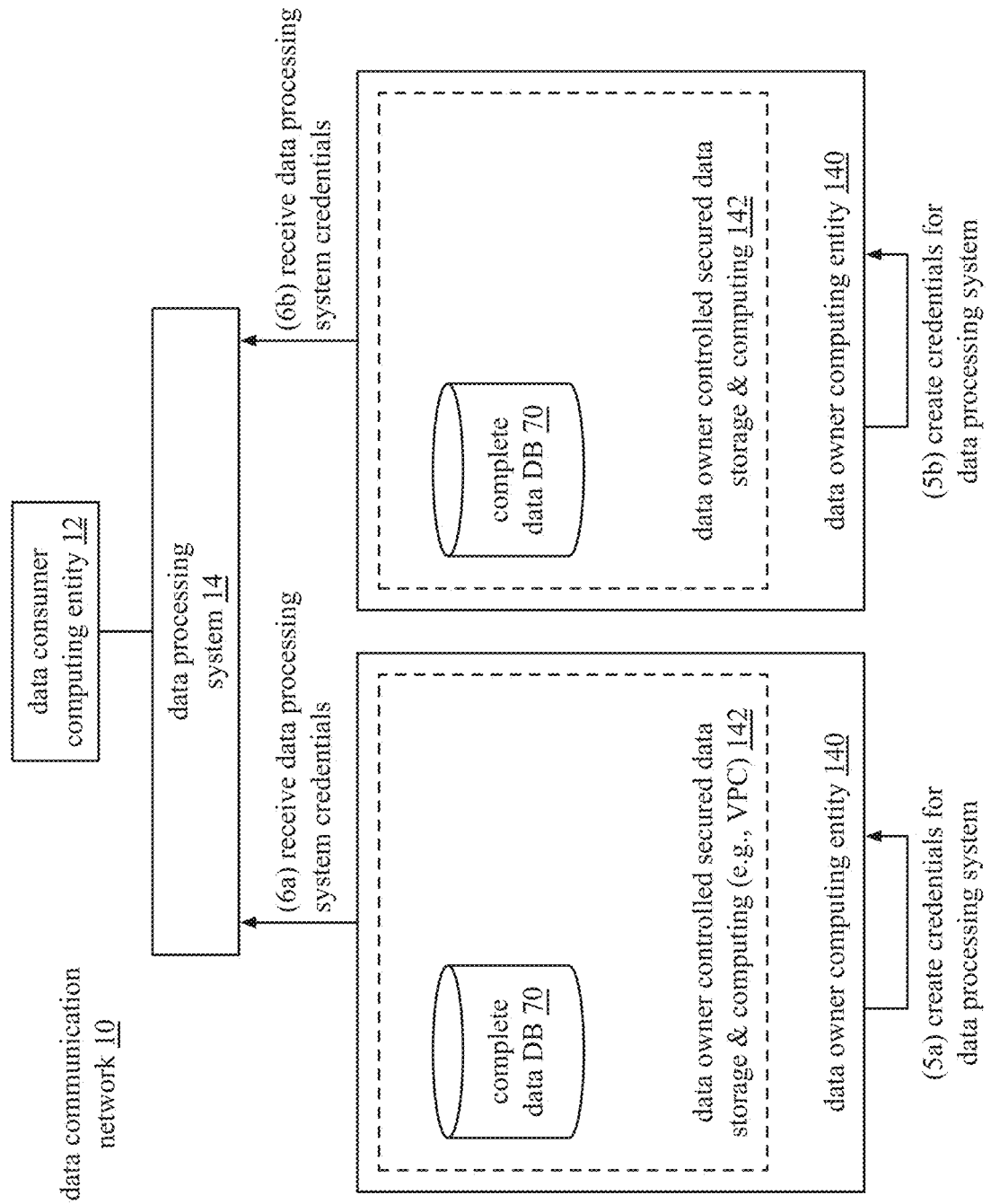
Figure 7E:
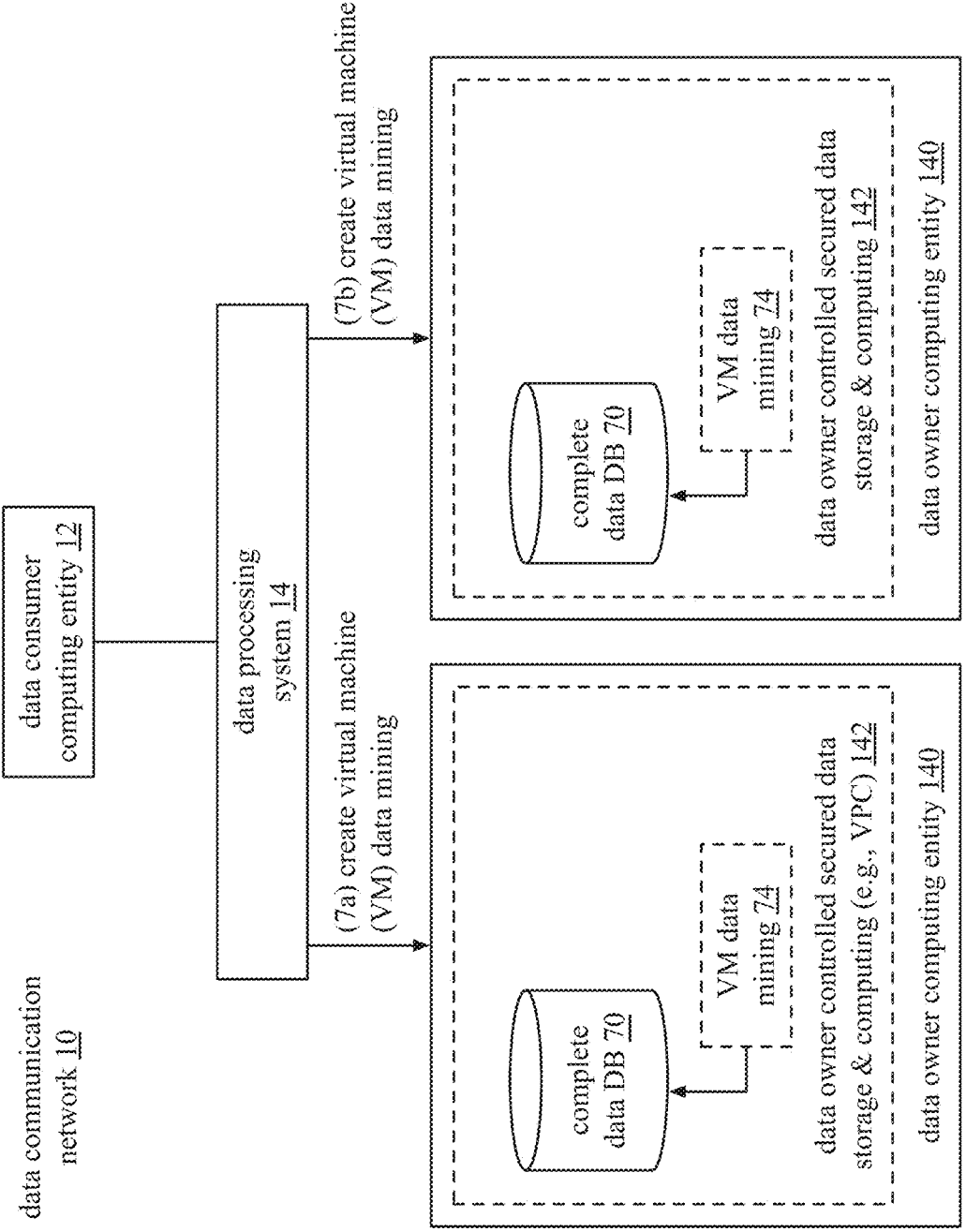
Figure 7F:
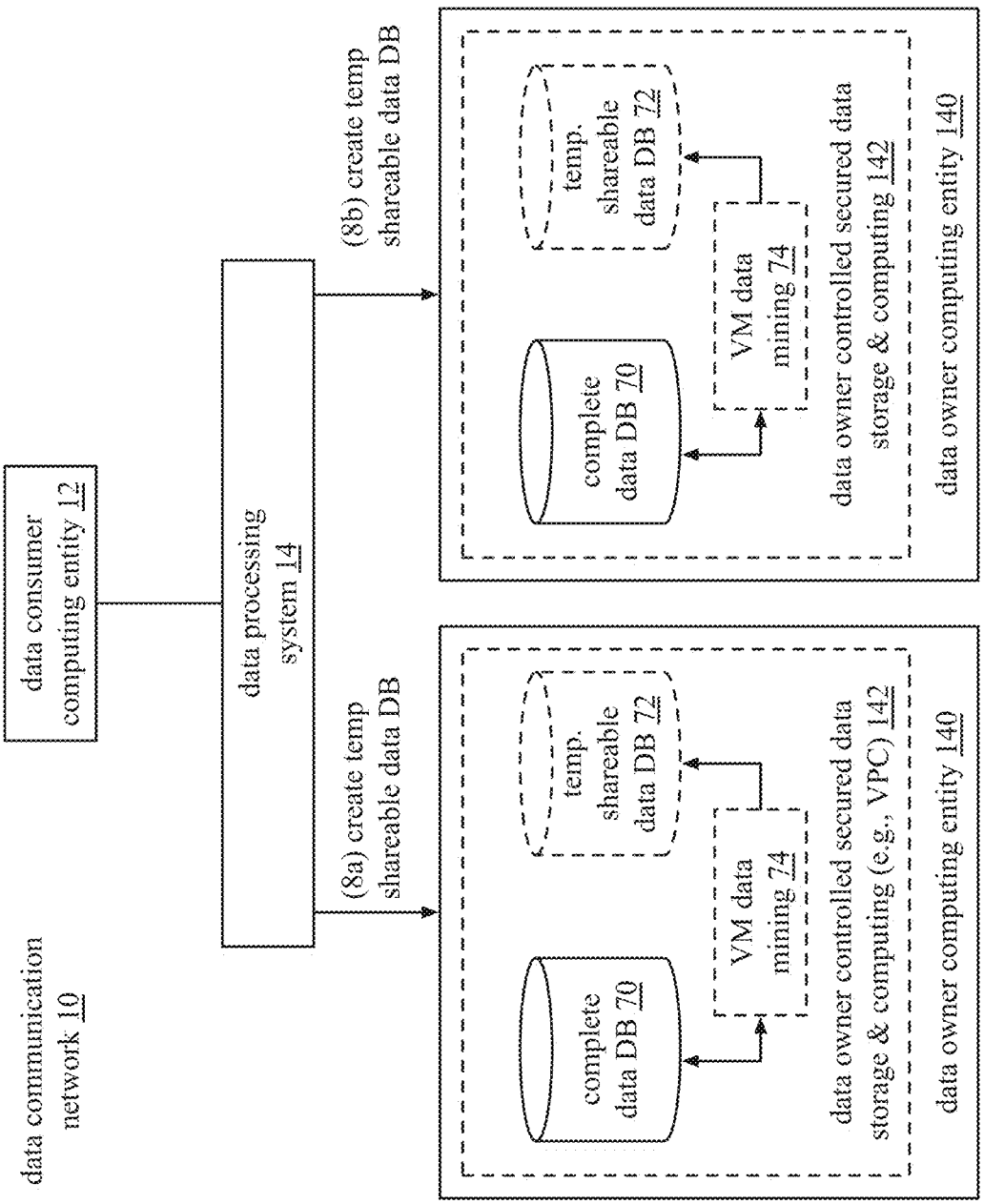
Figure 7G:
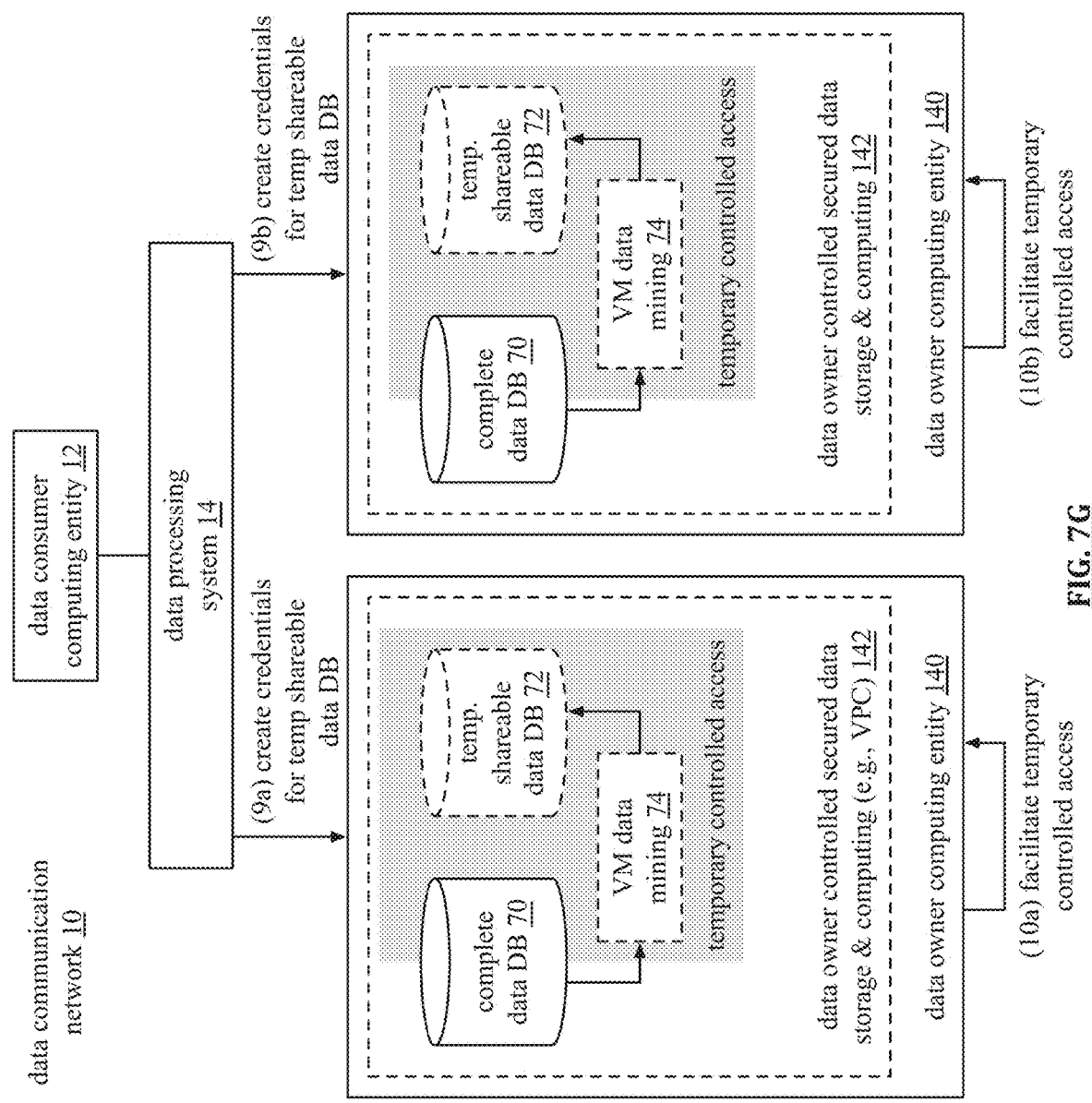
Figure 7H:
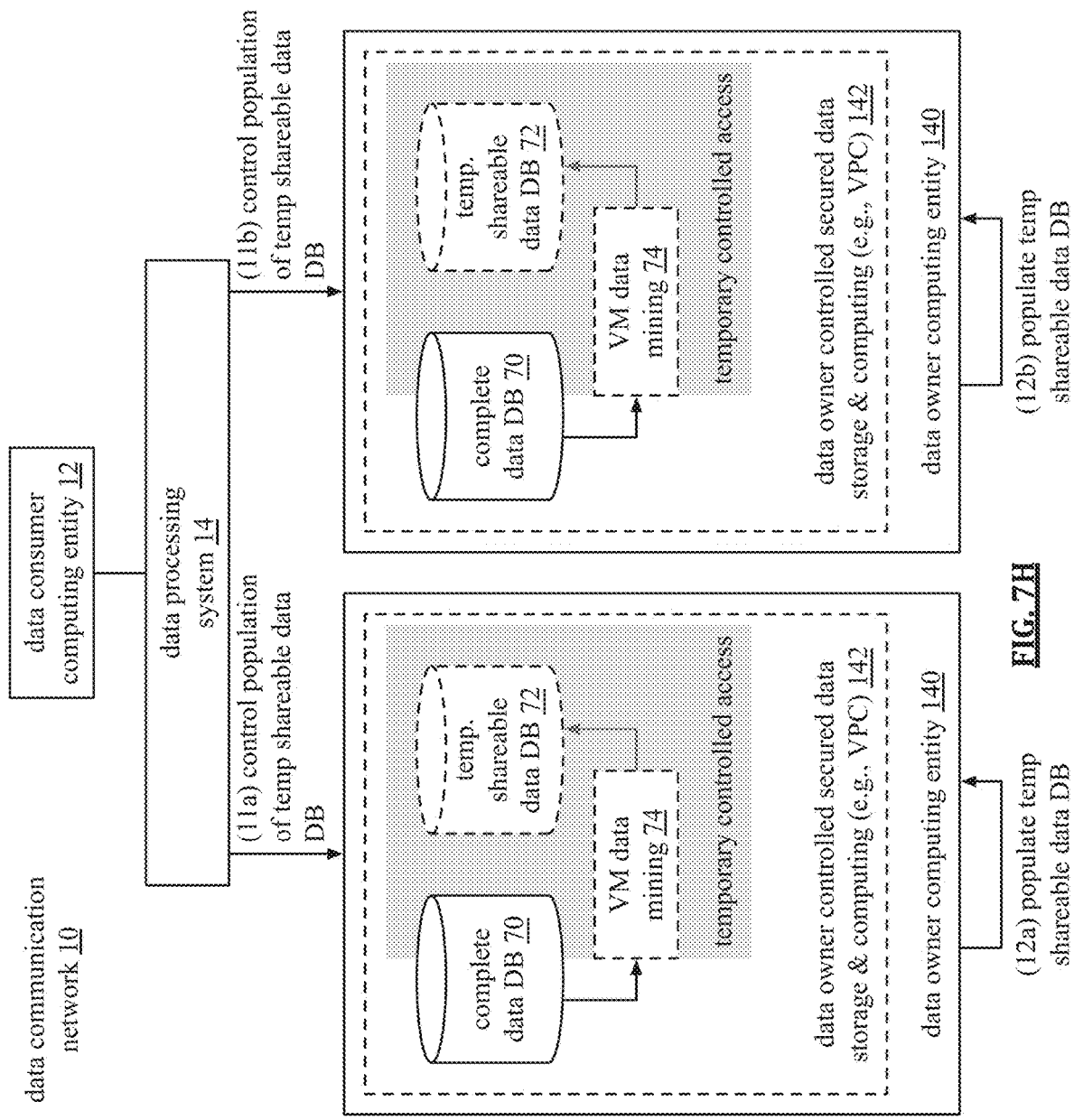
Figure 7I:
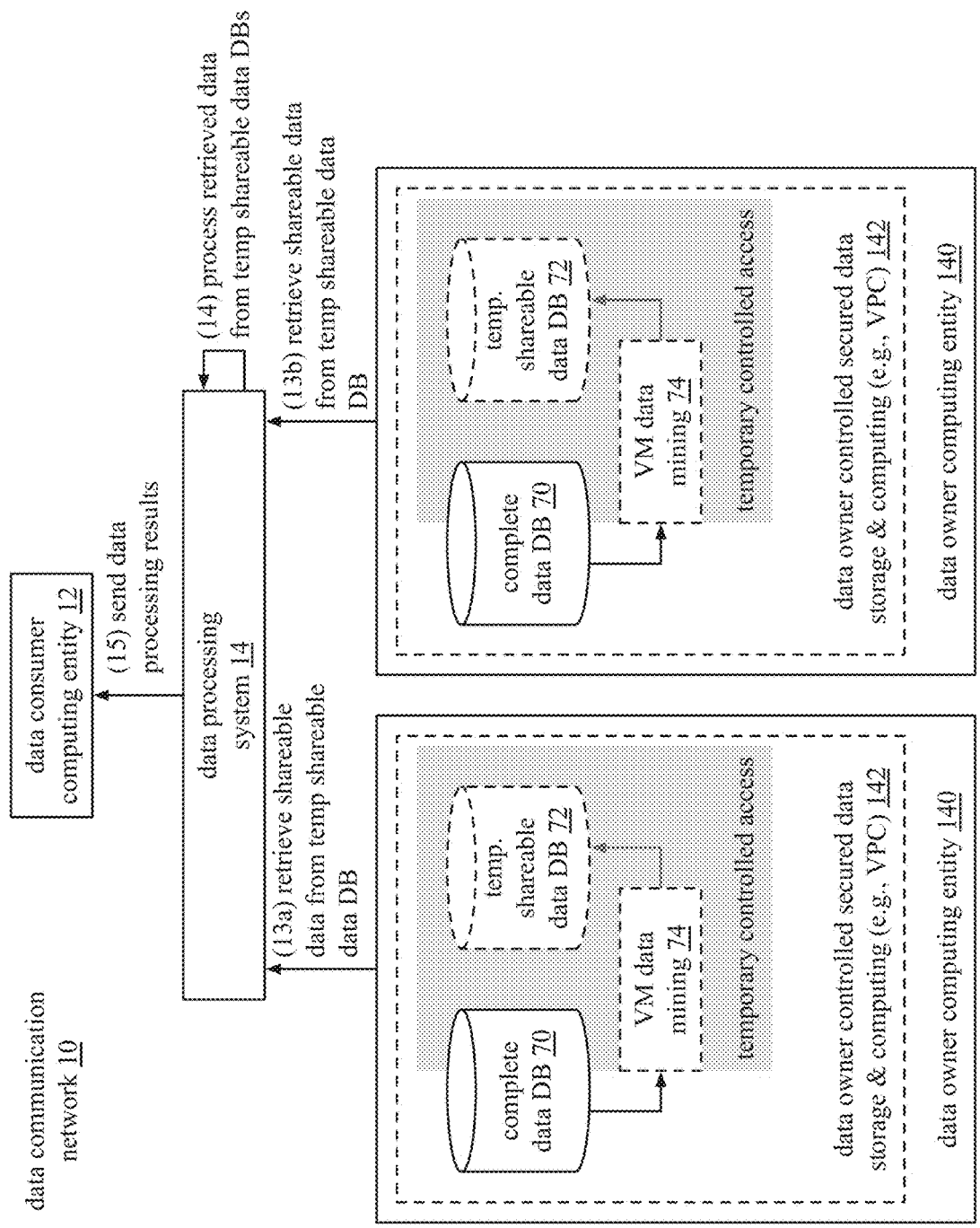
Figure 7I:
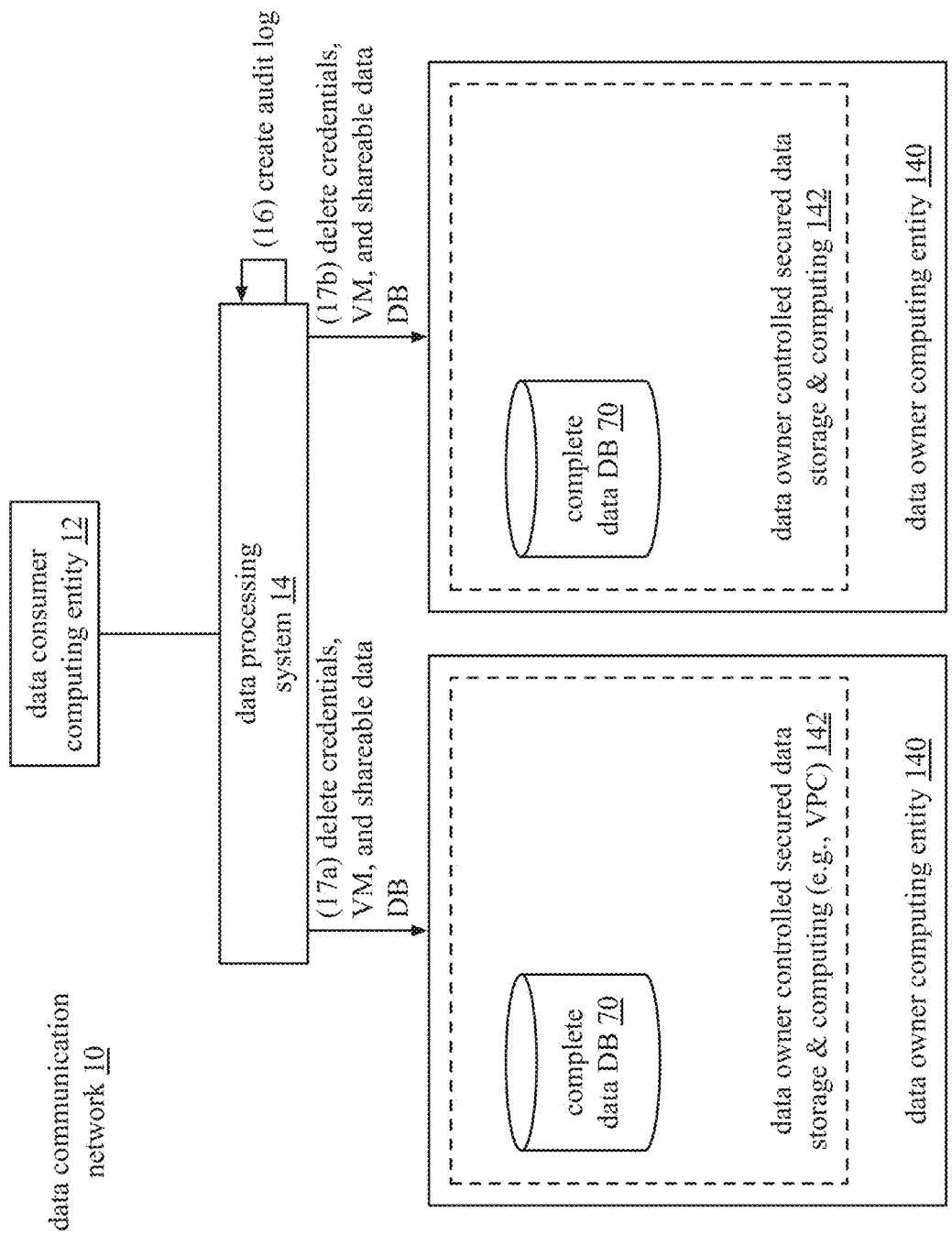
Figure 7K:
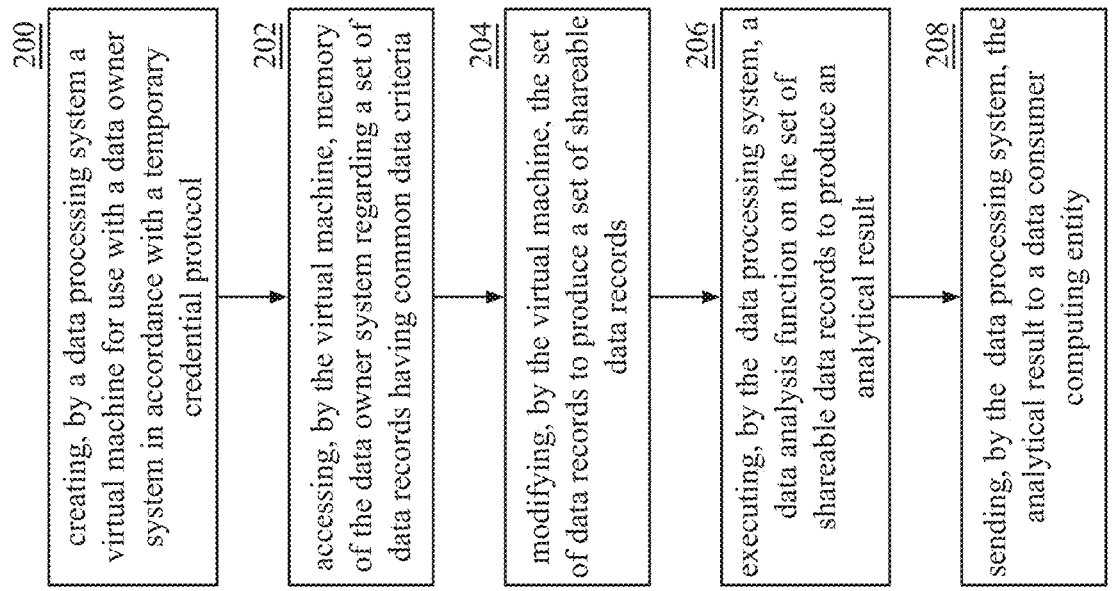
Figure 8A:
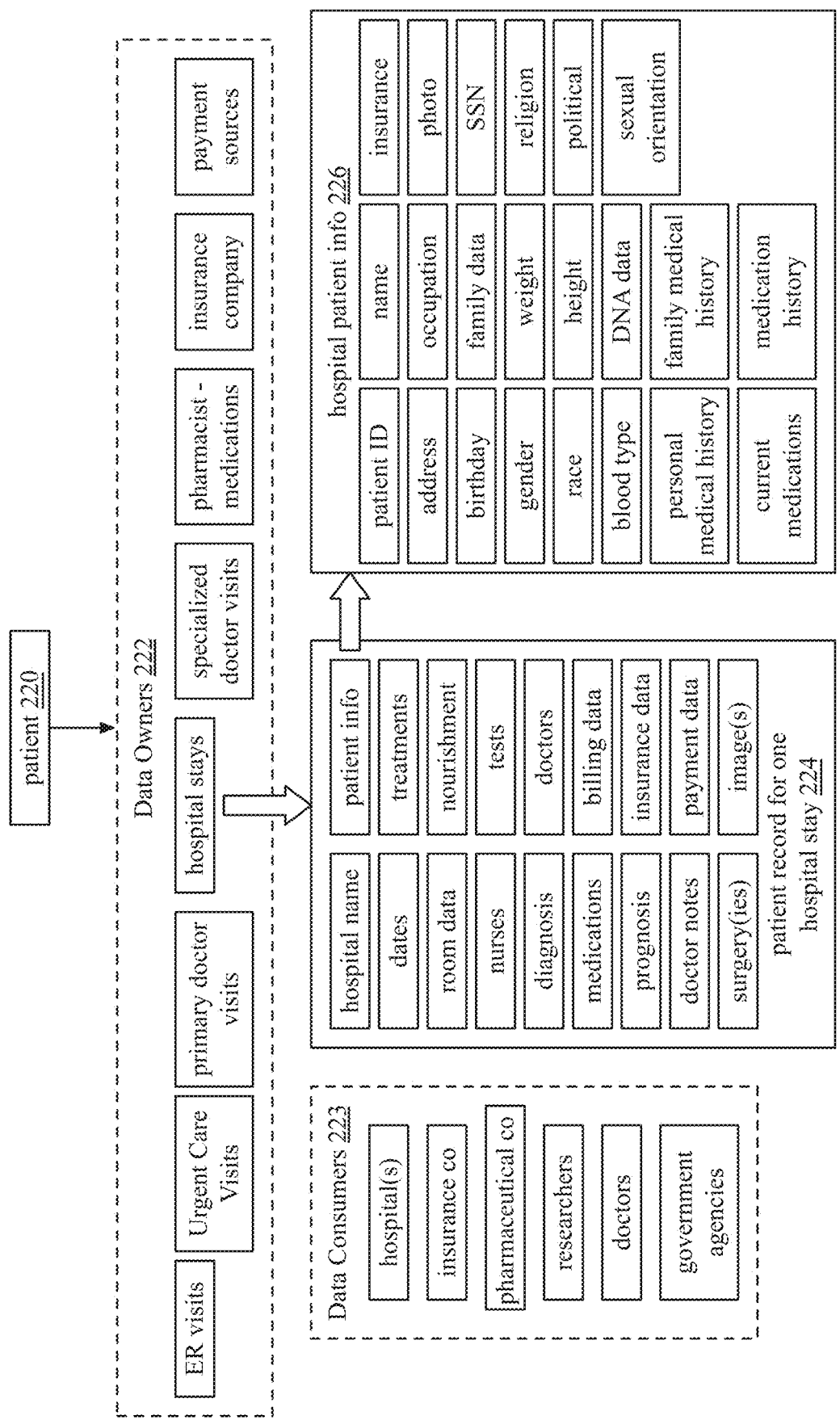
Figure 8B:
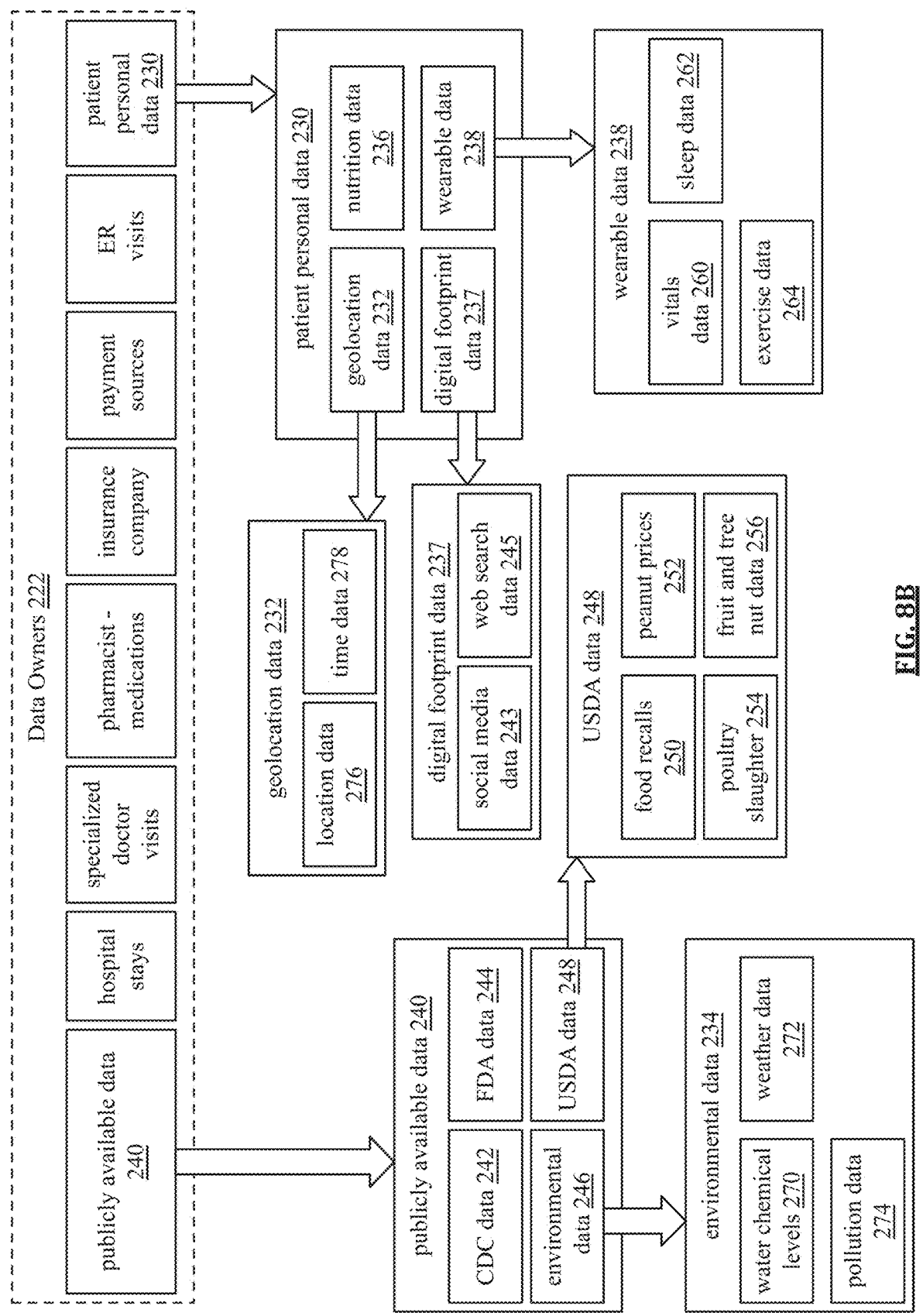
Figure 8C:
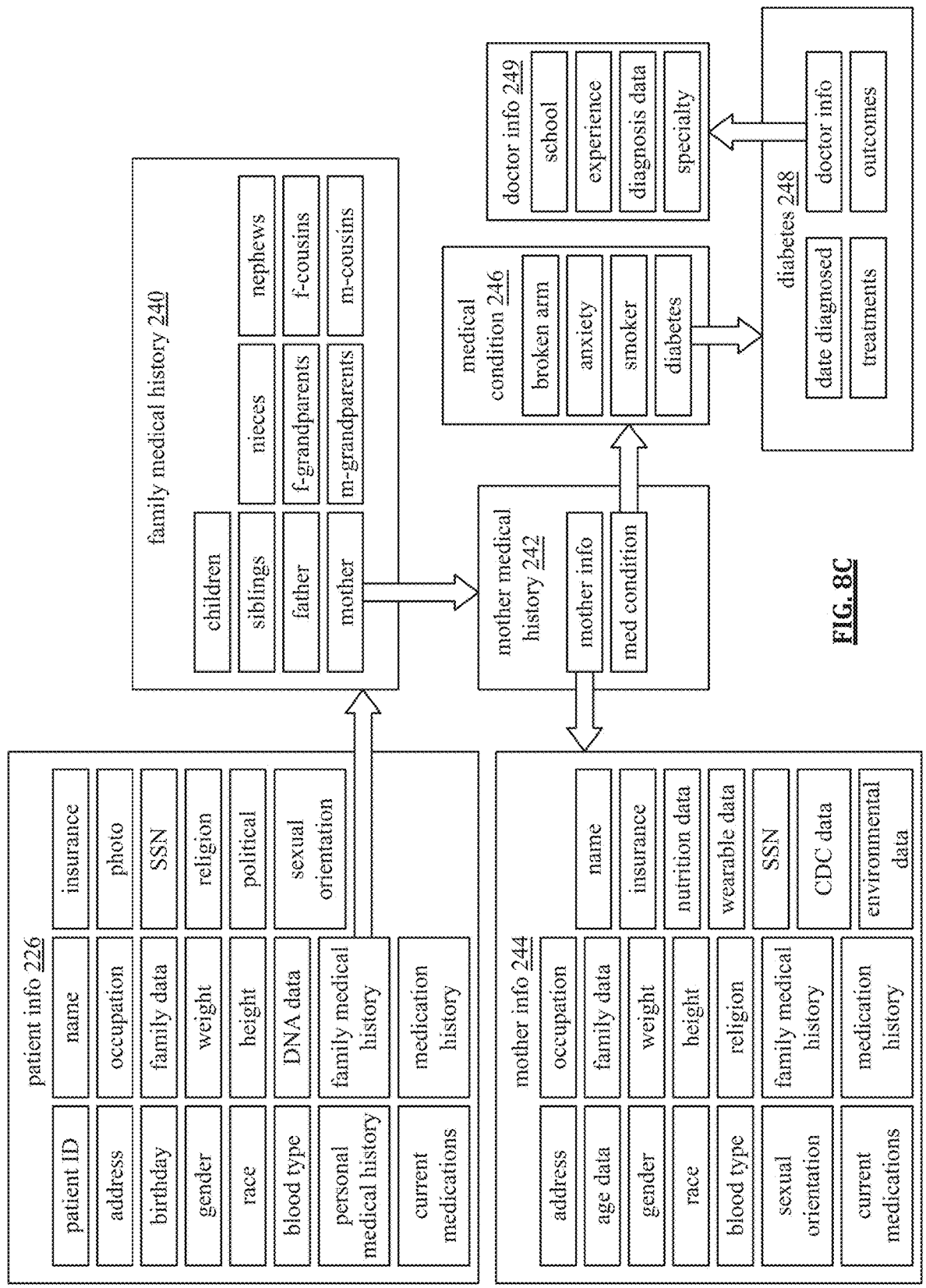
Figure 8D:
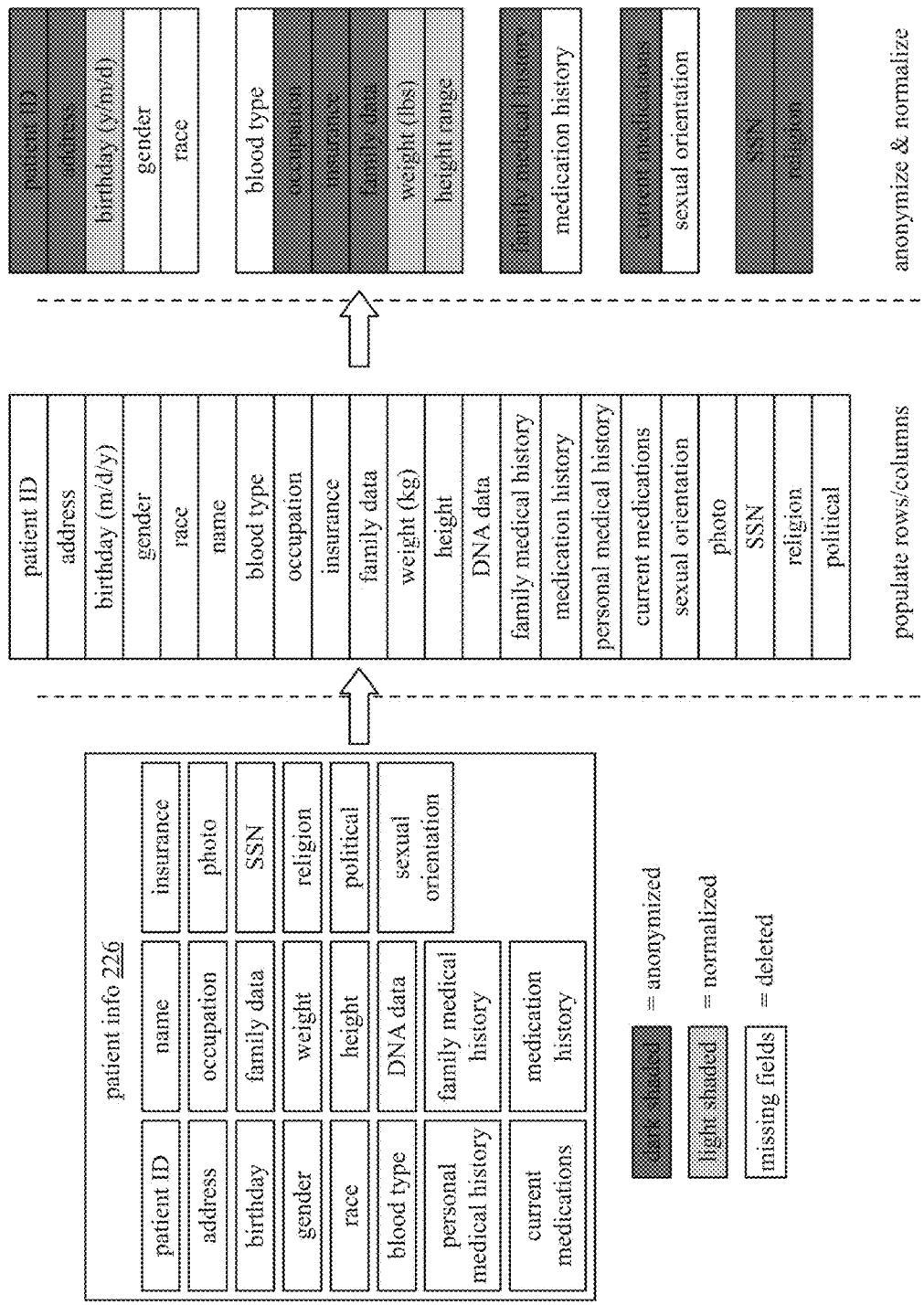
Figure 8E:
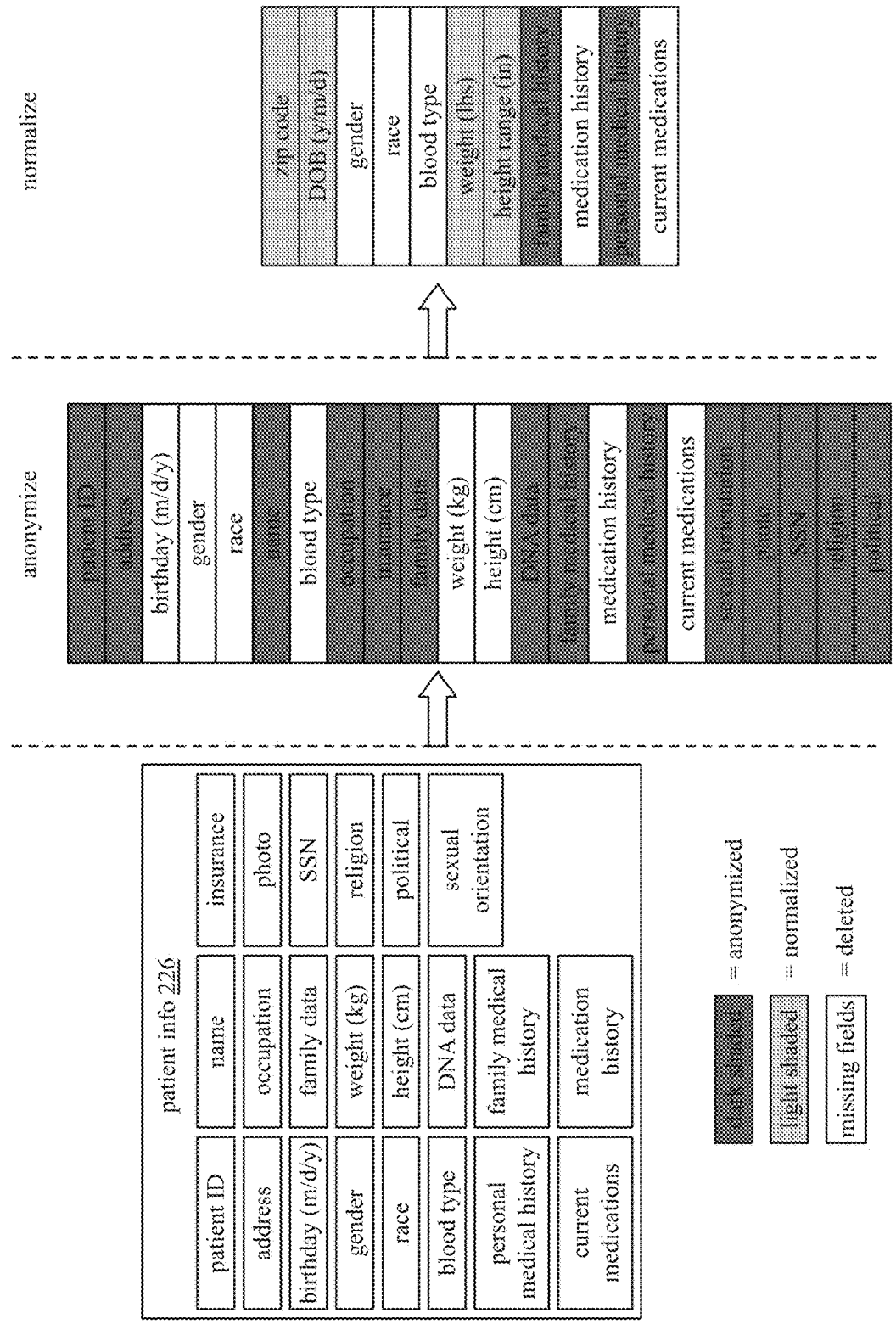
Figure 8F:
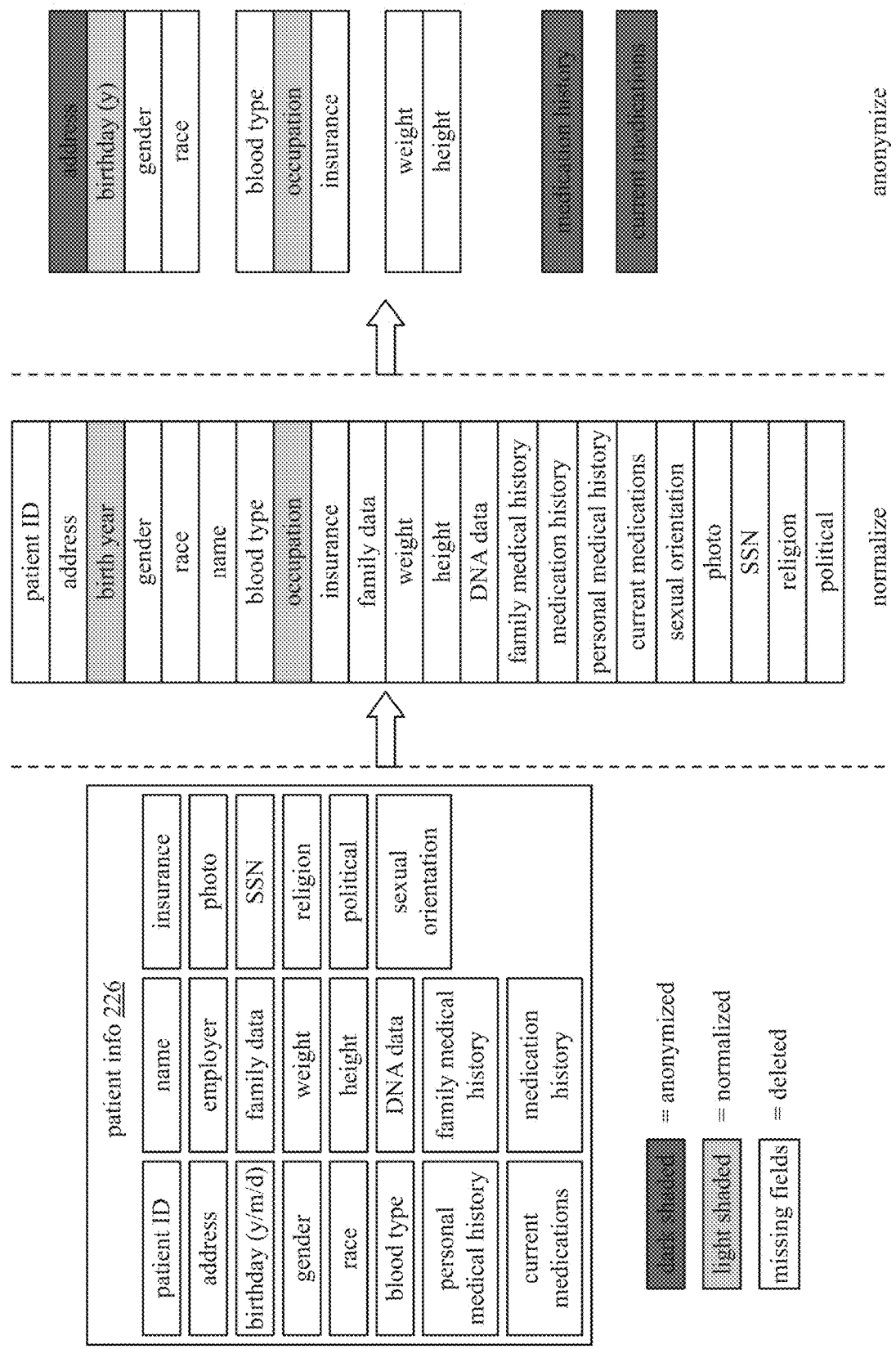
Figure 8G:
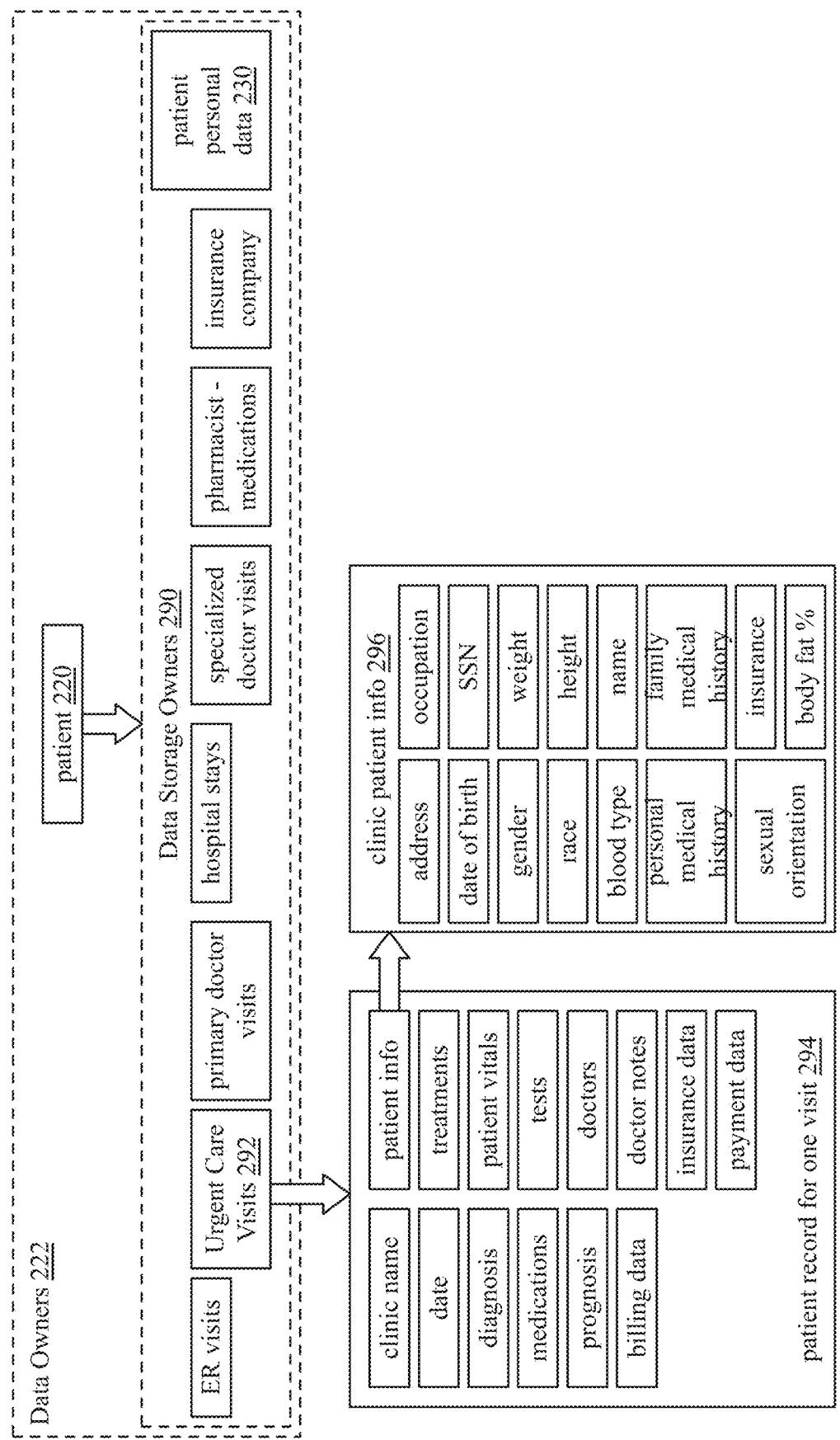
Figures 8H, 8I:
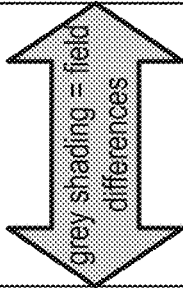
Figure 9A:
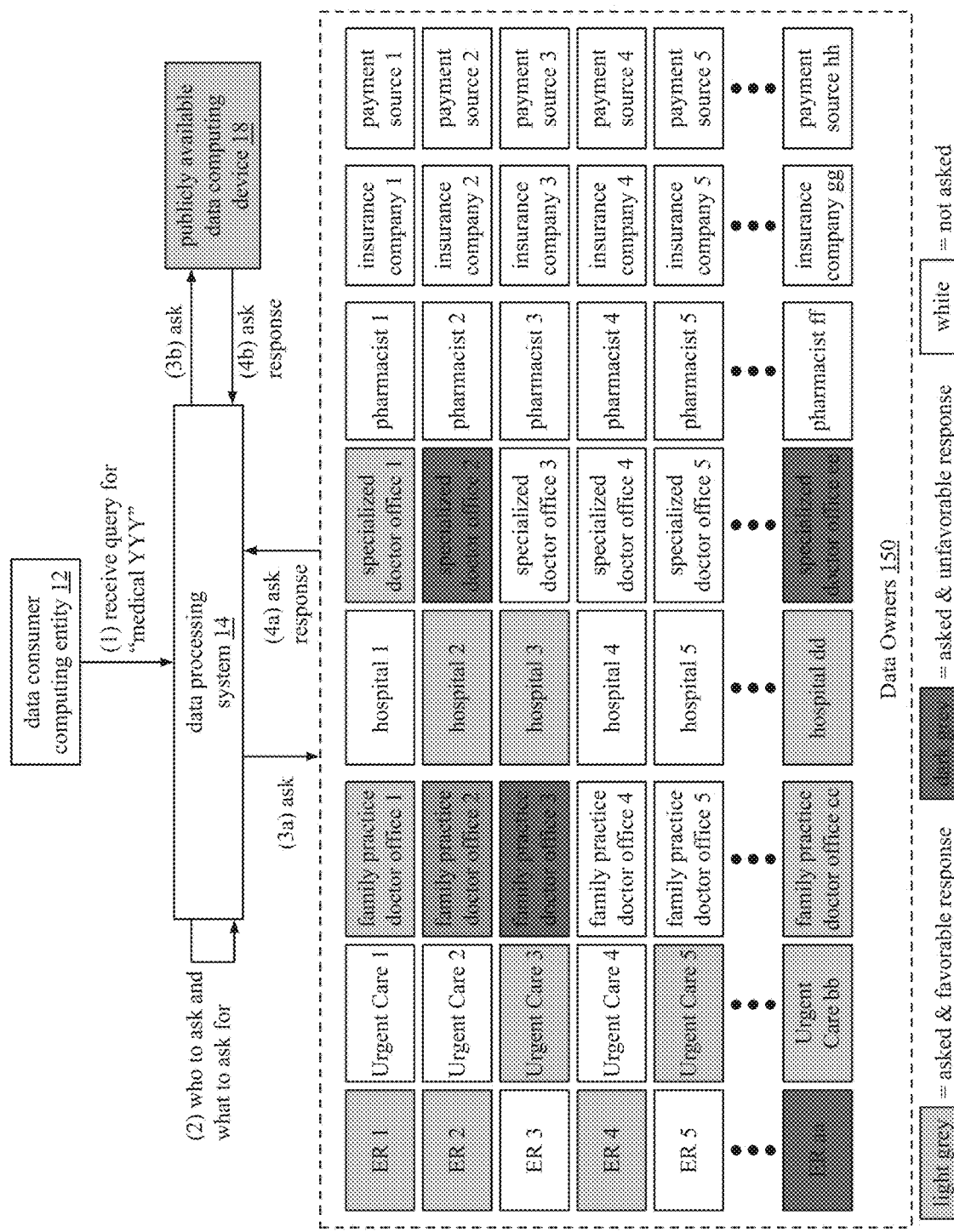
Figure 9B:
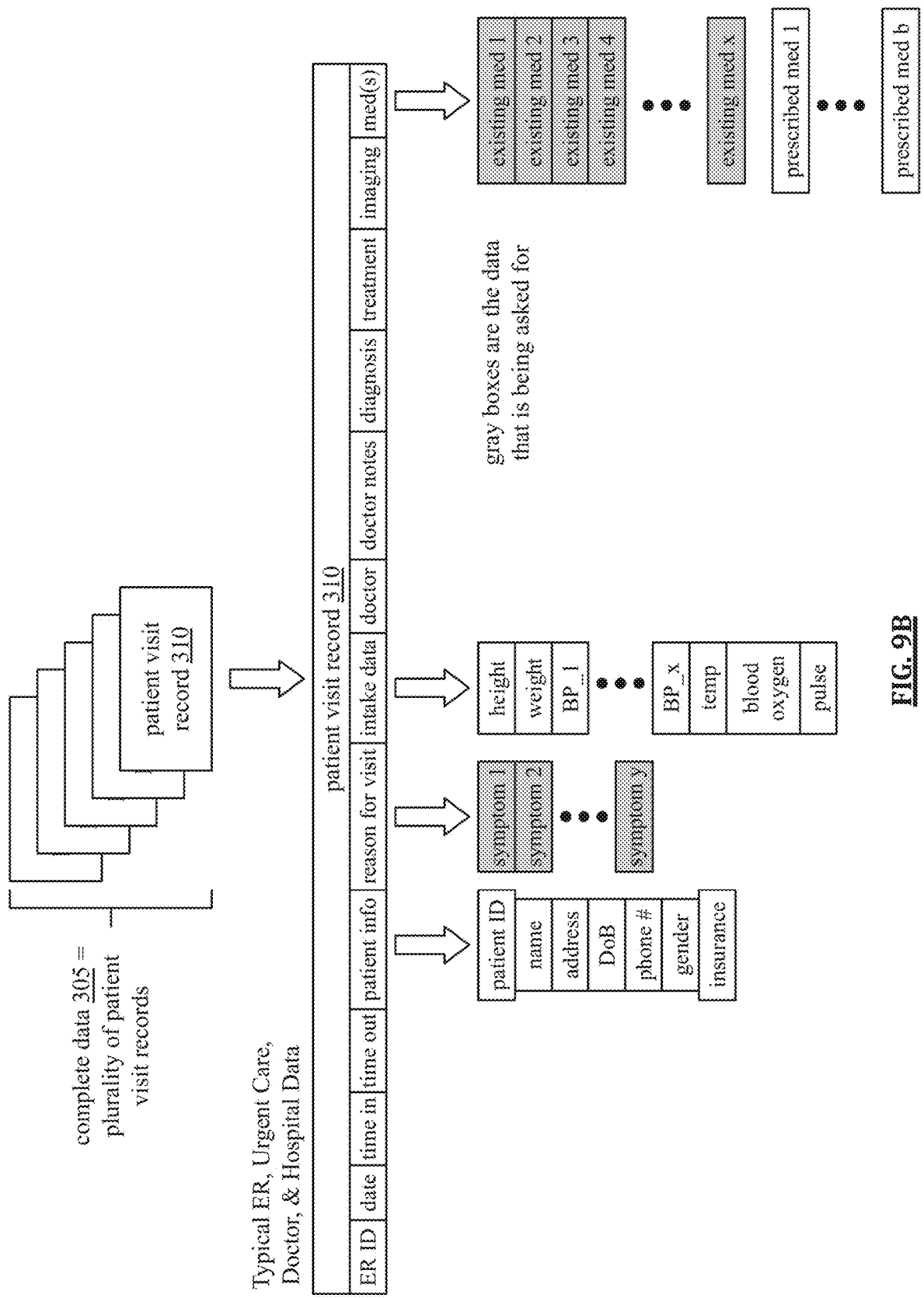
Figure 9C:
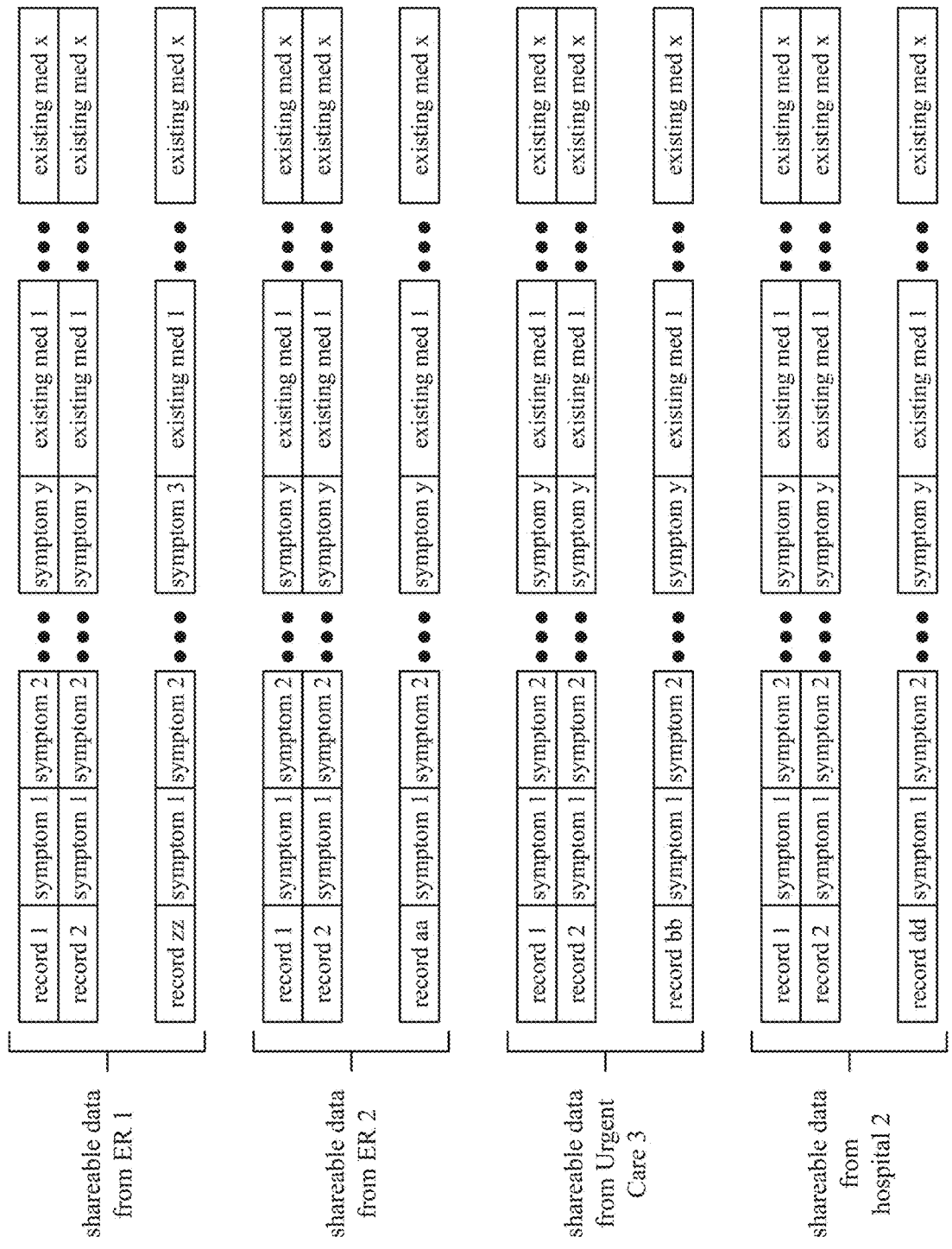
Figure 9F:
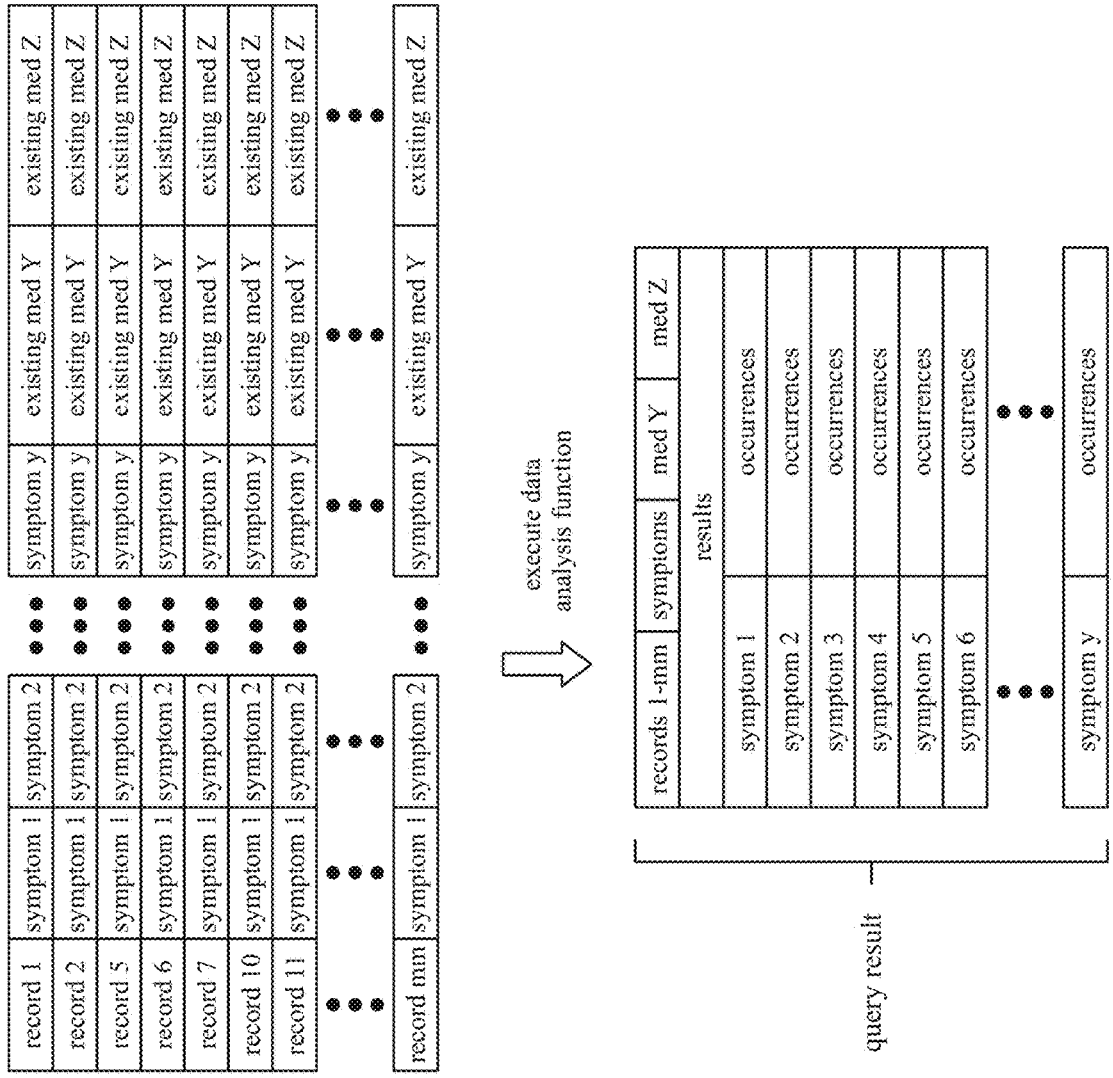
Figure 9G:
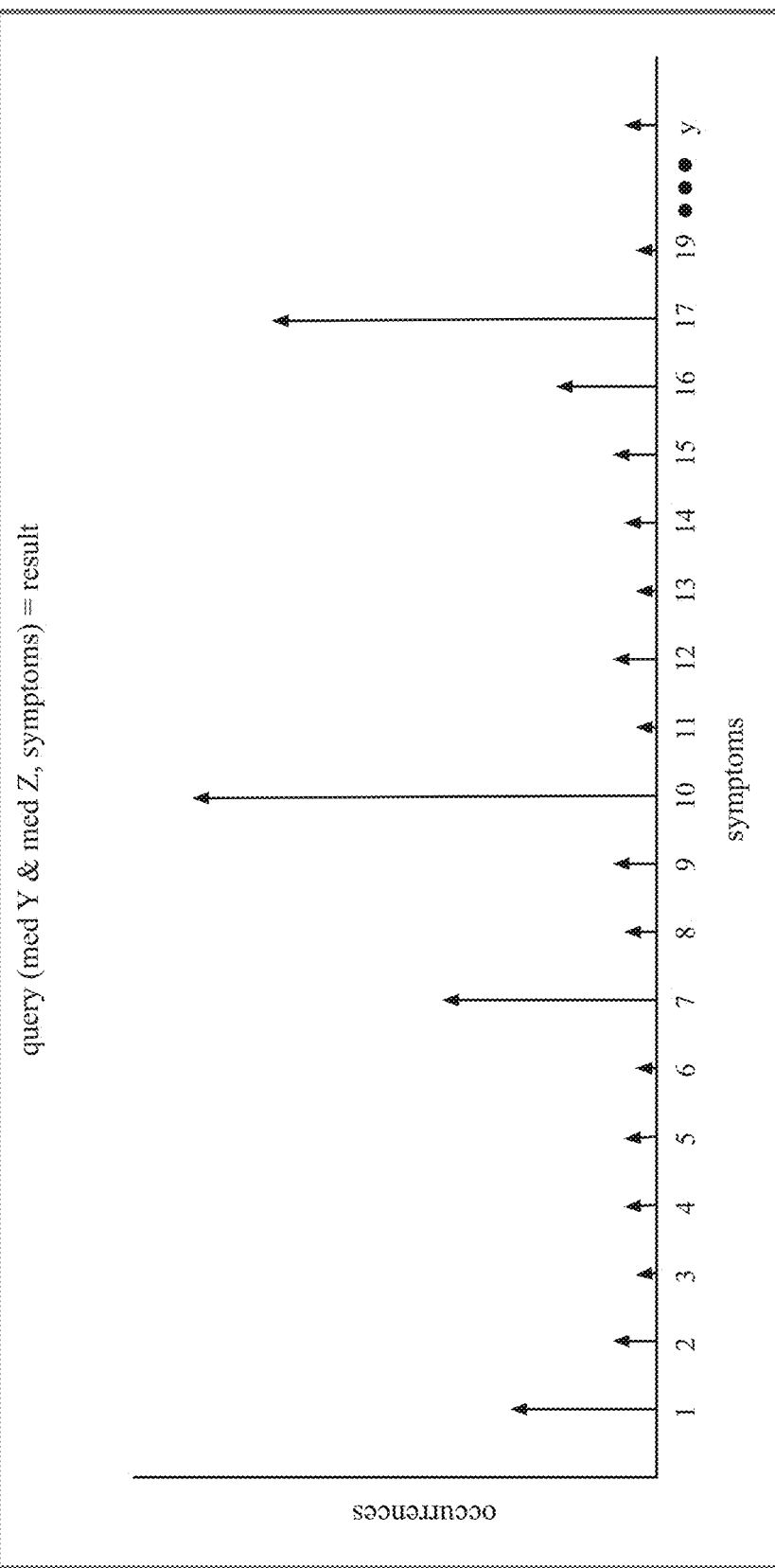

FIGS. 3C-J are schematic block diagrams of other embodiments of a data processing system creating secure data silos and a temporary vault in accordance with the present invention;

FIG. 3K is a schematic block diagram of an embodiment of a temporary vault or container in accordance with the present invention;

FIG. 4A is a schematic block diagram of an embodiment of a data communication network in accordance with the present invention;

FIG. 4B is a schematic block diagram of another embodiment of a data communication network in accordance with the present invention;

FIG. 5 is a logic diagram of an example of a method of securely processing data in a data communication system in accordance with the present invention;

FIGS. 6A-6J are diagrams of an embodiment of an example of processing data access requests utilizing a temporary vault in accordance with the present invention;

FIGS. 7A-J are diagrams of an embodiment of an example of securely processing data in a data communication system in accordance with the present invention;

FIG. 7K is a logic flow diagram of an embodiment of an example of a method of securely processing shareable data in accordance with the present invention;

FIG. 8A is a schematic block diagram of an example of a data record of a data owner system in accordance with the present invention;

FIG. 8B is a schematic block diagram of another example of data records in accordance with the present invention;

FIG. 8C is a schematic block diagram of an example of further data sub-records in accordance with the present invention;

FIG. 8D is a schematic block diagram of an example of anonymizing and normalizing data fields of a data record in accordance with the present invention;

FIG. 8E is a schematic block diagram of another example of anonymizing and normalizing data fields of a data record in accordance with the present invention;

FIG. 8F is a schematic block diagram of another example of modifying data fields of a data record in accordance with the present invention;

FIG. 8G is a schematic block diagram of an example of further data records in accordance with the present invention;

FIG. 8H is a schematic block diagram of an example of inconsistent data records in accordance with the present invention;

FIG. 8I is a schematic block diagram of an example of merging data records in accordance with the present invention;

Figures 9D, 9E:
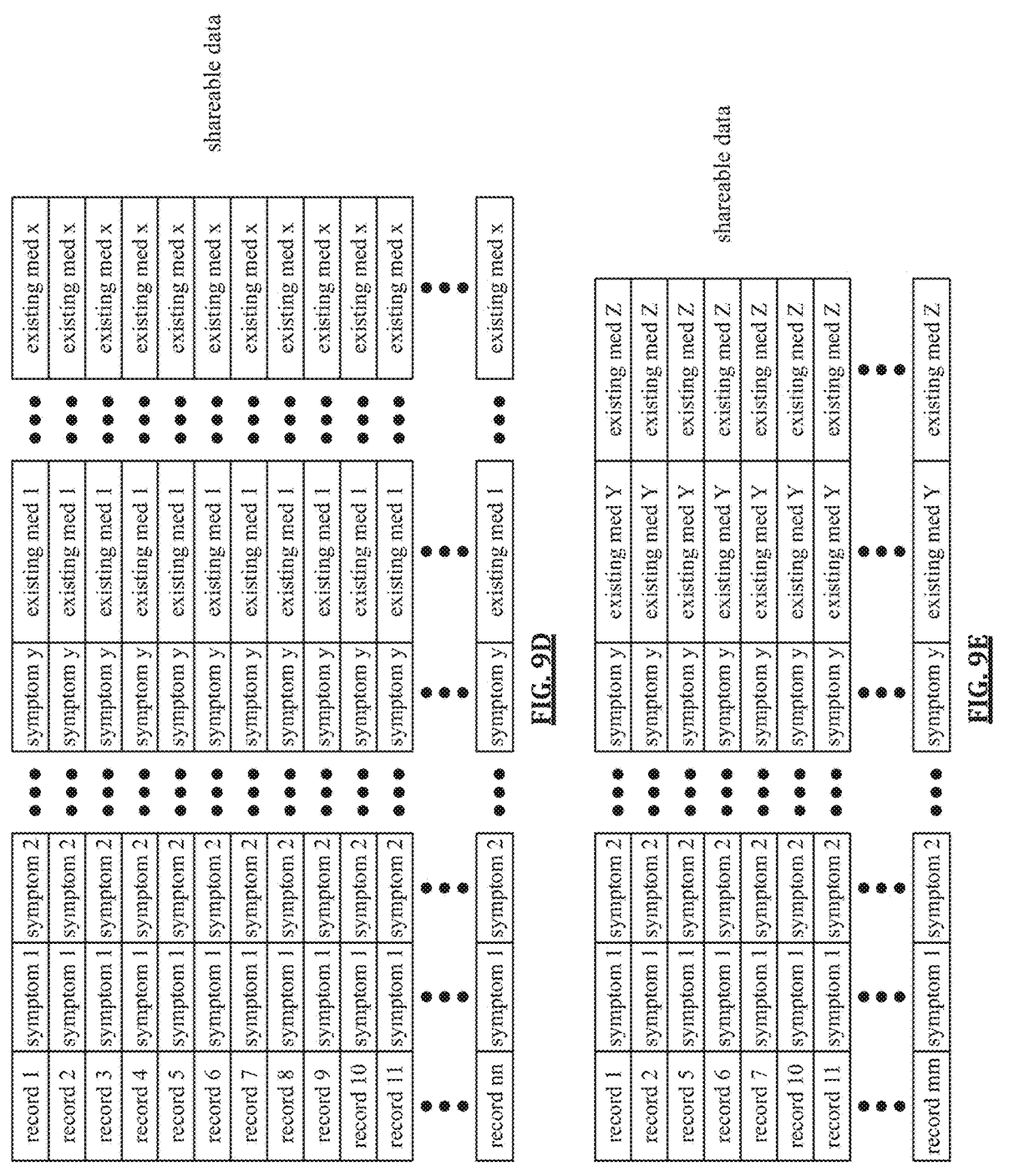

FIG. 9A is a schematic block diagram of an example of securely processing shareable data in response to a query in accordance with the present invention;

FIG. 9B is a block diagram of an example of complete data associated with the query in accordance with the present invention;

FIG. 9C is a block diagram of an example of a plurality of shareable data in accordance with the present invention;

FIG. 9D is a block diagram illustrating an example of a data processing system combining the plurality of shareable data in accordance with the present invention;

FIG. 9E is a block diagram of an example of a modified shareable data table in accordance with the present invention;

FIG. 9F is a block diagram illustrating an example of executing a data analysis function on the shareable data table to produce a query result in accordance with the present invention; and FIG. 9G is graphical diagram illustrating the results of the query in accordance with the present invention.

DETAILED DESCRIPTION OF THE INVENTION

Figure 1:
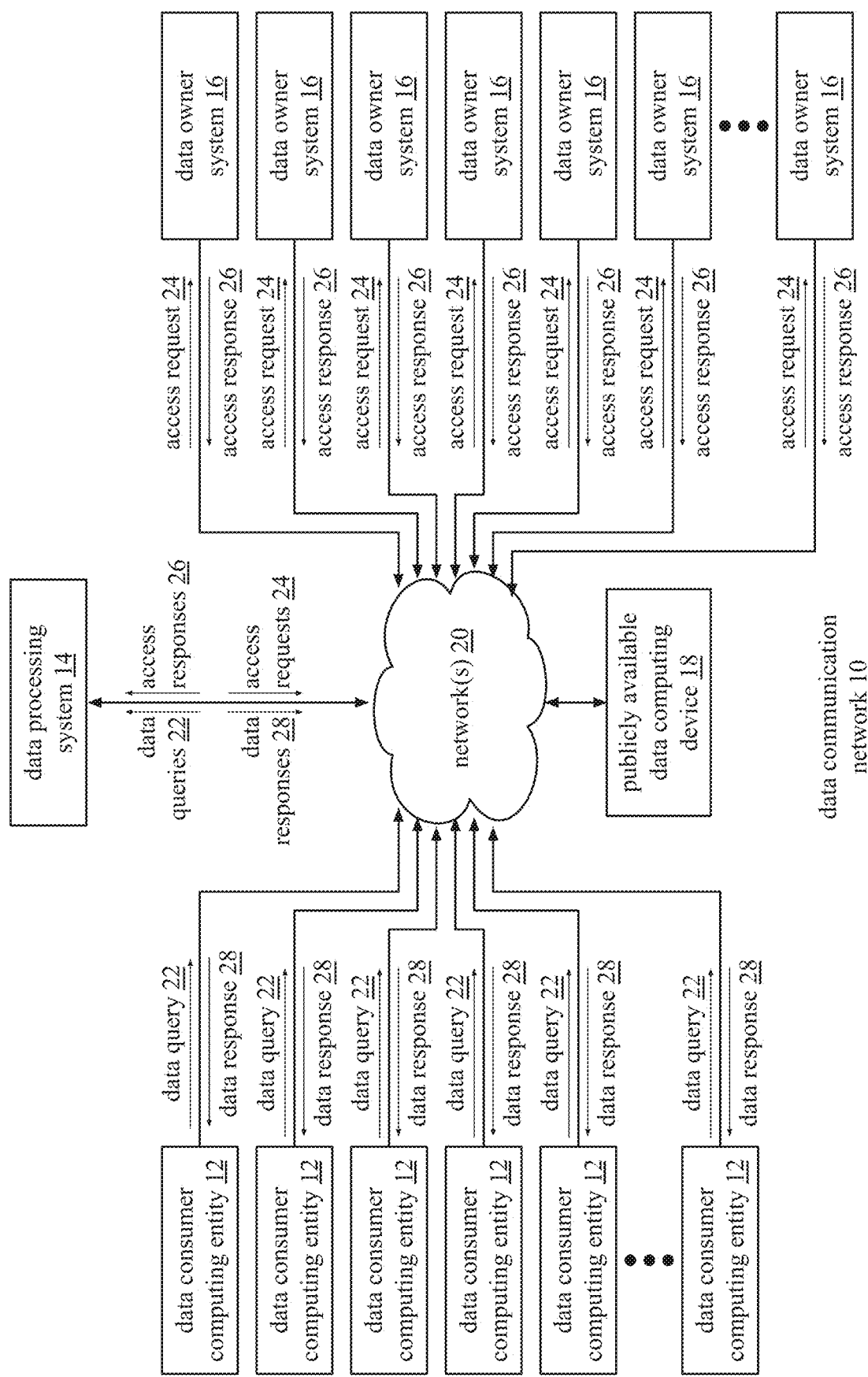
FIG. 1 is a schematic block diagram of an embodiment of a data communication network in accordance with the present invention.

FIG. 1 is a schematic block diagram of a data communication network that includes a plurality of data consumer computing entities 12, a data processing system 14, a plurality of data owner systems 16, and one or more publicly available data computing devices 18 coupled via one or more networks 20. A network 20 may be a wide area network (WAN), a wireless WAN, a local area network (LAN), or a wireless LAN. A data consumer computing entity 12 includes one or more computing devices operated by a data consumer (e.g., a researcher, a hospital administrator, an insurance administrator, an engineer, a designer, a governmental agency, etc.). An example of a computing device is described with reference to FIG. 2.

The data processing system 14 includes one or more computing entities to process data queries 22 and to provide data responses 28. Each of the data owner systems 16 includes one or more computing entities and functions to provide data access responses 26 to the data processing system 15 in accordance with data access requests 24. The publicly available data computing device 18 provides publicly available data (e.g., weather information, traffic information, sales information, demographic information, etc.) to the data processing system 14.

The data processing system 14 is operable to receive data queries 22 from the data consumer computing entities 12. For example, the data processing system receives a query 22 regarding reaction to a particular medication. As another example, the data processing system receives a query regarding symptoms reported by patients currently taking a first medication and a second medication. As yet another example, the data processing system receives a query regarding a correlation of asthma and living with a smoker. These are but a few of the thousands or more queries that could be processed by the data processing system 14.

In response to the query, the data processing system 14 identifies one or more data owners (e.g., a controlling entity for a data owner system 16) and asks them to share their data. As an example, if the query 22 is regarding a reaction to a particular medication, the data processing system 14 will ask data owner systems 16 such as hospitals, doctors, pharmacies, insurance companies, etc. to participate in the query 22. Alternatively, or in addition to, the data owners register with the data processing system and identify data records they are willing to share and/or give access to.

For each data owner system 16 that agrees to share their data, the data processing system 14 and the data owner system 16 work together to provide shareable data, as the access response 26. In one example, the shareable data is any data exchanged from a data owner system with another computing entity in accordance with an agreement between the computing entity and the data owner system. As another example, the shareable data is any data that complies with a privacy regulation (e.g., HIPAA, protected health information (PHI), personally identifiable information (PII), etc.) As another example, the shareable data is any data that the data owner system determines to share according to its privacy policy. As one specific example, the shareable data includes a listing of patients (with identities anonymized) that are taking the particular medication along with any associated reactions. As another specific example, the shareable data includes birthdays (with formats normalized) for patients with a heart problem. The normalizing and/or anonymizing of the shareable data will be discussed in one or more subsequent figures.

The data processing system 14 processes the access responses 26 from the data owner systems 16 participating in this query 22 to produce a data response 28. For example, the data response 28 may include a percentage of patients that experienced a reaction while taking the particular medication. As another example, the data response 28 may include a list of symptoms of patients that were taking a particular combination of medications. As yet another example, the data response may indicate the data processing system cannot perform the result (e.g., not enough data, etc.).

Once the data response 28 is completed, the shareable data is deleted. In addition, the data processing system 14 isolates the shareable data of the data owner systems 16 from each other and from the data consumer computing entities 12. In this manner, the ability to conduct research is greatly enhanced while maintaining privacy of data from a vast number of data sources.

While the above examples were regarding medical data, the data stored by the data owner systems may be of any type. For example, a first data owner system stores social media information regarding it members, a second data owner system is a retailer that stores customer purchase transactions, a third data owner system stores medical information regarding its patients, a fourth data owner system stores insurance information regarding its customers, a fifth data owner system stores on-line delivery transactions (e.g., meal orders, groceries, rides, etc.), and so on. Data queries can be for a particular type of data (e.g., medical data) or they can be regarding a broad spectrum of data (e.g., medical data, shopping habit data, eating data, driving data, etc.).

FIG. 2 is a schematic block diagram of an embodiment of a computing device 15 that includes computing core(s) 30, video graphics processing module(s) 40, display(s) 41, an input/output (I/O) interface 42, input interface modules(s) 43, user input device(s) 44, output interface module(s) 45, user output device(s) 46, memor(ies) 50 and network card(s) 51. A computing core 30 includes a core control module 31, a cache 32, processing module(s) 33, main memory(s) 34, I/O &/or peripheral control module 35, memory interface module(s) 36, network interface module(s) 37, and may also include a cloud computing application programming interface (API) 38 and a cloud storage API 39.

An optional extension of the computing device includes cloud storage 54, cloud computing core(s) 56, and/or memories 58 operably coupled to network(s) 52. In an example, the optional extension is a tenant in Amazon® Web Services (AWS) Simple Storage Service (S3). In another example, the optional extension works in concert with the computing core 30. In yet another example, the computing core 30 is a conduit to the cloud storage 54, cloud computing 56 and/or memories 58.

Note that a computing device 15 may be a portable computing device and/or a fixed computing device. A portable computing device may be a virtual reality device, an augmented reality device, a social networking device, a gaming device, a cell phone, a smart phone, a digital assistant, a digital music player, a digital video player, a laptop computer, a handheld computer, a tablet, a video game controller, and/or any other portable device that includes a computing core. A fixed computing device may be a computer (PC), a computer server, a cable set-top box, a satellite receiver, a television set, a printer, a fax machine, home entertainment equipment, a video game console, and/or any type of home or office computing equipment.

FIG. 3A is a diagram of an example of a secure data flow within the data communication network 10. To maintain security of a data owner's data, the data owner system 16 communicates with the data processing system 14 via a secure data silo 55. Each data owner system 16 stores complete data 60, which includes a plurality of records and each record includes a plurality of data fields. Some of the data fields includes data that cannot be shared by law, should not be shared in accordance with an agreement between the data owners and another entity (e.g., object of data, data consumer, another data source, etc.) and/or should not be shared in accordance with a data owner's own data privacy policy.

Within the secure data silo 55, selected complete data (e.g., some or all of it based on a query) may be modified (e.g., altered, normalized and/or anonymized) to produce shareable data 61. The selected complete data is anonymized by removing, obscuring, and/or altering data in data fields of the records that contain information that should be kept private (e.g., in accordance with the data owner's privacy policy). The anonymized data is then normalized to a desired format (e.g., data field orientation to line up columns of data, specific field formatting so data in columns is presented in the same manner, etc.). This is all done within the data owner system 16.

Via a secure data reception process 64 (e.g., encryption, virtual private network (VPN), transmission control protocol/internet protocol (TCP/IP) with secure sockets layer (SSL) encryption, a public key infrastructure (PKI), a secure communication link, etc.), the shareable data 61 is received by the data processing system 14. This is done within the secure data silo 55 as well.

In this manner, each secure data silo 55 operates independently from the other secure data silos 55 insuring that each data owner system's complete data 60 is securely maintained within its data silo and is prevented from being accessed by the other data owner systems 16 and/or by any entity outside of the data owner system. The secure data silos 55 also isolates a data owner system's shareable data 61 from other data owners and from data consumers.

The data processing system 14 combines the shareable data 61 from the various data owner systems to produce combine shareable data 66. The data may be combined in a variety of ways as will be discussed with reference to one or more subsequent figures. The data processing system 14 performs data processing 68 on the combined shareable data 66 based on a query 22 to produce a result 28. Once the data result 28 is sent to a data consumer, the combined shareable data 66 and the shareable data 61 from each data owner system is deleted.

Thus, via the data processing system 14, data from a variety of data owner systems can be used by a variety of different data consumers in response to a variety of queries without compromising privacy requirements of the data. This is achieved because the complete data (i.e., the data including privacy information) never leaves the data owner system 16. Further, only the data processing system has access to the shareable data 66 and the shareable data 61 from the data owner systems. With this controlled access, data consumers obtain analysis of a broad spectrum of data without having access to any of the data; thus privacy of the data is not compromised.

FIG. 3B is a schematic block diagram of another embodiment of the data processing system 15 creating secure data silos 55 around each of the data owner systems 16. In this example, a secure data silo 55 includes a data owner system 16 and a network interface 78 of a data processing system 14. The data owner system 16 and the data processing system 14 collaborate to setup a temporary virtual machine (VM) database (DB) 72 and a temporary VM data mining 74.

As an example of operation, upon receiving a query 22 from a data consumer computing entity, the data processing system sends requests to data owner systems to participate in providing shareable data for the query. When the data owner systems wish to participate, the data processing system 14 and the participating data owner system 16 collaborate to create the VM data mining 74 and VM DB 72 in the data owner system. The collaboration includes one or more of registering with the data processing system by the data owner, registering with the data owner system by the data processing system, exchanging temporary credentials, setting up permissions, creating a virtual private cloud (VPC), creating a virtual private network, creating a container (e.g., lightweight scalable application with associated environment variable, configuration files, libraries and/or software dependencies), and creating a virtual vault. The collaboration will be discussed in further detail with reference to one or more subsequent figures.

In a specific example, the virtual vault includes one or more of a container management entity (e.g., Kubernetes cluster, data processing system's application programming interface (API)) to manage a VPC's containers, a storage (e.g., an output bucket), one or more proxies to gate and log access to files and/or APIs within the virtual vault, and a VPC. The virtual vault is discussed in further detail with reference to one or more subsequent figures.

The VM data mining 74 functions to search a complete data DB 70, which stores complete data, for sets of data records corresponding to the access request 24. The VM data mining 74 may also modify (e.g., normalize, anonymize, privatize according to an agreement, etc.) the sets of data records. The VM data mining stores the sets of data records as shareable data in the temporary VM DB 72.

In an example, the VM data mining 74 is allowed access (e.g., via a virtual private cloud (VPC), in accordance with security credentials, etc.) to a portion of the complete data DB 70 storage location (e.g., physical addresses, logical addresses). Note the VM DB 72 may be a portion of the complete data DB (e.g., within a same storage location) or may be in a separate storage location. Further note in this example, the VM DB 72 stays within the data owner system.

The VM data mining 74 sends the shareable data 61 (e.g., as access responses 26) via the network interfaces 76 and 78 to the data processing system 14. The VM data processing 79 processes (e.g., executes one or more functions based on the query) the shareable data 61 to produce result 28, that is sent to the data consumer computing entity and/or sent to a storage location.

FIGS. 3C-J are schematic block diagrams of other embodiments of a data processing system creating secure data silos and a temporary vault for processing a query. FIG. 3C includes a data processing system 14, a plurality of data owner systems 16, output storage 91, and a temporary vault (e.g., virtual vault) 65. A data owner system includes an application programming interface (API) 75, a complete data database (DB) 70 and a normalized DB 69. The data processing system 14 includes an API 75, a data processing system (DPS) share DB 77, a storage DB 70-1 and a DPS user DB 73. The DPS share DB 77 includes information on data owners of a data communication network. The DPS user DB 73 includes information on data consumers of a data communication network. The information includes one or more of registration information, a username, a password, keys (e.g., cryptographic).

The data processing system 14 sets up the temporary vault 65 to utilize in returning a result 28 in response to a query 22. The temporary vault 65 includes a virtual machine (VM) data mining 74, a VM DB 72, and a VM data processing 79, which function similarly as described with reference to the preceding figures, but are now operating within the temporary vault 65.

In this example, the VM data mining searches the complete data DB 70 for data records based on the query 22. The VM data mining stores data records found in the search in a normalized database (DB) 69 in the data owner system 16. In one example, the norm DB 69 is a temporary vault or container. The VM data mining 74 is further operable to retrieve the data records stored in each norm DB 69 and store them as combined shareable data in the virtual machine (VM) DB 72 within the temporary vault 65. The VM data processing 79 performs one or more functions on the combined shareable data to produce a result 28. In one example, the result is sent to the data processing system, which may store the result in an internal (e.g., only data processing system has access to) storage DB 70-1 and/or an external (e.g., third party storage) output storage 91.

Thus, via the data silos 55 and the temporary vault 65, data from a variety of data owner systems can be used by a variety of different data consumers in response to a variety of queries without compromising privacy requirements of the data. This is achieved because the complete data (i.e., the data including privacy information) never leaves the data owner system 16. Further, only the temporary vault has access to the shareable data from the data owner systems. With this controlled access, data consumers obtain analysis of a broad spectrum of data without having access to any of the data; thus privacy of the data is not compromised. Note in one example, the temporary vault includes one or more containers and/or virtual machines.

FIG. 3D is a schematic block diagram of an embodiment of a data communication network 10, which is similar to FIG. 3C, except in this embodiment the temporary vault includes a second VM data mining 74 to interact with a second data owner system 16.

FIG. 3E is a schematic block diagram of an embodiment of a data communication network 10 that includes a plurality of data owner systems 16, a data processing system, an output storage 91, and a temporary vault 65. In this example, the virtual machine (VM) data mining 74 is setup within each data owner system 16 and operates to search complete data DB for a set of data records related to a query 22. The VM data mining 74 stores the set of data records in a normalized database (norm DB) 69 of the data owner system 16. The VM data mining 74 also operates to retrieve (e.g., based on a command from an API 75) one or more of the set of data records from the norm DB 69 and store them in the VM DB 72 located in the temporary vault 65.

The VM data processing 79 executes a function on the data records stored in the VM DB 72 to produce result 28, which is sent to output storage 91. Note, output storage 91 may be located in the data processing system and/or in a location with the data processing system has access. In one example, the output storage is a third party storage location.

FIG. 3F is a schematic block diagram of an embodiment of a data communication network 10 that includes a plurality of data owner systems 16, a data processing system 14, a plurality of temporary vault or containers (TVC) #1-3 95. The data processing system and the data owner systems collaborate to produce a secure data silo 55 which prevents data from being accessed and/or exposed as discussed previously.

In this embodiment, the VM data mining 74 is within the data owner system, the VM DB 72 is in the temporary vault or container (TVC) #1 95, the VM data processing 79 is in the TVC #2 95, and the temporary output storage is within the TVC #3 95. This compartment approach of various elements within the TVCs further increases security of the data owner systems data by allowing different network traffic settings, security settings, etc for each TVC 95. For example, the TVC #1 95 includes a security setting (e.g., a network access control list (ACL), a security group, etc.) that only permits the VM data processing 79 to access data within the VM DB 72. As another example, TVC #2 includes a network traffic setting that only allows inbound data from TVC #1 95. Note that in one example, after the result is accessed, each VM data mining 74, each norm DB 69, and the TVC #1-3 and their contents are destroyed. Further note, a virtual private cloud and/or network may be utilized in conjunction with the TVCs.

FIG. 3G is a schematic block diagram of an embodiment of a data communication network 10, which is similar to FIG. 3F, except that in this embodiment the VM data mining sends the data records found in the complete data DB 70 directly to the VM DB 72, which in this example is within a temporary vault or container #3 95.

FIG. 3H is a schematic block diagram of an embodiment of a data communication network 10, which is similar to FIG. 3G, except that in this embodiment the VM data processing and the VM DB 72 are located in the same temporary vault #1 65 and temporary output storage in within a temporary vault #2 65.

FIG. 3I is a schematic block diagram of an embodiment of a data communication network 10, which is similar to FIG. 3E, except that the output storage is temporary output storage 91-1 (deleted within a first time threshold after the result is stored) and some data owner systems do not include a norm DB 69.

FIG. 3J is a schematic block diagram of an embodiment of a data communication network 10, which is similar to FIG. 3, except a first VM data mining 74 is within a first data owner system for mining complete data of the first data owner system and a second VM data mining 74 is within a temporary vault 65 for mining complete data of one or more other data owner systems.

FIG. 3K is a schematic block diagram of an embodiment of a temporary vault or container (VC) 95 that includes a plurality of sub-VCs 1-4. In an example, the first 3 temporary sub-VC1-3 95-1-3 includes a VM data mining 74 and a first through third VM DB 72-1-3. The fourth temporary sub-VC4 95-4 includes a VM data aggregate module 85, an aggregate DB 72-4 and a VM data processing 79. The VM data aggregate module 85 functions to combine data from the first through third VM DBs 72-1 through 72-3. In one example, the VM data aggregate module 85 normalizes the data that is stored in the aggregate DB 72-4. In another example, data records that are already normalized (e.g., already in the correct format) are sent directly to the aggregate DB 72-4 from the data owner system 16.

FIG. 4A is a schematic block diagram of an embodiment of a data owner system 16 in general, which includes a complete data database (DB) 70, a server entity 80, a data network interface 82, a private network 83, and a plurality of computing entities 90. The private network may include one or more of a local area network (LAN), a wide area network (WAN) and a virtual private network (VPN). The data network interface may be an application programming interface (API), and may also be a combination of hardware and one or more layers of software. In an embodiment, a computing entity 90 is one or more computing devices of FIG. 2.

FIG. 4B is a schematic block diagram of an embodiment of data owner system participating as a data source for a query or other type of data access request. The data owner system 16 in this example includes the components of the data owner system 16 of FIG. 4A, and further includes an application programming interface (API) 81. The API 81 is utilized to setup a virtual machine (VM) database (DB) 72, a VM data mining, and a temporary vault and/or container to house the VM DB, VM data mining. Note in an example, the API 81 is controlled by the data processing system 14.

The VM data mining 74 of the data processing system 14 functions to access a set of data records within the complete data DB 70 in accordance with a temporary credential protocol and store at least some of the set of data records in the VM DB 72. The VM data mining 74 further modifies (e.g., normalizes, privatizes and/or anonymizes) the set of data records in the VM DB 72 to produce a shareable set of data records. The VM data mining 74 retrieves the shareable set of data records from the VM DB 72.

The data processing system 14 further includes a VM data processing 79, which operates to execute one or more data analysis functions on the shareable set of data records to produce a result. The data processing system sends the result to one or more data consumers. The data processing system 14 also may store the result for further use (e.g., as statistics, to compare to another query, etc.). Note in an example, the VM DB 72, VM data processing 79 and/or the VM data mining 74 is implemented via or in conjunction with one or more containers (e.g., stored executable application code along with its libraries and dependencies), which may be managed by a container orchestrator (e.g., Kubernetes, Docker Swarm, etc.).

In an embodiment, a data consumer interacts with the data processing system via a container. The container images and/or configuration files are generated by the data processing system and provided to the data consumer. The data processing system interacts with the data owner system to allow population of the container with shared files from the data owner. The data processing system sets up a virtual private cloud (VPC) utilizing a tenant account (e.g., existing, new, etc.) to allow the data consumer to access shareable (e.g., normalized, privatized, and/or anonymized) data in the container.

FIG. 5 is a logic diagram of an example of a method of securely processing shareable data in a data communication system. The method begins or continues at step 100, where a data processing system receives a request (e.g., one or more queries) for data processing regarding a data set having specific criteria. As a particular example, the specific criteria includes a medication, an age range, a medical condition, and a treatment outcome related to the medication. The method continues with step 102, where the data processing system creates a virtual machine for use with (e.g., internal or external) a data owner system. The virtual machine may include one or more of a virtual machine data mining module and a virtual machine data processing module.

The method continues with step 104, where the data processing system identifies data owners that may have data meeting the specific criteria. For example, the data processing system (or virtual machine) identifies a hospital, a clinic, a pharmacy, an insurance company and a plurality of patients as data owners that may have data in common that meet the specific criteria (e.g., common data criteria).

The method continues with step 106, where the data processing system sends a request to each of the data owners regarding a respective data set associated with the query. The method continues with step 108, where the data processing system determines whether it received a favorable response from one or more of the data owners. When the response is unfavorable (e.g., indication data owner does not have the respective data set and/or will not provide access), the method branches to step 122. When the response is favorable (e.g., indication data owner has the respective data set and will provide access), the method continues to step 110 where the virtual machine (VM) securely accesses data of the data owner system (e.g., in accordance with a temporary credential protocol, via a VPC, utilizing a temporary VM database, etc.) regarding a set of data records having common data criteria (e.g., data records related to the specific criteria).

The method continues with step 112, where the virtual machine determines whether an amount the available data is greater than or equal to a minimum threshold (e.g., certain number of data points and/or data records) for a data owner. When the amount of the available data is less than the minimum threshold for the data owner, the method loops back to step 108. When the amount of the available data is greater than or equal to the minimum threshold for the data owner, the method may continue with steps 114 and/or 116 (e.g., to create shareable data according to an agreement between a data consumer and data owners), where at step 114, the virtual machine (VM) anonymizes the respective data set (e.g., a set of data records) to produce a set of anonymized data records. For example, the VM alters data fields of a data records that include information that could be used to identify an object (e.g., person, place, thing) of the data record. Note the anonymizing may include altering no data fields when the data is already in a certain form (e.g., in accordance with privacy laws, a data owner privacy policy, an agreement between data owners and data consumers, etc.).

As a specific example, the VM removes a name field, a social security number field, changes a specific weight field to a weight range (e.g., 147 *lbs* to 140-150 *lbs*) and removes the street number and street name of an address field of a patient hospital record. In an embodiment, the amount of data anonymized (e.g., which data fields are altered to comply with a data privacy restriction) depends on the number of other like data records for one or more data fields. For example, when only 3 patients that take medication X are over 80 inches tall, anonymizing the height field would be important in order to keep the patient record confidential. As another example, when 30,043 patients that take medication X are between 61 and 69 inches tall, anonymizing the height field would be less important (e.g., more difficult to ID patient) in order to keep the patient record confidential.

In an embodiment, a first level of anonymizing or modifying (which may include anonymizing) (e.g., according to a privacy law) may be done in the data owner system, and a second level of anonymizing or modifying may be done in the data processing system (e.g., based on amount of other data needed to determine identity associated with data record) or a temporary vault. In another embodiment, the first and second levels of anonymizing are done in the data owner system. In one example, at least a threshold level (e.g., the first level) of anonymizing is done within the data owner's system (e.g., secure tenant system).

When needed to produce the shareable data, the method continues with step 116, where the virtual machine normalizes anonymous data to produce a set of normalized and anonymized data records. The normalizing includes one or more of matching field headers, using rows and columns, converting format from current format to specified format, etc. For example, a first data record may include a "date of birth" field and a second data record may include a "birthday" field. Thus, the virtual machine may normalize by the data records by changing the title of the "birthday" field of the second data record to a "date of birth" titled field. As another example, a date of birth of a first record may be in a year-month-day format (e.g., 1978-04-28) and a date of birth of a second record may be in a month-day-year format (e.g., 04-28-1978). As such, the virtual machine may normalize by the data records by changing the format of the first data record from year-month-day format to the month-day-year format.

Note in an example, the VM may first normalize the set of data records and then anonymize a set of normalized data records to produce the set of normalized and anonymized data records. In another example, the VM may normalize and anonymize a set of data records concurrently and/or in an alternating fashion on a data record by data record basis, and/or on a data field by data field basis, where each record of the set of data records includes a plurality of data fields. In yet another example, the normalizing is performed after the anonymized data is sent to the data processing system. In yet another example, the data is already in a shareable form (e.g., according to a privacy law, according to a data owner privacy policy, etc.), thus the steps 114-116 may be omitted.

The method continues with step 118, where the virtual machine or the data processing system determines whether the set of normalized and anonymized data records pass data protection requirements (e.g., per generic requirements and/or per use specific requirements). When the set of normalized and anonymized data records do not pass data protection requirements, the method continues with step 120, where virtual machine or the data processing system deletes the set of normalized and anonymized data records. The method then loops backs to step 108. Note the data protection requirements may include one or more of health insurance portability and accountability act (HIPAA) requirements, general data protection regulation (GDPR) requirements, organizational requirements, etc.

When the set of normalized and anonymized (e.g., shareable) data records do pass data protection requirements, the method continues with step 121, where the virtual machine or the data processing system combines the set of normalized and anonymized data records with other sets of normalized and anonymized data records. The combining may include one or more of aggregating, compiling, sorting, and other forms of organizing data.

The method continues with step 122, where the data processing system determines whether all data owners have responded (e.g., favorably or unfavorably) or have timed out. When not all data owners have responded or timed out, the method loops back to step 108. When all data owners have responded or timed out, the method continues with step 124, where the data processing system determines whether it has enough combined shareable data (e.g., with the sets of normalized and anonymized data records) to process to provide a suitable result to the query.

The determination of enough combined data includes one or more of receiving a command, performing a lookup, determining a query specific number of data points, and utilizing historical query data. In an example, the determination is performed for each source and again for the combination of data from all sources. When the data processing system does not have enough data for the query, the method continues with step 126, where the data processing system sends an unable to fulfill request message response to the requesting entity that sent the query.

Alternatively, or in addition to, the data processing system determines whether one or more of the request and/or the specific criteria may be altered in order to fulfill the request. When yes, the data processing system may loop back to step 106 and send requests to one or more data owners. Further alternatively, the method may continue to step 128, where the virtual machine or the data processing system may process the data according to the altered request and/or altered specific criteria. For example, a data consumer requires 5000 data records for processing a query. The data processing system gathers 4788 data records and asks the data consumer whether the requirement of 5000 may be altered to 4788. When yes, the data processing system processing the altered request.

When the data processing system does have enough data for the query, the method continues with step 128, where virtual machine processes the sets of normalized and anonymized data records to produce a response (e.g., message that includes the result of the processing). As an example, the virtual machine executes a data analysis function on the sets of normalized and anonymized data records to produce an analytical result. Alternatively, or in addition to, the virtual machine may create combined data statistics (e.g., number of records, number of data owners, demographics, time frame, etc.) based on the sets of normalized and anonymized data records.

The method continues with step 130, where data processing system outputs the results of the processing. For example, the data processing system sends the analytical result to a data consumer computing entity (e.g., the requesting entity). As another example, the data processing system sends the analytical result to one or more of the data owners. Note the result and/or the statistics may be stored in the data owner system, the data processing system or a third party storage system for a certain period of time (e.g., to allow data consumer to access the result, to save the result and/or statistics for future queries, etc.).

The method continues with step 132, where the data owner system and/or the data processing system deletes the virtual machine, the temporary VM database, and any data stored in the temporary VM database. The method continues with step 134, where the data processing system processes payment for producing the analytical result for the data consumer computing entity.

Alternatively, the virtual machine may process the payment before it is deleted. Note the cost of the producing the analytical result may be based on one or more of: time from receiving query to processing result, amount of data processed, classification of data and/or query (e.g., higher importance query is more expensive than a lower importance query, higher sensitive data classification more expensive than a lower sensitive data classification, etc.). Further note an estimate of the cost may be determined before producing the result and/or the cost may be capped (e.g., pre-paid, total cost limit, etc.).

Figure 6A:
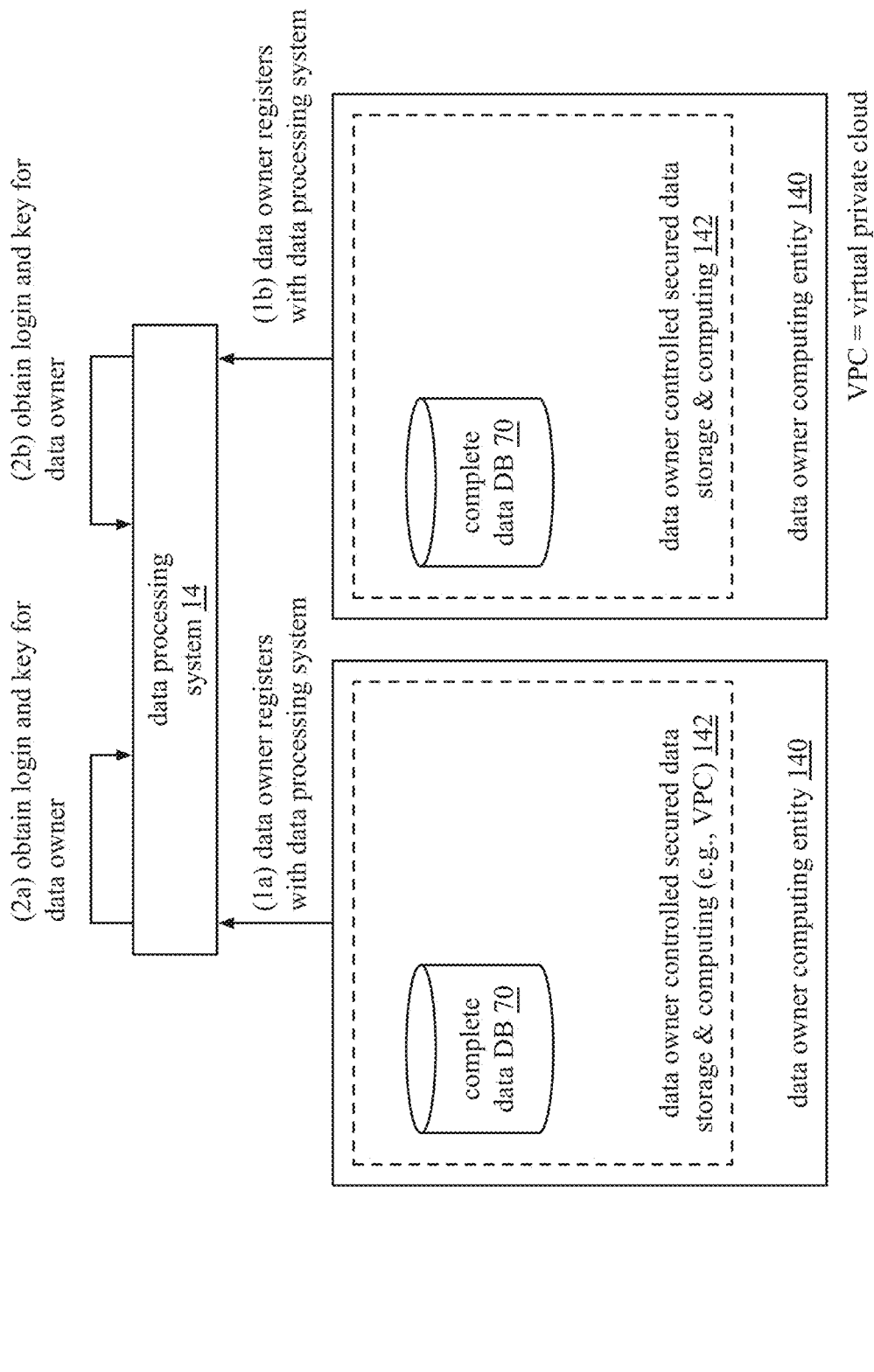

FIGS. 6A-6J are schematic block diagrams of an example of processing shareable data in a data communication network 10. FIG. 6A illustrates a data processing system 14, and a plurality of data owner computing entities 140 of the data communication network 10. A data owner computing entity 140 includes a complete data database (DB) 70 in a data owner controlled secured data storage & computing 142. In an embodiment, the data owner controlled secured data storage & computing 142 is implemented by a virtual private cloud (VPC).

In this example, a data owner registers (1a-1b) with the data processing system 14. When approved, step 2a-2b illustrates the data processing system obtains (e.g., generates, receives, etc.) a login and key for the data owner. For example, the data owner is given a login for the data processing system and is granted a key that identifies an application programming interface (API) of the data owner system to the data processing system.

Figure 6B:
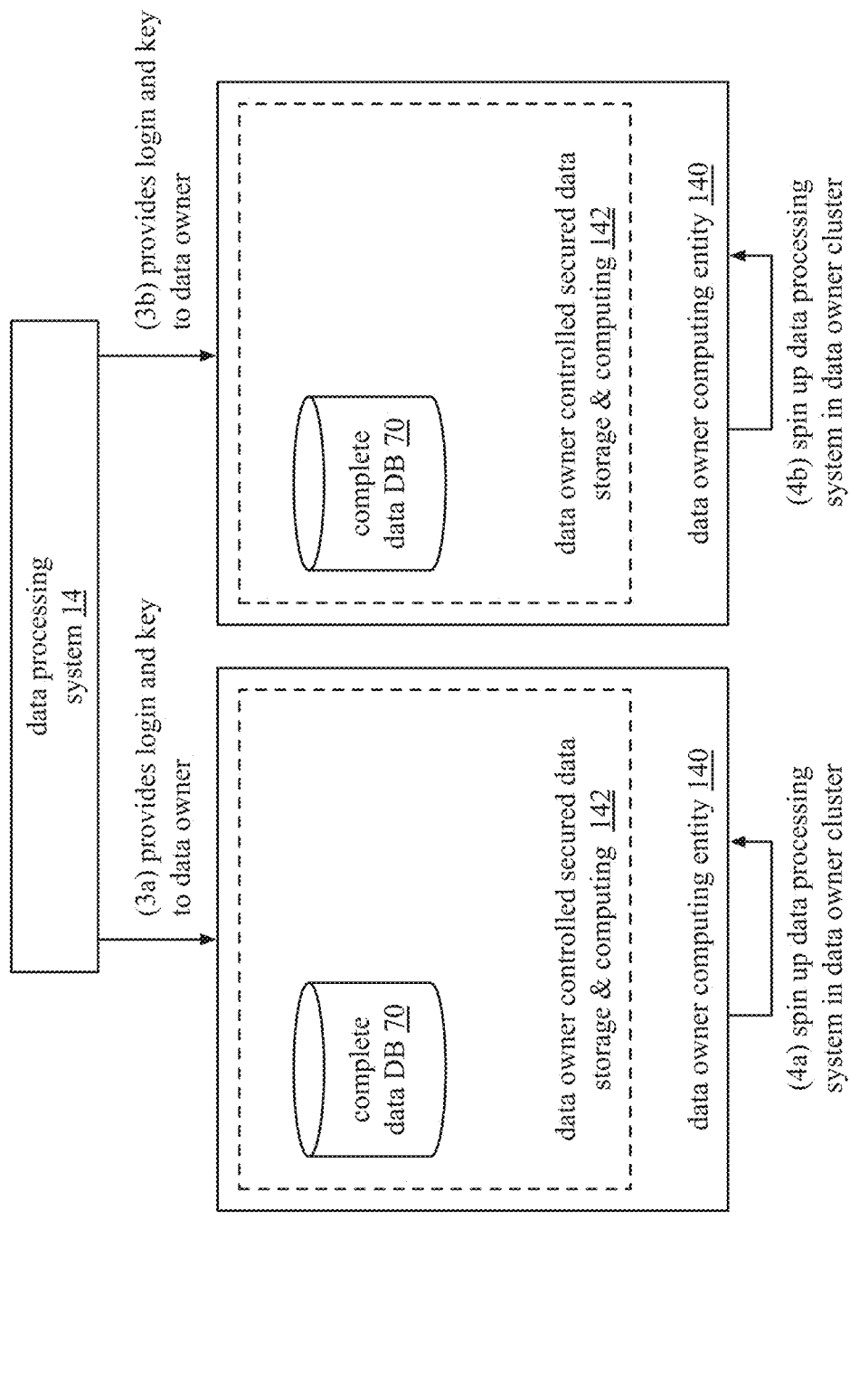

FIG. 6B illustrates in step 3a-3b, the data processing system providing registration information (e.g., the login and key) to each approved data owner system. In step 4a-4b, the data owner spins up a data processing system (e.g., via an API, in conjunction with a virtual machine (VM), etc.) in their own data owner cluster. In one example, the data processing system is brought up in a public cloud. The data owner cluster may contain an application programming interface (API), a user interface (UI), and one or more databases to store information.

Figure 6C:
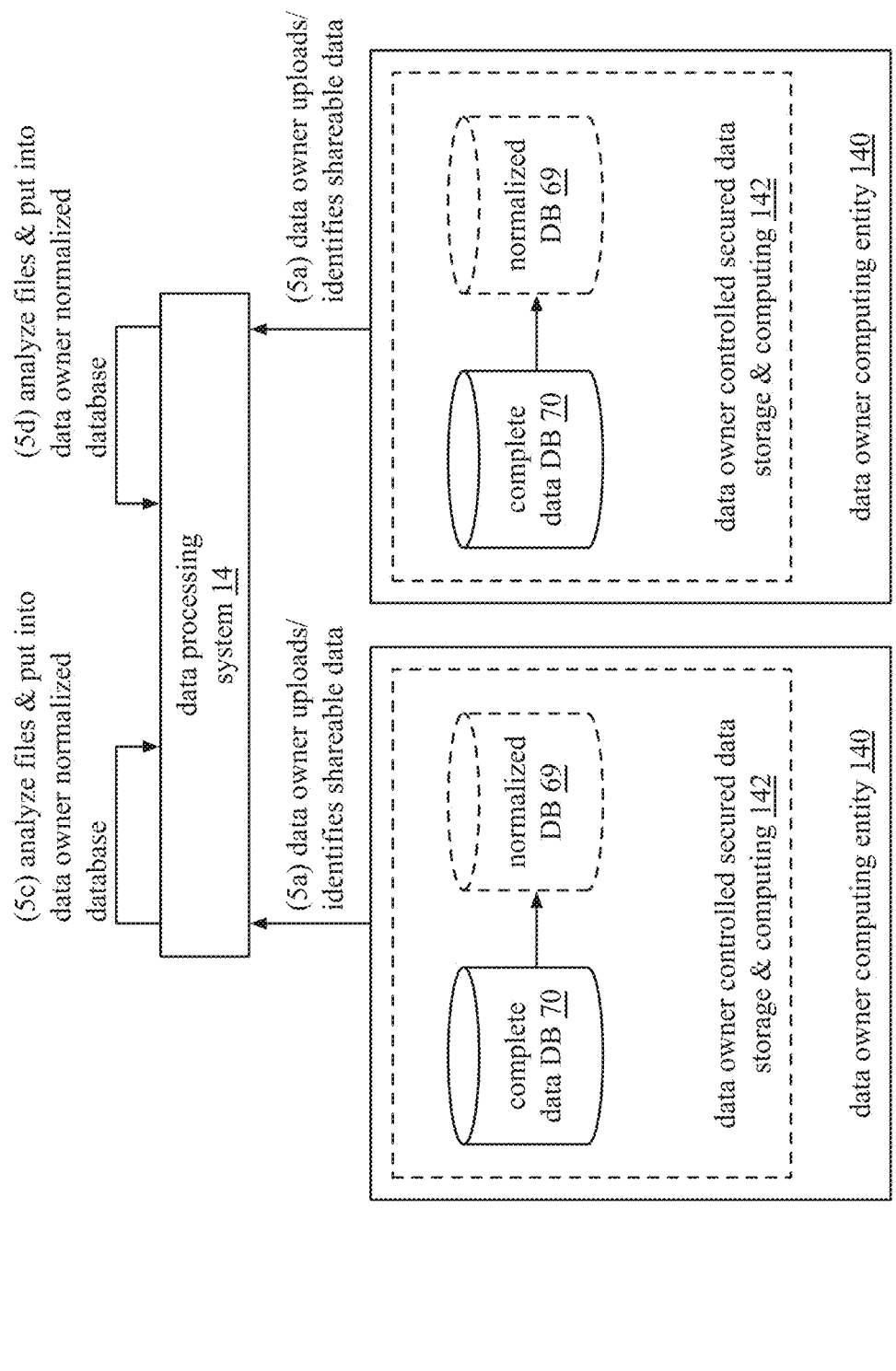

FIG. 6C illustrates a data owner uploading and/or identifying shareable data. For example, the data owner provides information to the data processing system on data records in their complete data DB that they wish to share. The information may include identities of users with which the data owner determines to share the data records with. As another example, the data owner uploads data records via the API/UI to a bucket that is created for storing the data records. Note the bucket may be located in the data owner computing entity, the data processing system and/or a third party storage system. The method continues with steps 5c-5d, where the data processing system analyzes the data records (e.g., files) and stores the data records into a data owner normalized database (DB) 69. For example, an extract, transform, load (ETL) process is triggered that analyzes data records stored in the complete data DB looking for new data records and/or changed data records and/or storing one or more data records in the normalized database 69.

Figure 6D:
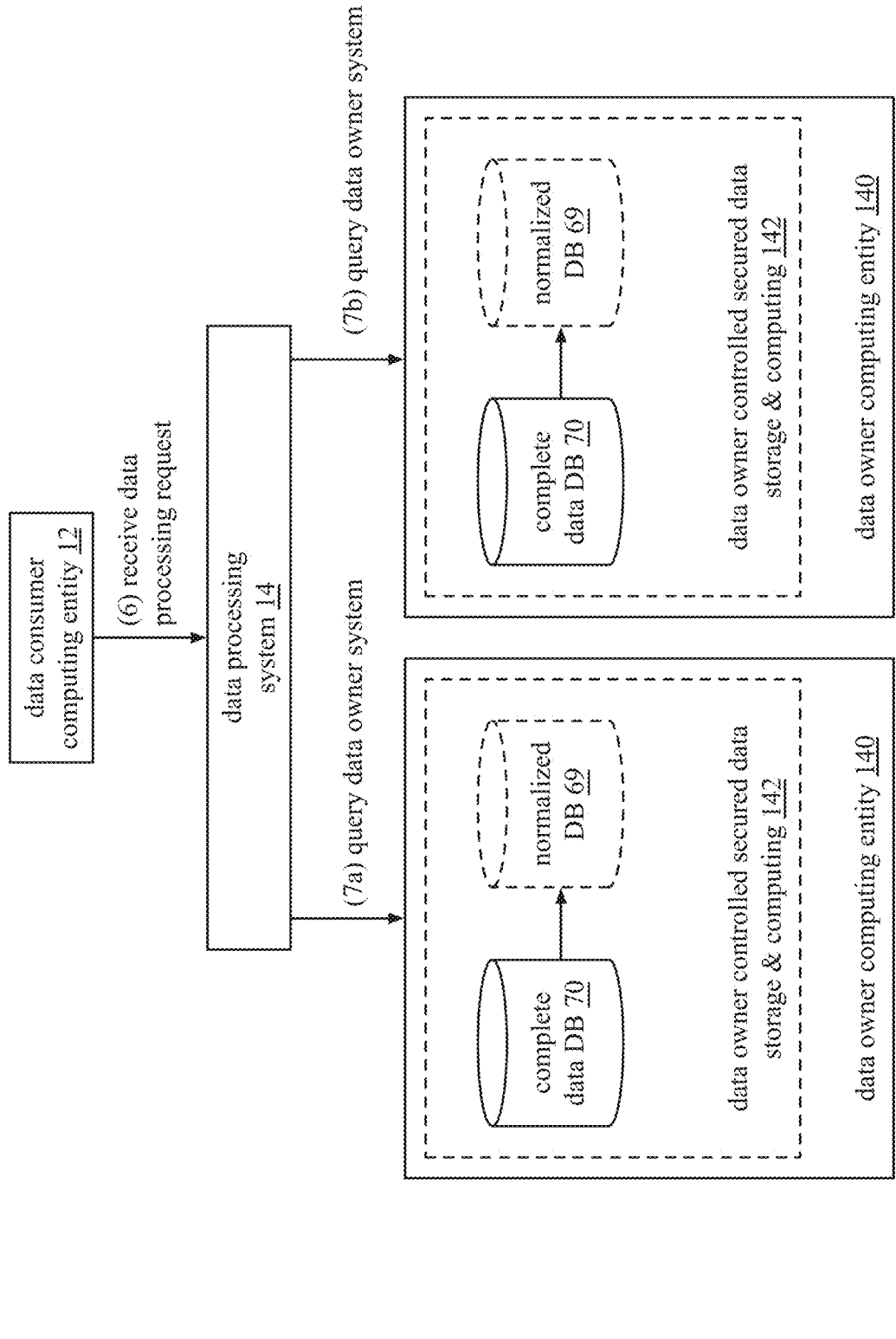

FIG. 6D illustrates the data processing system receiving (6) a data processing request from a data consumer computing entity. For example, the data processing request is a query for a number of patients exhibiting symptoms A, B & C that traveled to area A between date 1 and date 2. The data processing system then queries (7a-7b) the data owner computing entities 140 to determine an amount of data records available for use in processing the data processing request.

Figure 6E:
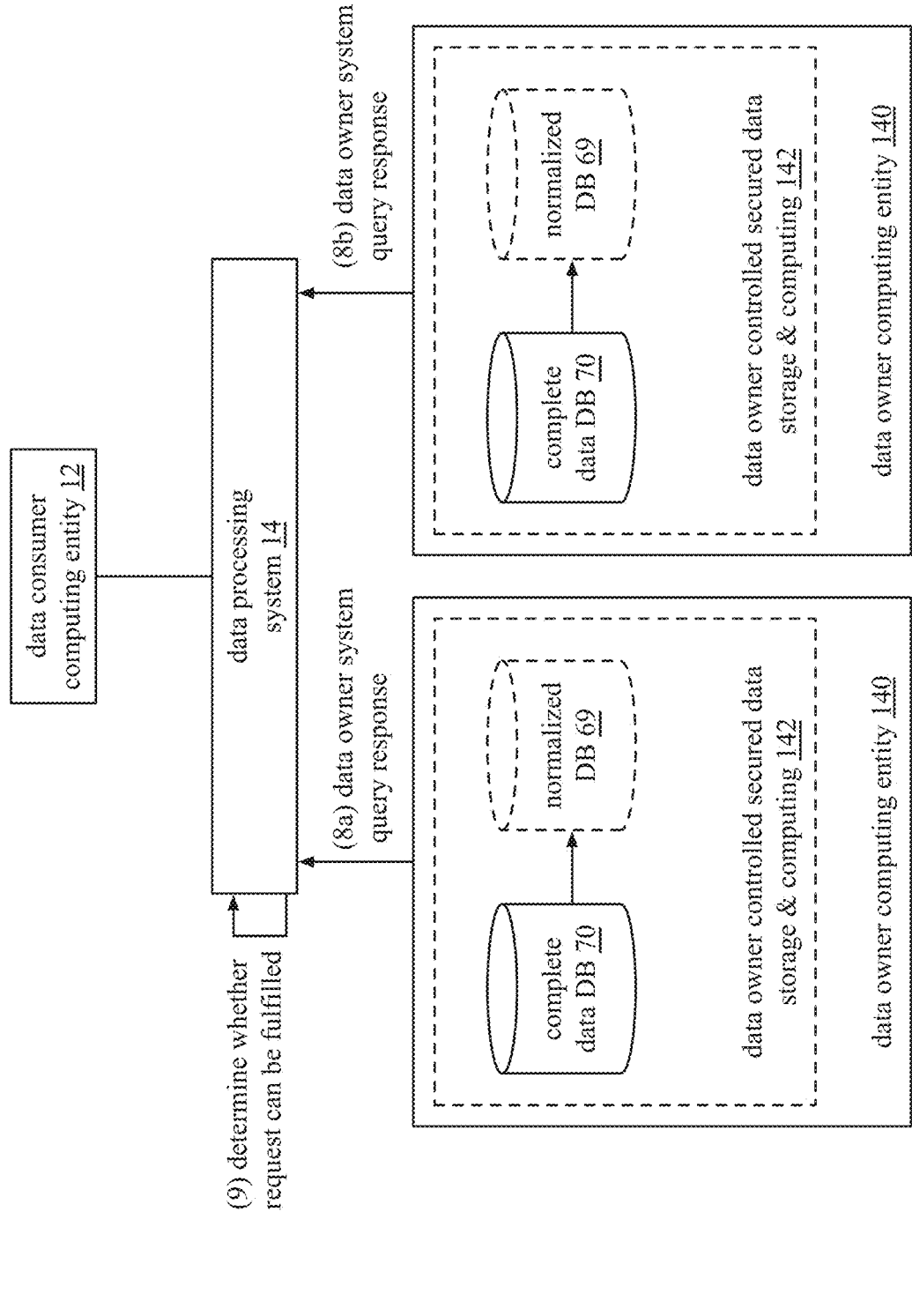

FIG. 6E illustrates the data owner systems responding (8a-8b) to the query. For example, each data owner computing entity responds with a number of data records that correspond with the query and whether they will participate in the query. The data processing system then determines (9) whether the data processing request can be fulfilled based on the responses from the data owner computing entities.

Figure 6F:
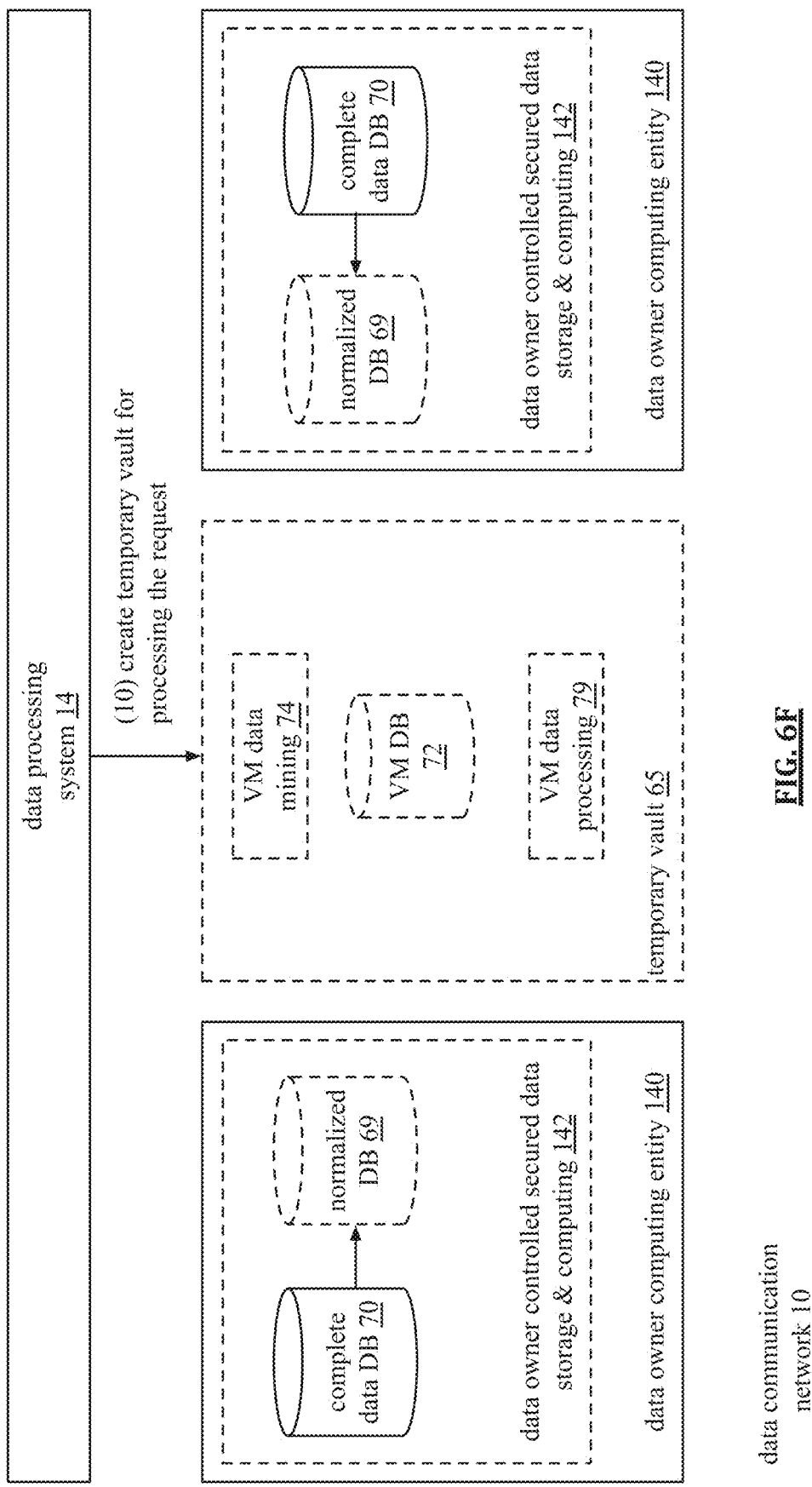

FIG. 6F illustrates the data processing system determining the data processing request can be fulfilled, and the data processing system creating a temporary vault 65. The temporary vault includes one or more of a virtual private cloud (VPC), a Kubernetes cluster, an aggregate database (e.g., that may be populated with a cohort), an output bucket and an owner analysis container. In this example, the temporary vault 65 includes a virtual machine (VM) data mining 74, a VM database (DB) 72, and a VM data processing 79.

Figure 6G:
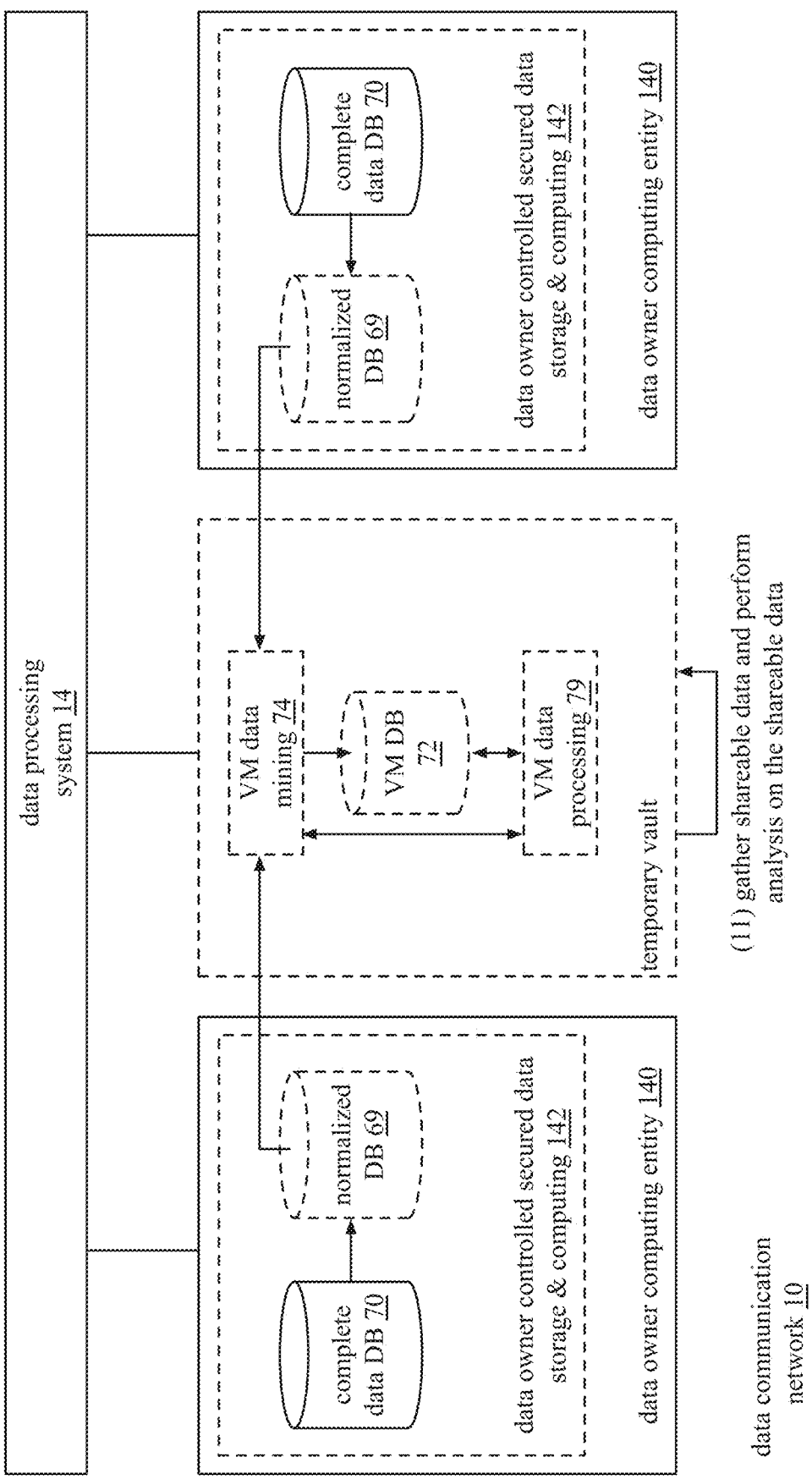

FIG. 6G illustrates the VM data mining (11) gathering (e.g., mining) shareable data records from the data owner computing entities and the VM data processing performing an analysis (e.g., executing a function) on the shareable data records to produce a result.

FIG. 6H illustrates the temporary vault outputting (12) the result to a temporary output storage 91-1. The data processing system also obtains logs (e.g., information on steps 1-12) at steps 13a-c and aggregates the logs at step 14. In an example, the logs include storing data on the query (e.g., parameters, participants, etc.) such the query could be repeated.

Figure 6I:
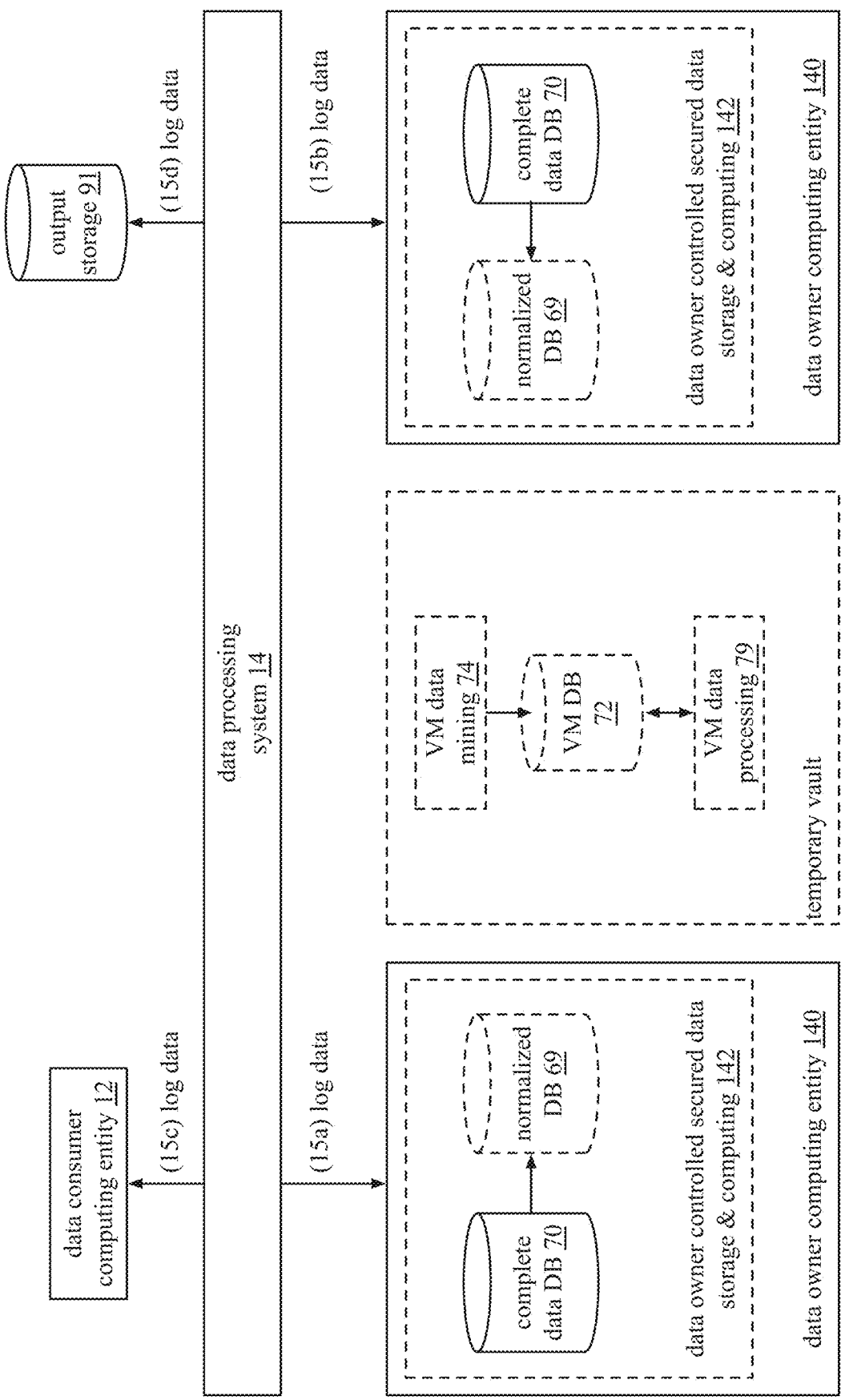

FIG. 6I illustrates the data processing system 14 sending the log data (15a-d) to the data owner computing entities 140, the data consumer computing entity 12, and an output storage 91. Note the output storage 91 is able to be accessed by and/or is under the control of the data processing system 14.

FIG. 6J illustrates after producing the result, and sending and/or storing the result outside the temporary vault, the data processing system destroying (16) the temporary vault and its contents. In one embodiment, the normalized databases 72 are also deleted once the query has been processed.

FIGS. 7A-7J are schematic block diagrams of an embodiment of processing shareable data in a data communication network 10. The data communication network 10 includes the data consumer computing entity 12 of FIG. 1, the data processing system 14 of FIG. 1, and a plurality of data owner computing entities 140. Note one or more data owner computing entities 140 may be implemented by the data owner system 16 of FIG. 1. A data owner computing entity 140 includes a complete data database (DB) 70 within a data owner controlled secured data storage and computing 142. In an example, the data owner controlled secured data storage and computing 142 is implemented by or in conjunction with a virtual private cloud (VPC).

FIG. 7A illustrates the data processing system 14 receiving (1) a data processing request from the data consumer computing entity 12. The data processing system 14 determines which data owner computing entities 140 to solicit for participation based on the query. For example, when a query includes location based criteria (e.g., county, zip code, providence, latitude and longitude coordinates, etc.) the data processing system 14 may determine to ask data owner computing entities 140 that have information that corresponds with the location based criteria to participate.

As another example, when a query includes type based criteria (e.g., medical), the data processing system 14 may determine to ask medical provider data owner computing entities 140 (e.g., hospitals, clinics, urgent care facilities, etc.) of the data communication network 10 to participate. As yet another example, when a query includes time based criteria (date, time range, etc.), the data processing system may determine to ask data owner computing entities 140 that have information that corresponds with the time based criteria (e.g., data records that include the year 2014) to participate. As yet another example, the query includes the exact fields it needs. Thus, the data processing system determines which data owners have data with the exact fields. After determining which data owner computing entities to ask to participate, the data processing system 14 sends (2a-2b) a participation request to the data owner computing entities 140.

FIG. 7B illustrates the data processing system 14 receiving (3a-3b) participation responses from the data owner computing entities 140. The participation response includes an indication of whether or not the data owner computing entity 140 will participate, and may also include a modification request that indicates the data owner computing entity would participate with an adjustment to the query.

For example, the participation response indicates the data owner computing entity 140 will participate. As another example, the participation response indicates the data owner computing entity 140 will not participate. As yet another example, the participation response includes the modification request. When the participation response includes the modification request, the data owner computing entity 140, the data processing system 14 and/or the data consumer computing entity 12 will communicate to determine whether criteria of the query can be modified so that the data owner computing entity 140 can participate.

FIG. 7C illustrates the data processing system asking (4a-4b) for credentials from participating data owner computing entities 140. In an example, the credentials are in accordance with a temporary credential protocol between the data processing system and the data owner system. In an example, the temporary credential protocol includes setting up a virtual private cloud (VPC), a virtual machine (VM) and/or one or more containers.

FIG. 7D illustrates the data owner computing entities 140 creating (5a-5b) credentials for the data processing system 14. In an example, the credentials are a username and password. In another example, the credentials are an access key pair and a session token. The credentials may be permanent (e.g., until revoked) or temporary (until a time period has elapsed, until an event is triggered, etc.). The data processing system 14 then receives (6a-6b) the data processing system credentials from the participating data owner computing entities 140.

FIG. 7E illustrates the data processing system 14 creating (7a-7b) a virtual machine (VM) data mining 74 based on the data processing system credentials. The VM data mining 74 is allowed certain access (e.g., temporary controlled access in accordance with the data processing system credentials) to the complete data DB 70 within the data owner controlled secured data storage and computing 142.

FIG. 7F illustrates the data processing system 14 creating (8a-8b) a temporary shareable (e.g., normalized and/or anonymized according to a data owner policy) data database (DB) 72 for each data owner computing entity 140. In an embodiment, the temporary shareable data DB 72 is a logical portion (e.g., address range) of the complete data DB 70. In another embodiment, the temporary shareable data DB 72 is a different physical portion (e.g., different physical address of a memory device) of the complete data DB 70. In yet another embodiment, the temporary shareable data DB 72 is a completely separate physical device of the data owner computing entity (e.g., one that does not store any data of the complete data DB 70). In another embodiment, the temporary shareable data DB 72 is sandboxed storage of a virtual private cloud (VPC). Note in one example, the temporary shareable data DB may include shareable data that has not been normalized and/or anonymized.

FIG. 7G illustrates the data processing system 14 creating (9a-9b) credentials for the temporary shareable data database (DB) 72. The data owner computing entity 140 facilitates (10a-10b) temporary controlled access to portions (e.g., a portion of the complete data DB, the VM data mining, the temporary shareable data DB) of the data owner controlled secured data storage and computing 142. For example, the temporary controlled access allows the VM data mining 74 to access certain portions (e.g., files, address ranges, data fields, data records, etc.) of the complete data DB. The temporary controlled access is based on one or more of a memory access control list of the data owner computing entity, certain physical memory devices, a storage address range limit, and internet protocol (IP) address limits, to name a few examples.

FIG. 7H illustrates the data processing system 14 controlling (11a-11b) population of the temporary shareable data DB 72. For example, the data processing system 14 interfaces with and/or instructs the VM data mining 74 to search the portions of the complete data DB 70 for a set of data records having common data criteria (e.g., based on the query). The VM data mining 74 then stores the set of data records in the temporary shareable data DB 72. The controlling the population may include determining exact fields within the complete data DB needed for the query and determining a query type of the query, where a set of fields of the complete data DB corresponds to the query type.

The VM data mining 74 then populates (12a-12b) the temporary shareable data DB. For example, the VM data mining 74 access (e.g., reads) a set of data records in the complete data DB and temporarily stores (e.g., writes) at least some portions of the set of data records in the temporary shareable data DB 72. In an example, the at least some portions are data fields that do not identify an owner of a particular data record of the set of data records. In another example, the at least some portions are data records relevant to the query with data in all relevant data fields. The VM data mining then anonymizes (or further anonymizes) and normalizes the data records stored in the temporary shareable data DB 72 to produce shareable data.

FIG. 7I illustrates the data processing system 14 retrieving (13a-13b) the shareable data from each of the temporary shareable data DBs 72. For example, the VM data mining sends shareable data to the data processing system. The data processing system processes (14) the retrieved data to produce one or more results. For example, the data processing system creates a virtual machine (VM) data processing module of the data processing system to execute a data analysis function on the shareable data to produce the one or more results. The data processing system then sends (15) the one or more results to the data consumer computing entity 12. The data processing system may also store the results.

FIG. 7J illustrates the data processing system 14 creating (16) an audit log. For example, the data processing system 14 generates data (e.g., metadata, statistics, record of transmitting/receiving data, record of entities transmitting, receiving and/or processing data, etc.) regarding one or more of steps 1-15 of processing the query. In an example, the audit log is sent to one or more of the data consumer computing entity 12 and the data owner computing entity 140. In another example, the audit log is stored by the data processing system 14 for future analysis, compliance, and other uses. The data processing system 14 then deletes (17a-17b) the credentials, the VM data mining, the VM data processing, and/or the temporary shareable data DB.

Alternatively, or in addition to, the data owner system registers with the data processing system to setup file sharing options. The data processing system provides a login for the data owner system and is granted a key that identifies an application programming interface (API) of the data owner system to the data processing system. The data owner system identifies files for sharing. The sharing may include identification of a data consumer with which the identified files will be shared, and identification of a container used for storing the identified files. In an example, the data consumer also registers with the data processing system.

FIG. 7K is a logic diagram of an example of a method of securely processing shareable data. The method begins or continues with step 200, where a data processing system creates a virtual machine for use with a data owner system in accordance with a temporary credential protocol between the data processing system and the data owner system.

In an example, temporary credential protocol includes establishing first temporary security credentials for the data processing system to create the virtual machine. After the virtual machine is created and in accordance with the first temporary security credentials, the temporary credential protocol further includes the data processing system establishing second temporary security credentials for the virtual machine to access the memory of a data owner system. In an instance, the temporary security credentials include an access key pair and a session token. The access key pair includes an access key identification and a secret key. In another instance, the temporary security credentials include a username and password.

The method continues with step 202, where the virtual machine accesses memory of the data owner system regarding a set of data records having common data criteria. For example, the virtual machine identifies data fields of the data records based on a query to produce data fields of interest. The virtual machine accesses data records stored in the memory that have the common data criteria and modifies the data records based on the data fields of interest to produce the set of data records.

The method continues with step 204, where the virtual machine modifies (e.g., normalizes, anonymizes, and/or alters) the set of data records to produce a set of shareable data records. A data record of the set of data records includes a plurality of data fields. In an example, a first set of data fields of the plurality of data fields is regarding identification (e.g., PHI, PII, etc) of an object of the data record and a second set of data fields of the plurality of data fields is regarding data associated with the object. Note in one example, the modifying does not include changing any data fields (e.g., when the data is in a form that already complies with a privacy law, an agreement between a data owner and a data consumer, etc.).

In an embodiment, the modifying the data record includes altering content of the first set of data fields to render identity of the object to be substantially unknowable (e.g., removing protected health information (PHI), etc.). In another embodiment, the modifying the data record further includes altering content of the second set of data fields (e.g., when determining a likelihood the identity of the object could be determined based on content of the second set of data fields is above a privacy threshold). As another example, the modifying further includes normalizing the set of data records to produce the set of shareable data records.

The altering may include one or more of a variety of approaches. A first approach includes deleting the content of the first set of data fields. For example, bits of the content may be written with all 1's or all 0's. A second approach includes obfuscating the content of the first set of data fields. For example, bits of the content may be scrambled, and/or rearranged. A third approach includes replacing the content of the first set of data fields with generic content. For example, bits of the content are replaced with generic bits.

The method continues with step 206, where the data processing system executes a data analysis function on the set of shareable data records to produce an analytical result. In an example, the data processing system receives a query, determines the common data criteria based on the query and generates the data analysis function based on the query from the data consumer computing entity.

In an embodiment, the executing the data analysis function further includes creating, by the data processing system, a data processing virtual machine to execute the data analysis function on the set of shareable data records to produce an analytical result. After the analytical result is sent to the data consumer computing entity, the data processing system deletes the data processing virtual machine and/or the virtual machine.

The method continues with step 208, where the data processing system sends the analytical result to a data consumer computing entity. In an example, the method further includes, the virtual machine or the data processing system, creating a virtual database. The virtual machine stores the set of records in the virtual database and stores the set of shareable data records in the virtual database. After the analytical result is sent to the data consumer computing entity, the data processing system deletes the virtual database.

In an embodiment, the data processing system also creates a second virtual machine for use with a second data owner system in accordance with a second temporary credential protocol between the data processing system and the second data owner system. The second virtual machine accesses memory of the second data owner system regarding a second set of data records having the common data criteria. The second virtual machine modifies the second set of data records to produce a second set of shareable data records. The data processing system executes the data analysis function on the set of shareable data records and the second set of shareable data records to produce the analytical result.

In another embodiment, the virtual machine accesses memory of a second data owner system regarding a second set of data records having the common data criteria. The virtual machine also modifies the second set of data records to produce a second set of shareable data records, wherein the data processing system further executes the data analysis function on the second set of shareable data records to produce the analytical result.

In still another embodiment, the data processing system creates audit logs based on the processing the query. In an example, the audit logs are stored for a particular period of time. The storage may be via the data processing system or stored in a third party storage system. In another example, the audit logs are sent to one or more of the data consumer computing entity and the data owner system. Further, the analytical result may be stored for future retrieval by one or more of the data consumer computing entity, the data processing system and the data owner system.

FIG. 8A is a schematic block diagram of a data record of a data owner 222. In an embodiment, a data owner 222 is implemented by one or more data owner systems 16 of FIG. 1. In this example, the data owner 222 is a hospital and the data record is regarding a patient record of a patient 220 for one hospital stay 224. As illustrated, an enormous amount of data of varying types can be collected for an object (e.g., patient 220) and a single data record (e.g., the patient record 224) regarding the object. An a non-exhaustive example, the patient record includes one or more data fields that include a hospital name, dates (e.g., admit day, discharge day) of the hospital stay, room data, nurses involved in the patient's care, a diagnosis, a list of medications, a prognosis, doctor's notes, any surgery (ies) performed on the patient, patient information, treatments, nourishment (e.g., meal data, supplements, etc.), tests, doctors involved in treatment of patient, billing data, insurance data, payment data, and images.

Each data field of the data record may include information regarding another data record (a sub or a child data record) that includes another one or more data fields. For example, the patient info data field include one or more data fields that include a patient identification (ID) 226, an address, a birthday, gender, race, blood type, personal medical history, current medications, name, occupation, family data, weight, height, DNA data, family medical history, medication history, insurance, photo, social security number (SSN), religion, political, and sexual orientation.

For a data consumer 223 to have access to complete data regarding the patient, all the data owners would need to allow access to their respective data records for the patient. In this example, the data owners have ER visits data records, urgent care data records, primary doctor visits data records, hospital stays data records, specialized doctor visits data records, pharmacist—medications data records, insurance company data records, and payment sources data records. Note in an example, the patient is a data owner.

Continuing with this example, the data consumers 223 include hospitals, insurance companies, pharmaceutical companies, researchers, doctors, and government agencies. In an embodiment, a data consumer 223 is implemented by one or more data consumer computing devices 12 of FIG. 1. As some very limited examples, the data consumers desire access to query the complete data for one or more of performing a hospital analysis, determining treatment types, determining a treatment efficiency, determining an insurance efficiency, analyzing surgical data, and determining a hospital efficiency. However, due to the General Data Protection Regulation (GDPR), Health Insurance Portability and Accountability Act (HIPAA) and/or other privacy law/restrictions, data consumers cannot directly access complete data and thus cannot gather enough data for the queries.

FIG. 8B is a schematic block diagram of another example of data records for the patient of FIG. 8A. As illustrated, the data records may further include patient personal data 230 (information collected, owned (e.g., accessible to), or stored by the patient) and publicly available data 240 (e.g., free access and/or pay for access). Note there are numerous amounts of personal data 230 and publicly available data 240 for each object of a data record (e.g., thousands to millions or more data records). Further note a data record may be associated with more than one object (e.g., multiple persons, a person and a place, a thing and a place, etc).

In this specific example, the patient personal data 230 includes geolocation data 232, nutrition data 236, digital footprint data 237 and wearable data 238. The geolocation data 232 may include location data 276 and time data 278. The wearable data 238 (e.g., from a smart watch, from a fitness device, etc) includes vitals data 260, sleep data 262 (e.g., hours slept, rapid eye movement (REM) cycles, etc.), and exercise data 264. Note each type of data may have a same data field as other date records stored by data owners 222. For example, exercise data 264 has a heart rate data field, a clinic patient data records includes a pulse field, and the vitals data (e.g., from smart watch) includes heart rate data.

As an example, the nutrition data 236 may include meal logging data (e.g., what mother ate, drank, etc on what day for what meal) and smoker data (e.g., home delivery receipts for cigarettes, self-identified on social media as a smoker, medical marijuana card registration, etc). The digital footprint data 237 includes social media data 243 (posts, interactions, ads viewed, etc.), and web search data 245 (e.g., search engine searches).

The publicly available data 240 includes examples such as center for disease control (CDC) data 242, food and drug administration (FDA) data 244, environmental data 246, and United States department of agriculture (USDA) data 248. As an example, the USDA data includes food recalls 250, peanut prices 252, poultry slaughter 254, and fruit and tree nut data 256. An example of the environmental data 234 includes water chemical levels 270, weather data 272 and pollution data 274. In an instance, the water chemical levels 270 may include for one or more areas or water sources, a level of one or more of fluorine, nitrates, and pesticides. In another instance, the weather data 272 includes for one or more particular areas, a humidity, amount of rain, and a temperature.

In an example, publicly available data and/or patent personal data are utilized in processing a query. For example, for a query of asthma symptoms, the data processing system may utilize geolocation data 278, pollution data 274 and weather data 272 to determine the effect of pollution and/or weather on the patient's asthma symptoms.

FIG. 8C is a schematic block diagram of further data sub-records of the patient record of FIG. 8A. In this example, the family medical history 240 of the patient info data record 226 includes a listing of children, siblings, father, mother, nieces, nephews, maternal grandparents, maternal cousins, paternal grandparents and paternal cousins. The mother medical history 242 of the family medical history data 240 record includes mother information and medical conditions. The medical conditions 246 include a broken arm, anxiety, smoker and diabetes.

The diabetes data record 248 includes data diagnosed data, treatments, outcomes and doctor information. The doctor information data record 249 includes a school (e.g., where a doctor studied for her medical degree), experience, diagnosis data (e.g., % of patients that are given same diagnosis), and a specialty (e.g., orthopedic).

The mother data information data record 244 includes address, age data, gender, race, blood type, sexual orientation, current medications, occupation, family data, weight height, religion, family medical history, medication history, name, insurance, social security number, nutrition data, wearable data, CDC data, environmental data.

In an example, a query includes a symptom being asthma and comparing two smoker parents, one smoker parent, and no smoker parents. In this example, smoker information data field of medical condition data record 246 indicates patient's mother was a smoker. Note this information may be found in multiple data records (e.g., patient's hospital data record, mother's clinic data record, mother's sister's emergency room data record, online form filled out by mother, mother's store rewards transaction data record, etc.). As shown, the quantity of data records can be utilized for more data points to more accurately perform a query. As is further shown, there may be a large amount of complexity within one data record. In an embodiment, a data record (mother information data record 244) is a combination of two or more other data records in the data communication network.

FIG. 8D is a schematic block diagram of an example of modifying data fields of a data record. In this example, the data of the patient information data record 226 is populated into rows of a column. The data is then normalized and anonymized. For example, data fields patient ID, address, name, occupation, insurance, family data, family medical history, current medications, photo, SSN, religion, and political are altered to produce anonymized data. Anonymizing the data renders an object of the data (e.g., the patient) to be unknowable based on the anonymized data. Note in an instance, the data may be arranged differently (e.g., columns of a row).

The anonymized data is also normalized. For example, a birthday format is changed from a month-day-year format to a year-month-day format, a weight format is changed from a kilogram value to a pound value, and a height value is changed from a specific value (64.5 inches), to within a range of values (e.g., 64-70 inches).

FIG. 8E is a schematic block diagram of another example of anonymizing and normalizing (e.g., modifying) data fields of a data record. In this example, the data record is anonymized by altering data fields of data record 226. For example, patient identification (ID), address, name, occupation, insurance, family data, deoxyribonucleic acid (DNA) data, family medical history, sexual orientation, photo, social security number (SSN), religion, and political data fields are altered (e.g., deleted, partially deleted, obfuscated, etc.). The data record is then normalized. For example, the address data is altered to the first three digits of zip code data (e.g., street number, street address is removed). As another example, the birthday data is modified from a month-day-year format to a year-month-day format. As yet another example, weight data is changed from kilograms to pounds. Note in an example, a data record may be altered without anonymizing the data record.

FIG. 8F is a schematic block diagram of another example of modifying (e.g., normalizing, anonymizing, and/or other altering) data fields of a data record (e.g., patient information 226). In this example, the data fields are normalized and then anonymized. For example, the birthday field is normalized to be the year of birth and the employer field is normalized to be an occupation. The normalized data records are then anonymized. For example, the address information is removed to leave "a city name" as only data in address data field. As another example, the medication history is altered such that any personal information is removed. As yet another example, the current medications data field is altered to only include medications particular to a query. As yet a further example, the name, family data, DNA data, family medical history, personal medical history, sexual orientation, photo, social security number, religion and political data fields are all removed (e.g., deleted, overwritten, etc.).

FIG. 8G is a schematic block diagram of an example of further data records for the patient 220 of FIG. 8A. In this example, patient 220 provides data that is at least partially used by data storage owners 290 to create, update, etc. data records. The data storage owners 290 includes urgent care visits 292 data records, which include a patient record for one visit 294. The patient record 294 includes clinic patient information 296. The clinic patient information 296 includes an address, date of birth, gender, race, blood type, personal medical history, sexual orientation, occupation, social security number (SSN), weight, height, name, family medical history, insurance, and body fat percentage data fields.

FIG. 8H is a schematic block diagram of an example of inconsistent data records. As illustrated, the patient's 220 hospital patient information data record 226 of FIG. 8A is inconsistent (e.g., has like data field differences) with the patient's 220 clinic patient information data records 252 of FIG. 8G. In this example, the inconsistencies include format, header information and different fields. As an example of a format inconsistency, the birthday of the hospital patient information data record 226 is in a year-month date format while the date of birth of the clinic patient information data record 252 is in a month-day-year format. As an example of a header information inconsistency, the header information of birthday field of the hospital patient information data record 226 is titled "birthday" while the header information of the birthday field of the clinic patient information data record 252 is titled "date of birth". As an example of different data fields, the hospital patient information data record 226 includes current medications, medication history, DNA data, religion, and political data fields that are not included in clinic patient information 252.

FIG. 8I is a schematic block diagram of an example of merging data records. For example, the patient records of FIG. 8H are merged. In the example illustrated, record 1 226-1 is from the hospital patient information 226 and record 2 252-1 is from the clinic patient information 252 for a same patient. Records 1 and 2 are merged to produce merged record 300. The determination of which data (e.g., from record 1, from record 2, from other data records, etc.) to populate merged record 300 includes comparing data from one source to "x" number of other sources (e.g., to determine accuracy, to determine a trend, etc.), requesting information from the patient 220, and using a most trusted source (e.g., hospital record more trusted than urgent care record, etc.). The merging may further include averaging (e.g., average (122 lbs, 55 kg)=121.5 lbs), projecting (e.g., 115 lbs on 1/15/17, 117 lbs on 1/15/19—project (i.e., estimate) 118 lbs for 1/15/20), including a range of values (e.g., records span years 2019-2020), and further normalizing (white/Caucasian=white).

A determination of whether to merge may also be based on the query. As an example, when multiple data points in time include data that varies (e.g., weight, medications, symptoms) and data that does not vary over a threshold (e.g., race, occupation, height, gender, birthday, blood type, etc.), the data processing system may determine to merge the data the does not vary. For example, a query want to know the outcomes for a treatment for a patient with a certain height, a symptom of lower back pain, and an amount of pain during/before/after various treatments. There may be multiple records (e.g., imaging records, chiropractic records, hospital records, etc.) regarding the height and amount of pain that are different while the height of the patient and symptom of lower back pain remain constant (e.g., don't vary over a threshold). Thus, the data processing system determines to merge the height and symptom data fields.

FIG. 9A is a schematic block diagram of an example of securely processing shareable data in response to a query. In this example, the data processing system 14 receives (1) a query "medical YYY" that specifies with existing medications being medication Y and medication Z, what symptoms are being exhibited. Next (2), the data processing system 14 interprets the query to identify topics (e.g., the what) of a list of topics for data contributions. For example, the data processing system 14 determines topics to include "medications" and "symptoms".

Each data owner may be associated with a list of topics it will contribute data to (i.e., queries it will participate in). The data processing system 14 determines data sources (e.g., the who) to ask for participation in the query based on the data owner including the identified topics in their list of topics. For example, the data processing system searches the data owner's list of topics to identify which data owners have data regarding the topics of "medications" and "symptoms". For example, the data processing system identifies ER 1, ER 2, ER 4 and ER aa as emergency room data owners that include the identified topics in their list of topics.

The data processing system 14 asks (3a-3b) the identified data owners to participate in the query. For example, the data processing system asks data owners shaded in light or dark grey to participate in query. The data processing system 14 then receives (4a-4b) responses from the asked data owners indicating whether or not they will participate in the query. For example, the dark shaded data owners (e.g., ER aa, family practice doctor office 3, specialized doctor office 2, and specialized doctor office ee) were asked and returned an unfavorable ask response (e.g., no, not according to current query specification, etc.) to the data processing system. The light shaded data owners (e.g., publicly available data computing device 18, ER1, ER2, ER4, Urgent Care 3, Urgent Care 5, etc.) were asked and returned a favorable ask response (e.g., yes).

FIG. 9B is an example of complete data 305 associated with the query of FIG. 9A. The complete data 305 includes a plurality of patient visit records 310 of the plurality of data owners participating in the query. An example patient visit record 310 includes an ER ID, date, time in, time out, patient info, reason for visit, intake data, doctor, doctor notes, diagnosis, treatment, imaging, and medications data fields. Each of the data fields may further include sub-data fields. For example, the patient info data field includes a patient identification (ID), a name, an address, a date of birth, a phone number, a gender and an insurance data field.

As another example, the reason for visit data field may include a symptom 1 through a symptom y sub-data fields. As yet another example, the intake data field may include a height, a weight, a plurality of blood pressure (BP) readings 1-$x$, a temperature, a blood oxygen, and a pulse sub-data fields. As yet another example, medications data field may include a plurality of existing medications 1-$x$ and a plurality of prescribed medications 1-$b$ sub-data fields.

Continuing with the example of FIG. 9A, the data processing system collaborates with each data owner to access the complete data in accordance with the topics of "medications" and "symptoms". For example, the grey shaded boxes in FIG. 9B illustrates topics related to the query. The data processing system operates to modify (e.g., alter, normalize and/or anonymize) the patient visit record to produce shareable data from the data owner (e.g., ER 1).

FIG. 9C is a block diagram of an example of a plurality of shareable data of some of the participating data owners. The shareable data for each data owner includes one or more data records. For example, each data record includes the symptoms and existing medications for a particular patient and/or timeframe of one patient.

In an example, these data records are securely transferred from each data owner to the data processing system. As another example, further modifying (e.g., a second level of anonymizing) of at least some of the data records are performed and then securely transferred from each data owner to the data processing system. As yet another example, the further modifying (e.g., a second level of anonymizing) of at least some of the data records is performed after they are securely transferred from each data owner to the data processing system.

The determination of the further modifying may be based on one or more of a data anonymizing function, a preset, and a command. For example, the data processing system may utilize statistics saved from processing previous shareable data. The data processing system determines how many data points of the current shareable data include similar data (e.g., same or similar data fields (e.g., date of birth/birthday, etc.), similar data in a data field (e.g., height within a height range, etc.)) to data points of other shareable data records (e.g., based on the statistics). When the number of the data points of the other shareable data records includes less than a threshold number (e.g., specific value, percentage, etc.) of similar data, the data processing system determines to further anonymize at least one data record of the current shareable data records. For example, the data processing system further anonymizes a first data record of the current shareable data records, when the first data record includes 1 similar data point and the threshold is 3 data points.

When the number of the data points of the other shareable data records includes greater than or equal to the threshold number of similar data, the data processing system determines not to further anonymize at least one data record of the current shareable data records. As a specific example of the further anonymizing, the data processing system executes an anonymize function on the current shareable data records that include 350,022 data records based on the statistics (e.g., from thousands to billions of records) saved from previous data analysis performed for previous queries. The results of the anonymizing function indicate a first data field of a first data record includes 32 similar data points (e.g., f(anonymize, 350,022)=32) based on the statistics and a second data field of the first data record includes 21,562 similar data points (e.g., f(anonymize, 350,022)=21,562) based on the statistics.

In an example, the threshold is 2% of current data records (e.g., ~7,000). Thus, for this example, the data processing system determines to alter the first data field, as the similar data points are less than the threshold (e.g., 32<7000). And, the data processing system determines not to alter the second data field, as the similar data points are greater than the threshold (e.g., 21,562>7000).

FIG. 9D is a block diagram illustrating the data processing system combining the plurality of shareable data of FIG. 9C into a shareable data table. The shareable data table includes records 1-nn. Each data record includes symptoms 1-$y$, and existing medications 1-$x$.

FIG. 9E is a block diagram of a modified shareable data table. In this example, the rows (e.g., records) that included both medication Y and medication Z were selected to be included in the modified data table (e.g., records 1-mm).

FIG. 9F is an example of executing a data analysis function on the shareable data to produce a query result. For example, the query result lists all the symptoms of records 1-mm reported when taking medication Y and medication Z. The results may further list data (e.g., the number of occurrences, percentage of records with occurrence, etc.) regarding each symptom. As an example, symptom 1 is fever and is included in (e.g., occurrences) 1109 records of 25,389 records (e.g., records 1-mm). As another example, symptom 4 is a rash and is included in 1% (e.g. ~254) of the 25,389 records. As another example, symptom 10 is headache and is included in 3,921 of the 25,389 records. As yet a still further example, symptom 13 is sore throat and is included in 5 of the 25,389 records.

FIG. 9G is graphical diagram illustrating an example of the results of the query "existing medications being medication Y and medication Z, what symptoms are being exhibited".

As shown, symptoms 1, 7, 10, and 17 occur the most when a patient is taking medication Y and medication Z concurrently. For example, symptoms fever (symptom 1), dry mouth (symptom 7), headache (symptom 10), and diarrhea (symptom 17) are the most occurring symptoms when taking medication Y and medication Z for this query.

It is noted that terminologies as may be used herein such as bit stream, stream, signal sequence, etc. (or their equivalents) have been used interchangeably to describe digital information whose content corresponds to any of a number of desired types (e.g., data, video, speech, audio, etc. any of which may generally be referred to as 'data').

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may also be used herein, the terms "processing module", "processing circuit", "processor", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, and/or any device that stores digital information. The memory device may be in a form a solid state memory, a hard drive memory, cloud memory, thumb drive, server memory, computing device memory, and/or other physical medium for storing digital information.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A method comprises:
   creating, by a data processing system, a virtual machine for use with a data owner system in accordance with a temporary credential protocol between the data processing system and the data owner system;
   accessing, by the virtual machine, memory of the data owner system regarding a set of data records having common data criteria;
   modifying, by the virtual machine, the set of data records to produce a set of shareable data records;
   executing, by the data processing system, a data analysis function on the set of shareable data records to produce an analytical result; and
   sending, by the data processing system, the analytical result to a data consumer computing entity.

2. The method of claim 1, wherein the temporary credential protocol comprises:
   establishing, by the data owner system, first temporary security credentials for the data processing system to create the virtual machine; and
   after the virtual machine is created and in accordance with the first temporary security credentials, establishing, by the data processing system, second temporary security credentials for the virtual machine to access the memory of the data owner system.

3. The method of claim 1 further comprises:
   a data record of the set of data records includes a plurality of data fields, wherein a first set of data fields of the plurality of data fields is regarding identification of an object of the data record and a second set of data fields of the plurality of data fields is regarding data regarding the object, and wherein the modifying the data record includes altering content of the first set of data fields to render identity of the object to be substantially unknowable.

4. The method of claim 3, wherein the altering includes one or more of:
   deleting the content of the first set of data fields;
   obfuscating the content of the first set of data fields; and
   replacing the content of the first set of data fields with generic content.

5. The method of claim 3, wherein the modifying further comprises:
   normalizing the set of data records to produce the set of shareable data records.

6. The method of claim 1 further comprises:
   receiving, by the data processing system, a query;
   determining, by the data processing system, the common data criteria based on the query; and
   generating, by the data processing system, the data analysis function based on the query from the data consumer computing entity.

7. The method of claim 1 further comprises:
   creating, by the data processing system, a second virtual machine for use with a second data owner system in accordance with a second temporary credential protocol between the data processing system and the second data owner system;
   accessing, by the second virtual machine, memory of the second data owner system regarding a second set of data records having the common data criteria;
   modifying, by the second virtual machine, the second set of data records to produce a second set of shareable data records; and
   executing, by the data processing system, the data analysis function on the set of shareable data records and the second set of shareable data records to produce the analytical result.

8. The method of claim 1, wherein the executing the data analysis function further comprises:
   creating, by the data processing system, a data processing virtual machine to execute the data analysis function on the set of shareable data records to produce the analytical result; and
   after the analytical result is sent to the data consumer computing entity:
      deleting, by the data processing system, the data processing virtual machine; and
      deleting, by the data processing system, the virtual machine.

9. The method of claim 1 further comprises:
   accessing, by the virtual machine, memory of a second data owner system regarding a second set of data records having the common data criteria; and
   modifying, by the virtual machine, the second set of data records to produce a second set of shareable data records, wherein the data processing system further executes the data analysis function on the second set of shareable data records to produce the analytical result.

10. The method of claim 1 further comprises:
creating, by the virtual machine or the data processing system, a virtual database;
storing, by the virtual machine, the set of data records in the virtual database; and
storing, by the virtual machine, the set of shareable data records in the virtual database.

11. The method of claim 10 further comprises:
deleting, by the data processing system, the virtual database after the analytical result is sent to the data consumer computing entity.

12. The method of claim 1, wherein the accessing the memory of the data owner system further comprises:
identifying data fields of the data records based on a query to produce data fields of interest;
accessing data records stored in the memory, wherein the data records have the common data criteria; and
modifying the data records based on the data fields of interest to produce the set of data records.

13. A computer readable storage device comprises:
a first memory section for storing operational instructions that, when executed by a data processing system of a data communication network, cause the data processing system to:
create a virtual machine for use with a data owner system in accordance with a temporary credential protocol between the data processing system and the data owner system;
a second memory section for storing operational instructions that, when executed by the virtual machine, cause the virtual machine to:
access memory of the data owner system regarding a set of data records having common data criteria;
modify the set of data records to produce a set of shareable data records;
a third memory section for storing operational instructions that, when executed by the data processing system, cause the data processing system to:
execute a data analysis function on the set of shareable data records to produce an analytical result; and
send the analytical result to a data consumer computing entity.

14. The computer readable storage device of claim 13, wherein the temporary credential protocol comprises:
a fourth memory section for storing operational instructions that, when executed by the data owner system of the data communication network, cause the data owner system to:
establish first temporary security credentials for the data processing system to create the virtual machine; and
after the virtual machine is created and in accordance with the first temporary security credentials, the first memory section storing further operational instructions that, when executed by the data processing system, cause the data processing system to:
establish second temporary security credentials for the virtual machine to access the memory of the data owner system.

15. The computer readable storage device of claim 13, wherein the second memory section stores further operational instructions that, when executed by the virtual machine, cause the virtual machine to:
modify a data record of the set of data records by altering content of a first set of data fields of a plurality of data fields of the data record to render identity of an object of the data record to be substantially unknowable, wherein the first set of data fields is regarding identification of the object of the data and a second set of data fields of the plurality of data fields is regarding data regarding the object.

16. The computer readable storage device of claim 15, wherein the second memory section stores further operational instructions that, when executed by the virtual machine, cause the virtual machine to alter the content by one or more of:
deleting the content of the first set of data fields;
obfuscating the content of the first set of data fields; and
replacing the content of the first set of data fields with generic content.

17. The computer readable storage device of claim 15, wherein the second memory section stores further operational instructions that, when executed by the virtual machine, cause the virtual machine to modify further by:
normalizing the set of data records to produce the set of shareable data records.

18. The computer readable storage device of claim 13 further comprises:
a fourth memory section for storing operational instructions that, when executed by the data processing system, cause the data processing system to:
receive a query;
determine the common data criteria based on the query; and
generate the data analysis function based on the query from the data consumer computing entity.

19. The computer readable storage device of claim 13 further comprises:
the first memory section stores further operational instructions that, when executed by the data processing system, cause the data processing system to:
create a second virtual machine for use with a second data owner system in accordance with a second temporary credential protocol between the data processing system and the second data owner system;
a fourth memory section for storing operational instructions that, when executed by the second virtual machine, cause the second virtual machine to:
access memory of the second data owner system regarding a second set of data records having the common data criteria; and
modify the second set of data records to produce a second set of shareable data records; and
the third memory section stores further operational instructions that, when executed by the data processing system, cause the data processing system to:
execute the data analysis function on the set of shareable data records and the second set of shareable data records to produce the analytical result.

20. The computer readable storage device of claim 13, wherein the third memory section stores further operational instructions that, when executed by the data processing system, causes the data processing system to execute the data analysis function further by:
creating a data processing virtual machine to execute the data analysis function on the set of shareable data records to produce the analytical result; and
after the analytical result is sent to the data consumer computing entity:
deleting the data processing virtual machine; and
deleting the virtual machine.

21. The computer readable storage device of claim 13 wherein the second memory section stores further operational instructions that, when executed by the virtual machine, causes the virtual machine to:
  access memory of a second data owner system regarding a second set of data records having the common data criteria; and
  modify the second set of data records to produce a second set of shareable data records, wherein the data processing system further executes the data analysis function on the second set of shareable data records to produce the analytical result.

22. The computer readable storage device of claim 13 further comprises:
  a fourth memory section for storing operational instructions that, when executed by the data processing system, cause by the data processing system to:
  create a virtual database;
  a fifth memory section for storing operational instructions that, when executed by the virtual machine, cause by the virtual machine to:
  store the set of data records in the virtual database; and
  store the set of shareable data records in the virtual database.

23. The computer readable storage device of claim 22, wherein the third memory section stores further operational instructions that, when executed by the data processing system, causes the data processing system to:
  delete the virtual database after the analytical result is sent to the data consumer computing entity.

24. The computer readable storage device of claim 13, wherein the third memory section stores further operational instructions that, when executed by the data processing system, causes the data processing system to access the memory of the data owner system further by:
  identifying data fields of the data records based on a query to produce data fields of interest;
  accessing data records stored in the memory, wherein the data records have the common data criteria; and
  modifying the data records based on the data fields of interest to produce the set of data records.

* * * * *